(12) United States Patent
Chor et al.

(10) Patent No.: US 11,822,597 B2
(45) Date of Patent: Nov. 21, 2023

(54) GEOFENCE-BASED OBJECT IDENTIFICATION IN AN EXTENDED REALITY ENVIRONMENT

(71) Applicant: Splunk Inc., San Francisco, CA (US)

(72) Inventors: Jesse Chor, Los Gatos, CA (US); Michael Emery, Scotts Valley, CA (US); Christopher Chan, Santa Clara, CA (US); Glen Wong, Santa Clara, CA (US); Devin Bhushan, Campbell, CA (US)

(73) Assignee: SPLUNK INC., San Francisco, CA (US)

( * ) Notice: Subject to any disclaimer, the term of this patent is extended or adjusted under 35 U.S.C. 154(b) by 0 days.

(21) Appl. No.: 16/993,167

(22) Filed: Aug. 13, 2020

(65) Prior Publication Data

US 2021/0027458 A1  Jan. 28, 2021

Related U.S. Application Data

(63) Continuation of application No. 15/965,799, filed on Apr. 27, 2018.

(51) Int. Cl.
*G06F 16/583* (2019.01)
*G06T 7/00* (2017.01)
(Continued)

(52) U.S. Cl.
CPC ......... *G06F 16/5838* (2019.01); *G06N 7/01* (2023.01); *G06T 7/0004* (2013.01); *G06V 20/20* (2022.01);
(Continued)

(58) Field of Classification Search
CPC ........... H04W 4/38; H04W 4/40; H04W 4/42; H04W 4/04; H04L 67/38; H04L 67/131;
(Continued)

(56) References Cited

U.S. PATENT DOCUMENTS 8,073,198 B2  12/2011 Marti
8,264,505 B2   9/2012 Bathiche et al.
(Continued)

FOREIGN PATENT DOCUMENTS

WO  WO-2018060783 A1 *  4/2018  ........... A63F 13/335

OTHER PUBLICATIONS

X. Li and X. Wang, "Research on Augmented Reality Extended Tracking Technology for Mobile Terminal," 2018 International Conference on Audio, Language and Image Processing (ICALIP), 2018, pp. 184-188, doi: 10.1109/ICALIP.2018.8455747. (Year: 2018).*
(Continued)

*Primary Examiner* — Andrae S Allison
(74) *Attorney, Agent, or Firm* — Artegis Law Group, LLP

(57) ABSTRACT

A mobile device that includes a camera and an extended reality software application program is employed by a user in an operating environment, such as an industrial environment. One or more objects within a geofence may be identified. A device crosses within the geofence and acquires sensor data associated with an object within the geofence. The sensor data may include image data and/or audio data. The device or a server system may then determine an object identifier associated with the object based on a comparison of the sensor data with data associated with object identifiers corresponding to objects within the geofence. Based on the object identifier, data associated with the object are obtained. The data associated with the object may be presented via the device, such as an extended reality overlay over a view of the object in the device.

20 Claims, 67 Drawing Sheets
(9 of 67 Drawing Sheet(s) Filed in Color)

(51) Int. Cl.
*H04W 4/38* (2018.01)
*H04W 4/021* (2018.01)
*H04L 67/131* (2022.01)
*G06N 7/01* (2023.01)
*G06V 20/20* (2022.01)
*G06V 30/10* (2022.01)

(52) U.S. Cl.
CPC ........... *H04L 67/131* (2022.05); *H04W 4/021* (2013.01); *H04W 4/38* (2018.02); *G06V 30/10* (2022.01)

(58) Field of Classification Search
CPC ....... G06T 7/00; G06T 7/0004; G06T 7/0006; G06V 30/10; G06V 30/14; G06V 20/00; G06N 7/005
USPC ................ 382/141, 100, 103–104, 107, 199; 701/516–517, 300, 32.3, 485, 495, 701/445–448, 450, 454, 469
See application file for complete search history.

(56) References Cited

U.S. PATENT DOCUMENTS

| | | | |
|---|---|---|---|
| 8,412,696 | B2 | 4/2013 | Zhang et al. |
| 8,542,906 | B1 | 9/2013 | Persson et al. |
| 8,589,375 | B2 | 11/2013 | Zhang et al. |
| 8,589,403 | B2 | 11/2013 | Marquardt et al. |
| 8,589,432 | B2 | 11/2013 | Zhang et al. |
| 8,624,725 | B1 | 1/2014 | Macgregor |
| 8,738,587 | B1 | 5/2014 | Bitincka et al. |
| 8,738,629 | B1 | 5/2014 | Bitincka et al. |
| 8,788,525 | B2 | 7/2014 | Neels et al. |
| 8,788,526 | B2 | 7/2014 | Neels et al. |
| 8,826,434 | B2 | 9/2014 | Merza |
| 8,862,925 | B2 | 10/2014 | DeMarco |
| 8,943,320 | B2 | 1/2015 | Sabin et al. |
| 8,983,994 | B2 | 3/2015 | Neels et al. |
| 9,128,980 | B2 | 9/2015 | Neels et al. |
| 9,128,985 | B2 | 9/2015 | Marquardt et al. |
| 9,130,971 | B2 | 9/2015 | Vasan et al. |
| 9,173,801 | B2 | 11/2015 | Merza |
| 9,185,007 | B2 | 11/2015 | Fletcher et al. |
| 9,215,240 | B2 | 12/2015 | Merza et al. |
| 9,248,068 | B2 | 2/2016 | Merza |
| 9,294,873 | B1 | 3/2016 | MacGregor |
| 9,426,045 | B2 | 8/2016 | Fletcher et al. |
| 9,426,172 | B2 | 8/2016 | Merza |
| 9,432,396 | B2 | 8/2016 | Merza |
| 9,495,760 | B2 | 11/2016 | Swaminathan et al. |
| 9,514,189 | B2 | 12/2016 | Bitincka et al. |
| 9,589,012 | B2 | 3/2017 | Neels et al. |
| 9,838,292 | B2 | 12/2017 | Polychronis |
| 10,049,160 | B2 | 8/2018 | Bitincka et al. |
| 2004/0136539 | A1 | 7/2004 | Uhi et al. |
| 2004/0183751 | A1 | 9/2004 | Dempski |
| 2005/0285878 | A1 | 12/2005 | Singh et al. |
| 2007/0050468 | A1 | 3/2007 | Gazit |
| 2009/0300162 | A1 | 12/2009 | Demarie et al. |
| 2010/0257252 | A1 | 10/2010 | Dougherty et al. |
| 2012/0019673 | A1 | 1/2012 | Narayanan |
| 2012/0086729 | A1 | 4/2012 | Baseley et al. |
| 2012/0206452 | A1 | 8/2012 | Geisner et al. |
| 2013/0141565 | A1 | 6/2013 | Ling |
| 2013/0314398 | A1 | 11/2013 | Coates et al. |
| 2013/0318236 | A1 | 11/2013 | Coates et al. |
| 2014/0074435 | A1 | 3/2014 | Cohn et al. |
| 2014/0111542 | A1 | 4/2014 | Wan |
| 2014/0233917 | A1 | 8/2014 | Xiang |
| 2014/0236890 | A1 | 8/2014 | Vasan et al. |
| 2014/0247278 | A1 | 9/2014 | Samara et al. |
| 2014/0253590 | A1 | 9/2014 | Needham et al. |
| 2014/0267581 | A1 | 9/2014 | Cronin |
| 2014/0324862 | A1 | 10/2014 | Bingham et al. |
| 2015/0019537 | A1 | 1/2015 | Neels et al. |
| 2015/0062120 | A1 | 3/2015 | Reisner-Kollmann et al. |
| 2015/0070347 | A1 | 3/2015 | Hofmann et al. |
| 2015/0221134 | A1 | 8/2015 | Koga |
| 2015/0294503 | A1 | 10/2015 | Yang et al. |
| 2016/0004750 | A1 | 1/2016 | Marquardt et al. |
| 2016/0048732 | A1 | 2/2016 | Matoba et al. |
| 2016/0071319 | A1 | 3/2016 | Fallon et al. |
| 2016/0100265 | A1 | 4/2016 | Maggiore et al. |
| 2016/0171767 | A1 | 6/2016 | Anderson |
| 2017/0116784 | A1 | 4/2017 | Hintermeister et al. |
| 2017/0192620 | A1* | 7/2017 | Kim .................. G02B 27/0179 |
| 2017/0223195 | A1 | 8/2017 | Miyamori et al. |
| 2017/0228934 | A1* | 8/2017 | Koga ........................ G06F 3/14 |
| 2017/0249745 | A1 | 8/2017 | Fiala |
| 2017/0312614 | A1 | 11/2017 | Tran et al. |
| 2017/0364752 | A1 | 12/2017 | Zhou et al. |
| 2018/0211404 | A1 | 7/2018 | Zhu et al. |
| 2018/0345129 | A1 | 12/2018 | Rathod |
| 2019/0026936 | A1 | 1/2019 | Gorur Sheshagiri et al. |

OTHER PUBLICATIONS

[19] C. Wang, J. Liu, Y. Chen, L. Xie, H. B. Liu, and S. Lu, "RF-Kinect: 889 A wearable RFID-based approach towards 3D body movement tracking," 890 Proc. ACM Interact., Mobile, Wearable Ubiquitous Technol., vol. 2, No. 1, 891; pp. 1-28, Mar. 2018 (Year: 2018).*

C.-S. Wang and S.-S. Wu, "An adaptive RFID localization mechanism 886 supporting 3D virtual tour system," in Proc. 1st IEEE Int. Conf. Ubi-Media 887 Comput., Jul. 2008, pp. 219-224. 888 (Year: 2008).*

Kollatsch et al., "Mobile Augmented Reality based Monitoring of Assembly Lines", Elsevier, Procedia CIRP, vol. 23, 2014, pp. 246-251.

Shea et al., "Towards Fully Offloaded Cloud-based AR: Design, Implementation, and Experience", ACM, MMSys'17 Proceedings of the 8th ACM on Multimedia Systems Conference, Jun. 23, 2017, pp. 321-330.

Non-Final Office Action for U.S. Appl. No. 15/965,785; dated Oct. 6, 2020; 40 pages.

Final Office Action received for U.S. Appl. No. 15/965,800, dated Dec. 10, 2020, 37 pages.

Non-Final OFfice Action received for U.S. Appl. No. 15/965,800, dated May 26, 2020, 34 pages.

David Prochazka, Ondrej Popelka, Tomas Koubek, Jaromir Landa, Jan Kolomaznik, "Hybrid-SIRF-Golay Marker Detection Method for Augmented Reality Applications", Jan. 2012, WSCG, Journal of WSCG, pp. 197-204.

Gabriel Takacs, Vijay Chandresekhar, Natasha Gelfand, Yingen Xiong, Wei-Chao Chen, Thanos Bismpigiannis, Radek Grzeszczuk, Kari Pulli, Bernd Girod, "Outdoors Augmented Reality on Mobile Phone using Loxel-Based Visual Feature Organization", Oct. 31, 2008,ACM, MIR '08 Proceedings, pp. 427-434.

Thummarat Boonrod, Phatthanaphong Chomphuwiset, Chatklaw Jareanpon, "The Marker Detection from Product Logo for Augmented Reality Technology", 2016, Springer International, IUKM 2016, Integrated Uncertainty in Knowledge Modelling and Decision Making, pp. 421-432.

Amedo Setti, Paolo Bosetti, Matteo Ragni, "ARTool—Augmented Reality Human-Machine Interface for Machining Setup and Maintenance", Sep. 22, 2016, IntelliSys 2016: Intelligent Systems and Applications, pp. 131-155.

Non-Final Office Action received for U.S. Appl. No. 15/965,800, dated May 27, 2021, 36 pages.

Koch et al., "Natural markers for augmented reality-based indoor navigation and facility maintenance", Dec. 2014 Elsevier, Automation in Constructions, vol. 48, pp. 18-30.

Shen et al., "A System for Visualizing Sound Source using augmented Reality", Dec. 5, 2012, ACM, MoMM,; '12: Proceedings of the 10th International Conference on Advances in Mobile Computing & Multimedia, pp. 97-102.

Non-Final Office Action for U.S. Appl. No. 15/965,799; dated Mar. 23, 2021; 21 pages.

(56) References Cited

OTHER PUBLICATIONS

Khan et al., "Factors affecting the design and tracking of ARToolKit markers", Elsevier, Computer Standards and Interfaces, vol. 41, Sep. 2015, pp. 56-66.
Non-Final Office Action received for U.S. Appl. No. 15/965,799, dated Oct. 1, 2021, 25 pages.
Mugan, "Handwrittedn Digit Recognition Using a Hierarchical Bayesian Network", Nov. 30, 2005, 10 pages.
Setti, et al.; ARTool-Augmented Reality Human-Machine Interface for Machining Setup and Maintenance; dated 2016; 25 pages.
Final Office Action for U.S. Appl. No. 15/965,785; dated Mar. 29, 2021; 43 pages.
Non Final Office Action received for U.S. Appl. No. 15/965,799, dated Aug. 30, 2022, 20 pages.
Non Final Office Action received for U.S. Appl. No. 15/965,800, dated Jul. 22, 2022, 42 pages.
Non Final Office Action received for U.S. Appl. No. 15/965,799, dated Dec. 23, 2019, 16 pages.
Non Final Office Action received for U.S. Appl. No. 15/965,785, dated Oct. 30, 2019, 31 pages.
Non Final Office Action received for U.S. Appl. No. 15/965,800, dated Jun. 27, 2019, 28 pages.
Final Office Action received for U.S. Appl. No. 15/965,800, dated Dec. 23, 2019, 33 pages.
Notice of Allowance received for U.S. Appl. No. 15/965,799, dated May 27, 2020, 14 pages.
Final Office Action received for U.S. Appl. No. 15/965,785, dated May 14, 2020, 44 pages.
Advisory Action received for U.S. Appl. No. 15/965,785, dated Aug. 19, 2020, 4 pages.
Non Final Office Action received for U.S. Appl. No. 15/965,799, dated Oct. 14, 2020, 9 pages.
Notice of Allowance received for U.S. Appl. No. 15/965,785 dated Jun. 9, 2021, 13 pages.
Advisory Action received for U.S. Appl. No. 15/965,800, dated Feb. 17, 2021, 4 pages.
Final Office Action received for U.S. Appl. No. 15/965,800, dated Nov. 5, 2021, 39 pages.
Final Office Action received for U.S. Appl. No. 15/965,799, dated Apr. 6, 2022, 24 pages.
Advisory Action received for U.S. Appl. No. 15/965,800, dated Apr. 17, 2020, 3 pages.
Advisory Action received for U.S. Appl. No. 15/965,800, dated Feb. 9, 2022, 3 pages.
Corrected Advisory Action received for U.S. Appl. No. 15/965,800, dated Apr. 8, 2022, 2 pages.
Non Final Office Action received for U.S. Appl. No. 17/497,778, dated Oct. 26, 2022, 67 pages.
Advisory Action received for U.S. Appl. No. 17/497,778, dated Apr. 27, 2023, 3 pages.
Advisory Action received for U.S. Appl. No. 15/965,799, dated May 15, 2023, 4 pages.
Polvi et al., "Handheld Guides in Inspection Tasks: Augmented Reality versus Picture", IEEE Transactions on Visualization and Computer Graphics, vol. 24, No. 7, 2017, pp. 2118-2128.
Advisory Action received for U.S. Appl. No. 15/965,800, dated Apr. 14, 2023, 3 pages.
Final Office Action received for U.S. Appl. No. 15/965,799, dated Mar. 2, 2023, 28 pages.
Final Office Action received for U.S. Appl. No. 15/965,800, dated Feb. 2, 2023, 44 pages.
Final Office Action received for U.S. Appl. No. 17/497,778, dated Feb. 27, 2023, 45 pages.
Advisory Action received for U.S. Appl. No. 15/965,799, dated Jul. 18, 2023, 7 pages.
Notice of Allowance received for U.S. Appl. No. 15/965,799, dated Jul. 26, 2023, 10 pages.
Non Final Office Action received for U.S. Appl. No. 17/497,778, dated Aug. 14, 2023, 53 pages.

* cited by examiner

| Time 535 | Host 536 | Source 537 | Source Type 538 | Event 539 |
|---|---|---|---|---|
| 10/10/2000 1:55 p.m. | www1 | access.log | access_combined | 127.0.0.1 - frank [10/Oct/2000:13:55:36 -0700] "GET /apache.gif HTTP/1.0" 200 2326 0.0947 |
| 10/10/2000 1:56 p.m. | www2 | access.log | access_combined | 127.0.0.1 - bob [10/Oct/2010:13:56:36 -0700] "GET /mickey_mouse.gif HTTP/1.0" 200 2980 0.0899 |
| 10/10/2000 1:57 p.m. | www2 | access.log | access_combined | 127.0.0.1 - carlos [10/Oct/2010:13:57:36 -0700] "GET /donald_duck.gif HTTP/1.0" 200 2900 0.0857 |
| 10/10/2000 1:58 p.m. | www2 | error.log | apache_error | [Sunday Oct 10 1:59:33 2010] [error] [client 127.10.1.1.015] File does not exist: /home/reba/public_html/images/daffy_duck.gif |

| Data Summary | | | |
|---|---|---|---|
| Hosts (5) \ Sources (8) \ Sourcetypes (3) | | | |
| filter | | | |
| Host ⌄ | Count ⌄ | Last Update ⌄ | |
| mailsv | 9,829 | 4/29/14 1:32:47.000 PM | |
| vendor_sales | 30,244 | 4/29/14 1:32:46.000 PM | |
| www1 | 24,221 | 4/29/14 1:32:44.000 PM | |
| www2 | 22,595 | 4/29/14 1:32:47.000 PM | |
| www3 | 22,975 | 4/29/14 1:32:45.000 PM | |

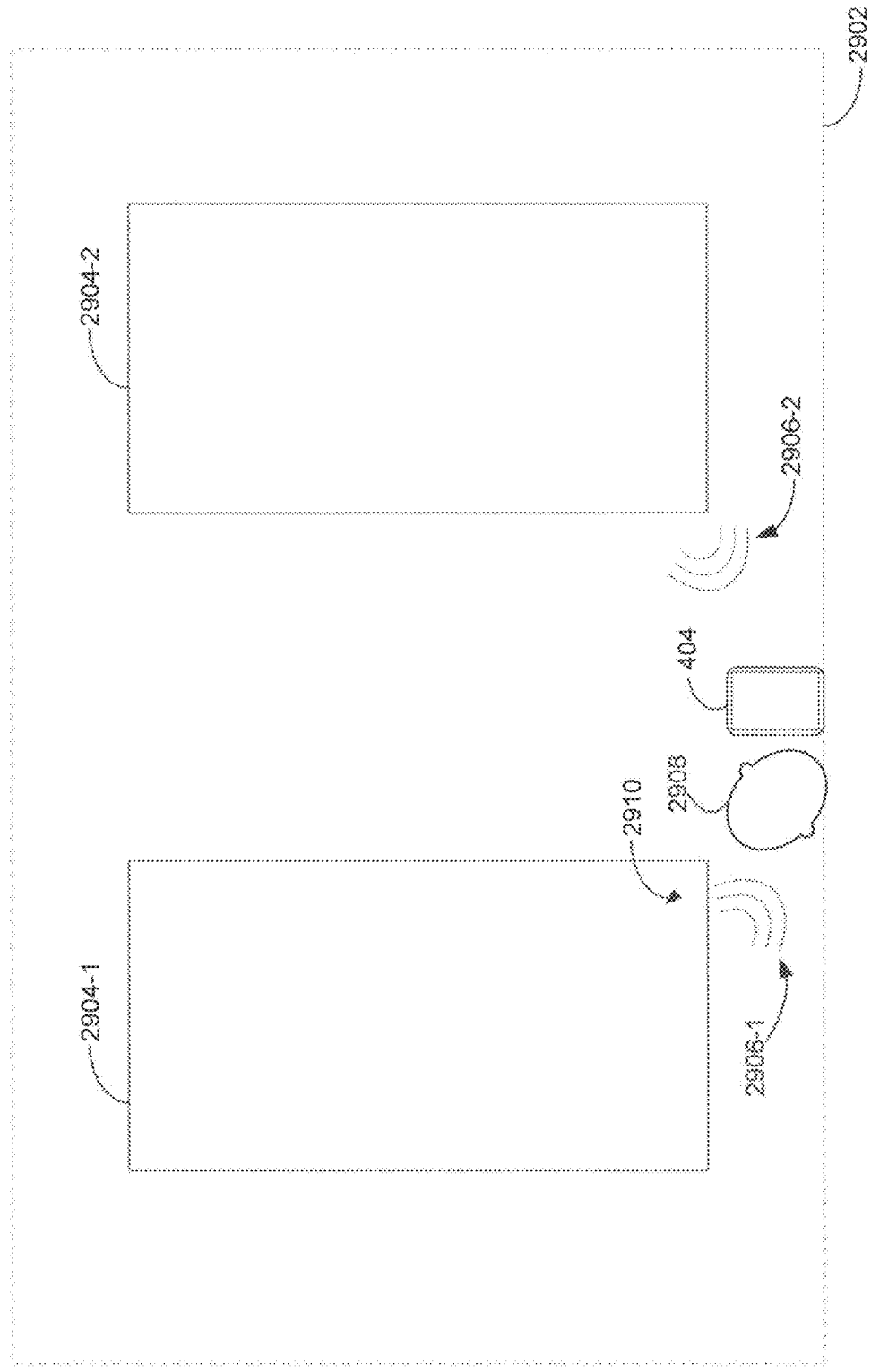

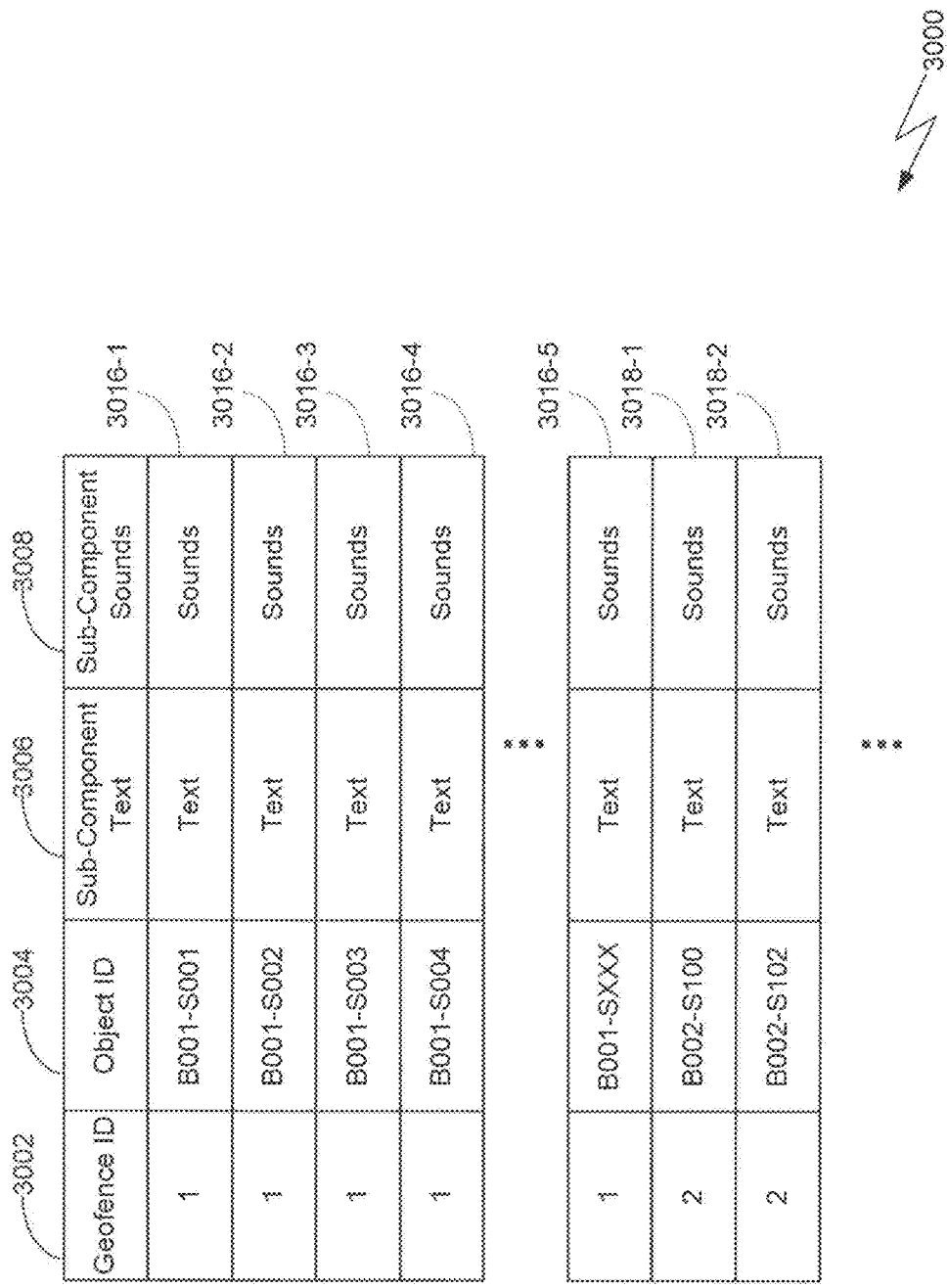

GEOFENCE-BASED OBJECT IDENTIFICATION IN AN EXTENDED REALITY ENVIRONMENT

CROSS-REFERENCE TO RELATED APPLICATIONS

This application is a continuation of the co-pending U.S. patent application titled, "GEOFENCE-BASED OBJECT IDENTIFICATION IN AN EXTENDED REALITY ENVIRONMENT," filed on Apr. 27, 2018 and having Ser. No. 15/965,799. The subject matter of this related application is hereby incorporated herein by reference.

BACKGROUND

Field of the Embodiments

The present invention relates generally to computer networks and, more specifically, to geofence-based object identification in an extended reality environment.

Description of the Related Art

In industrial environments, various types of machines and other equipment are commonly implemented to store data and/or to perform various tasks. These machines may include rack-mounted servers, fixed location and mobile industrial robots, automated test equipment, and display devices. Large industrial environments may include dozens, hundreds, or even thousands of individual machines.

Typically, each machine monitors certain metrics in real-time, where the metrics may relate to various aspects of the status and/or performance of the machine or of a larger operating environment. Such metrics may include central processing unit (CPU) utilization, memory utilization, disk storage utilization, and operating temperature. An information technology (IT) specialist or other professional may monitor these metrics via a remote display that interfaces with the machines and/or with the larger operating environment. By monitoring appropriate metrics for each machine, the IT specialist may determine which machines are operating normally. Likewise, the IT specialist may determine that one or more metrics are outside the normal operating range for the corresponding machine.

If one or more metrics for a particular machine move outside of a normal operating range, then a technician, such as an IT specialist, may intervene to take an appropriate action. For example, if one or more servers are operating at a very high CPU or memory utilization, then additional servers could be initialized to share the processing or memory requirements of the overloaded servers. Additionally, if one or more machines are operating at an excessive temperature, then such machines could be powered off to allow the machines to cool down. The technician could then effect any needed repairs or replacements.

One problem with the approach set forth above is that the technician may have difficulty locating the physical machines that require attention, particularly in large industrial environments having hundreds or thousands of machines. As a result, the technician may waste a significant amount of time locating machine(s) that are operating outside of a normal range. In the meantime, the affected machine(s) may be operating at less than optimal efficiency. In extreme cases, an affected machine may be permanently damaged if allowed to operate outside of a normal range for an extended period of time. These conditions may lead to increased operating and repair costs, particularly as the number of machines in an industrial environment increases.

As the foregoing illustrates, what is needed in the art are more effective ways for identifying one or more machines in an operating environment and accessing information associated with those machines.

SUMMARY

A mobile device that includes a camera and an extended reality software application program is employed by a user (e.g., a technician or other professional) in an operating environment, such as an industrial environment. Machines located within the industrial environment periodically measure the values of various metrics in real-time and transmit the values of the metrics to a data intake and query system. The data intake and query system stores the received metric values as event data for later retrieval. One or more objects within a geofence may be identified. A device crosses within the geofence and acquires sensor data associated with an object within the geofence. The sensor data may include image data and/or audio data. The device or a server system may then determine an object identifier associated with the object based on a comparison of the sensor data with data associated with object identifiers corresponding to objects within the geofence. Based on the object identifier, data associated with the object are obtained. The data associated with the object may be presented via the device (e.g., as an extended reality overlay over a view of the object in the device).

Various embodiments of the present application set forth a method for generating and displaying extended reality overlays for one or more machines included in an operating environment, such as an industrial environment. The method includes acquiring at least one location coordinate from a network-based sensor, where the network-based sensor is in communication with a data intake and query system. The method further includes acquiring, via a client device sensor that is coupled to a client computing device included in a production monitoring network and operating in an extended reality (XR) environment, sensor data associated with a first object that is positioned within a geofence associated with the at least one location coordinate. The method further includes facilitating determination that a first object identifier corresponds to the first object based on a comparison between the sensor data and data associated with a plurality of object identifiers, where each object identifier included in the plurality of object identifiers corresponds to a different object positioned within the geofence. The method further includes acquiring data associated with the first object based on the first object identifier, where the data is generated by executing a search of machine data stored in the data intake and query system, and wherein a visualization in the extended reality (XR) environment is based at least in part on the acquired data.

Other embodiments of the present invention include, without limitation, a computer-readable medium including instructions for performing one or more aspects of the disclosed techniques, as well as a computing device for performing one or more aspects of the disclosed techniques.

At least one advantage of the disclosed techniques is that a user is able to efficiently identify one or more machines that are operating outside of a normal range or that otherwise require attention. Such machines may be identified in less time relative to prior approaches. As a result, machines can be monitored and/or serviced more efficiently. Additionally, objects within a geofence can be accurately identified based on one or more types of sensor data. Accordingly, extended reality overlays can be generated on-the-fly, regardless of whether an optical data marker is included on a particular object.

BRIEF DESCRIPTION OF THE DRAWINGS

The patent or application file contains at least one drawing executed in color. Copies of this patent or patent application publication with color drawings will be provided by the Office upon request and payment of the necessary fee.

So that the manner in which the above recited features of the invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The present disclosure is illustrated by way of example, and not limitation, in the figures of the accompanying drawings, in which like reference numerals indicate similar elements and in which:

FIG. 1 is a block diagram of an example networked computer environment, in accordance with example embodiments;

FIG. 2 is a block diagram of an example data intake and query system, in accordance with example embodiments;

FIG. 3 is a block diagram of an example cloud-based data intake and query system, in accordance with example embodiments;

FIG. 4 is a block diagram of an example data intake and query system that performs searches across external data systems, in accordance with example embodiments;

FIG. 5A is a flowchart of an example method that illustrates how indexers process, index, and store data received from forwarders, in accordance with example embodiments;

FIG. 5B is a block diagram of a data structure in which time-stamped event data can be stored in a data store, in accordance with example embodiments;

Figure 4:
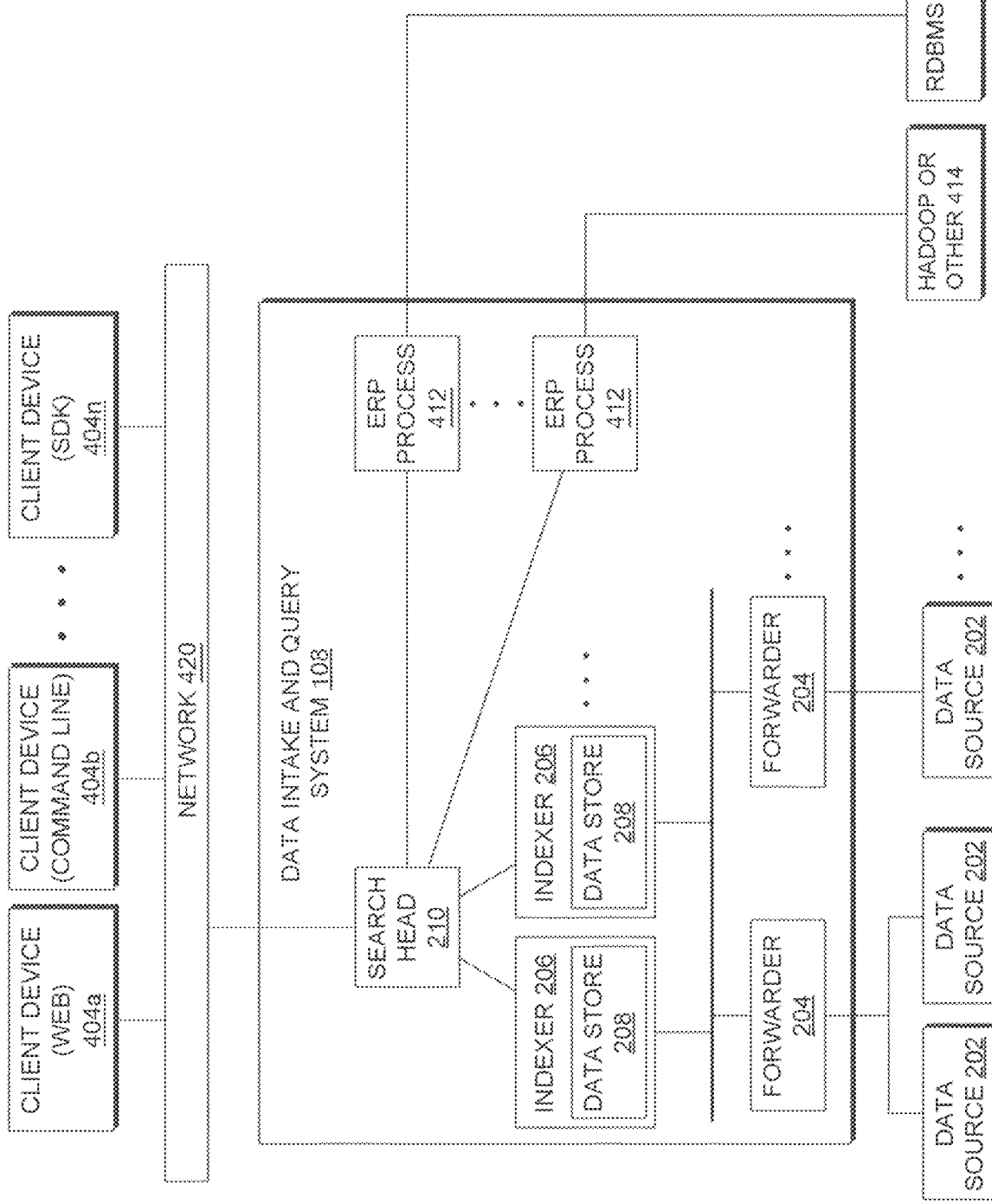
Figure 6A:
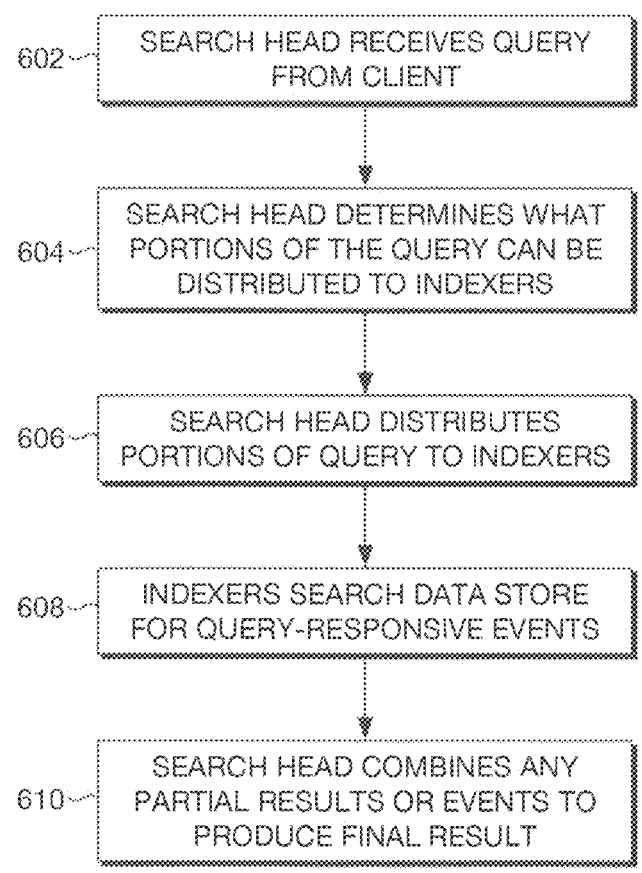
Figure 6B:
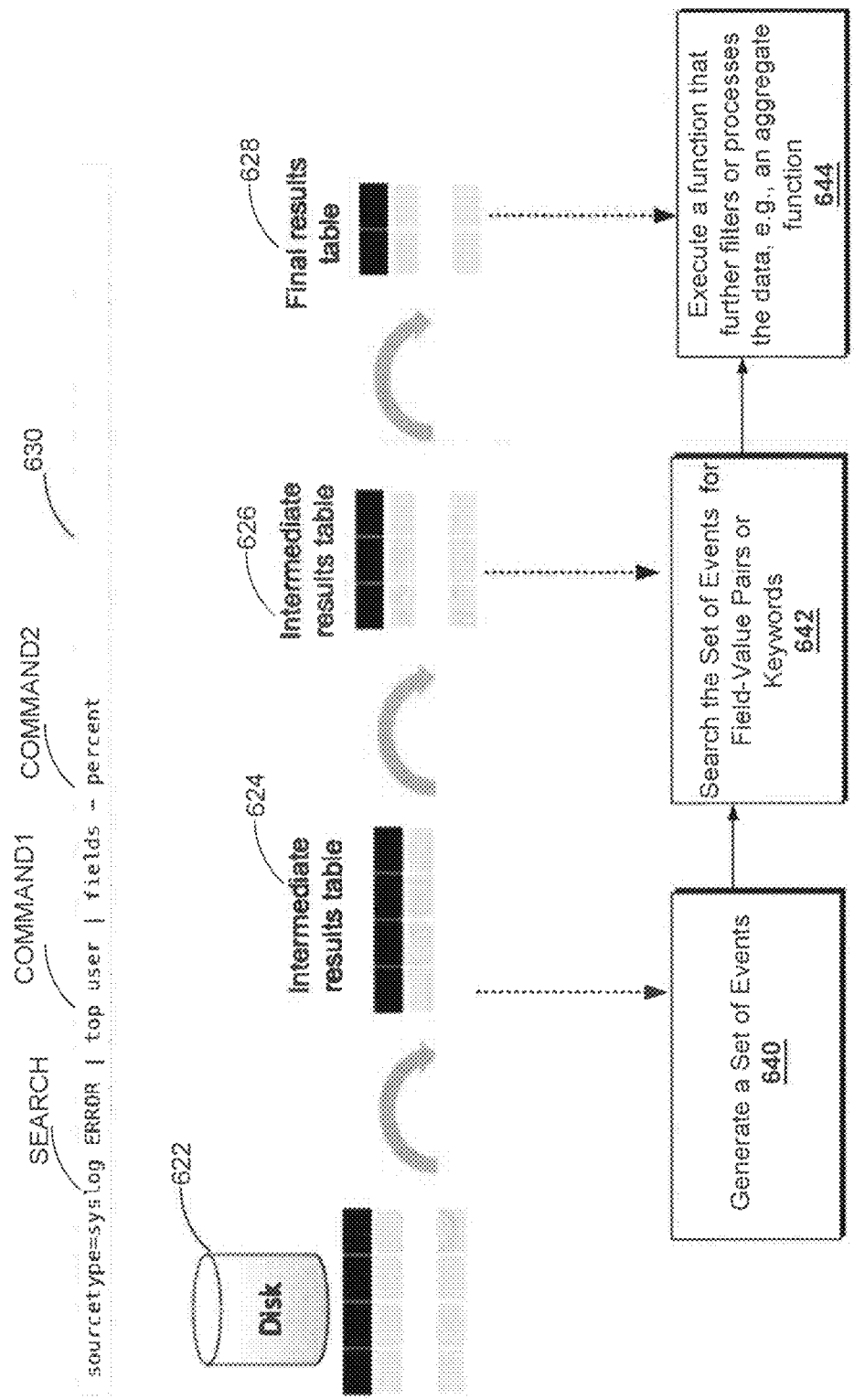
Figure 7A:
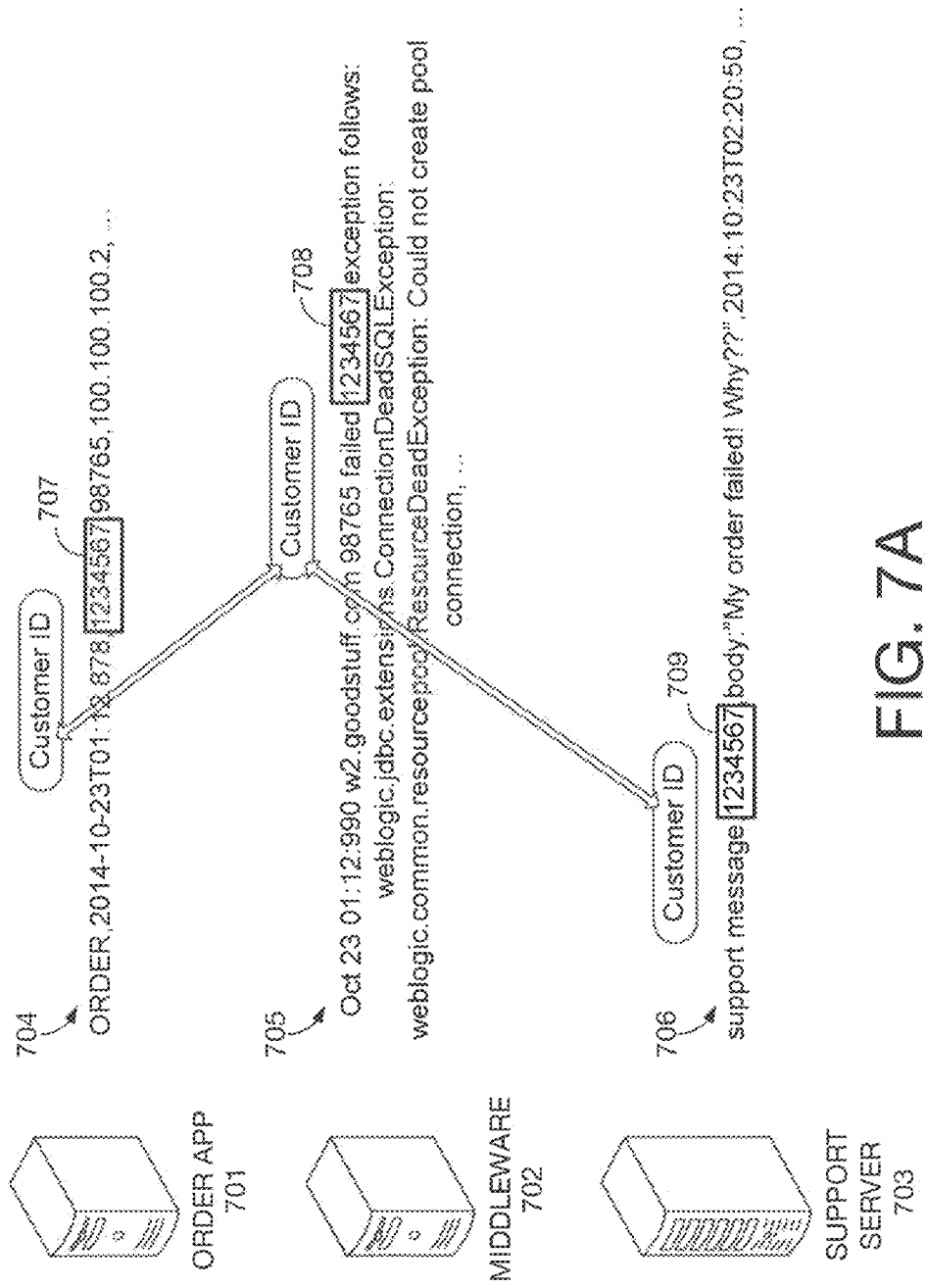
Figure 7B:
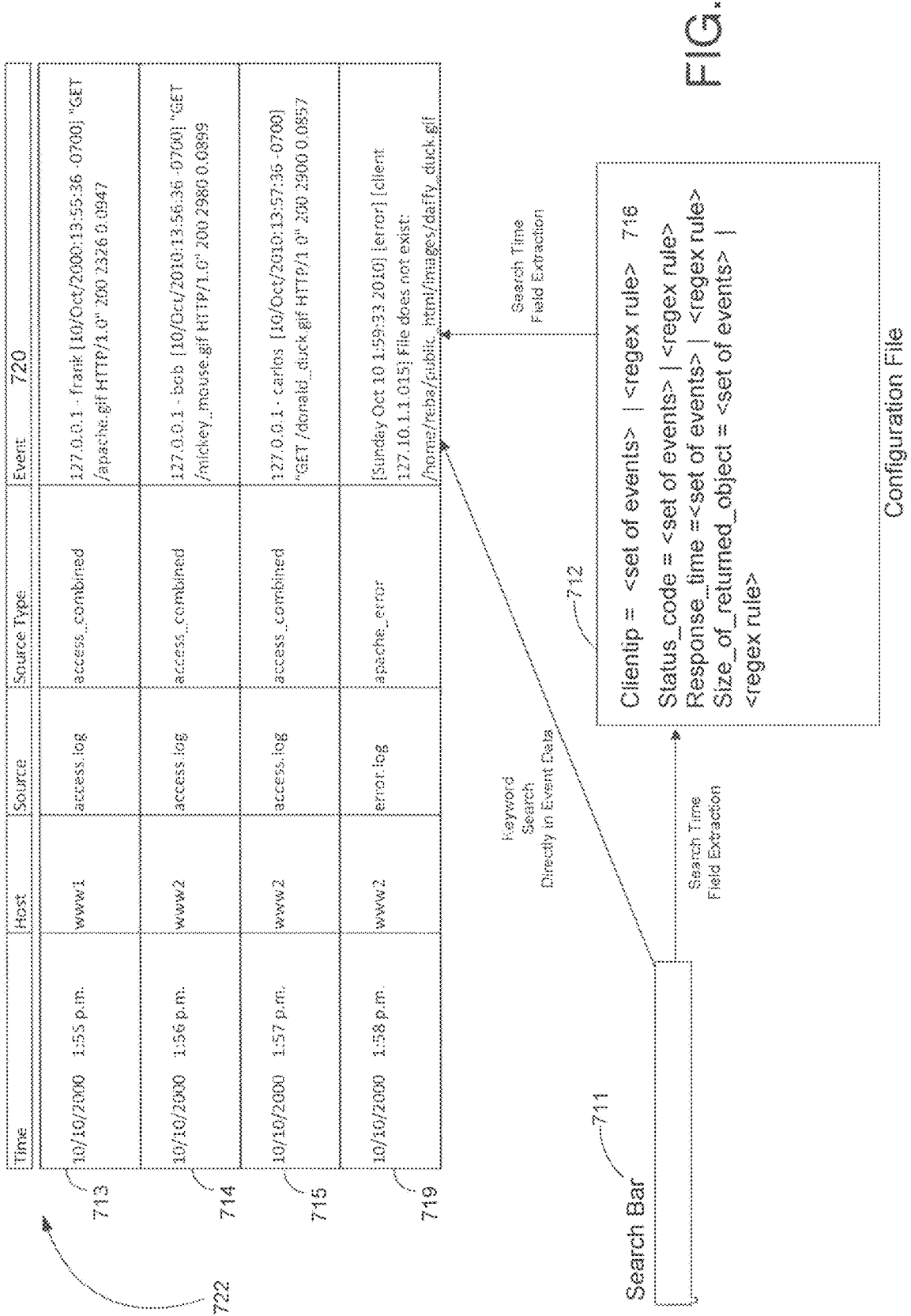
Figure 7C:
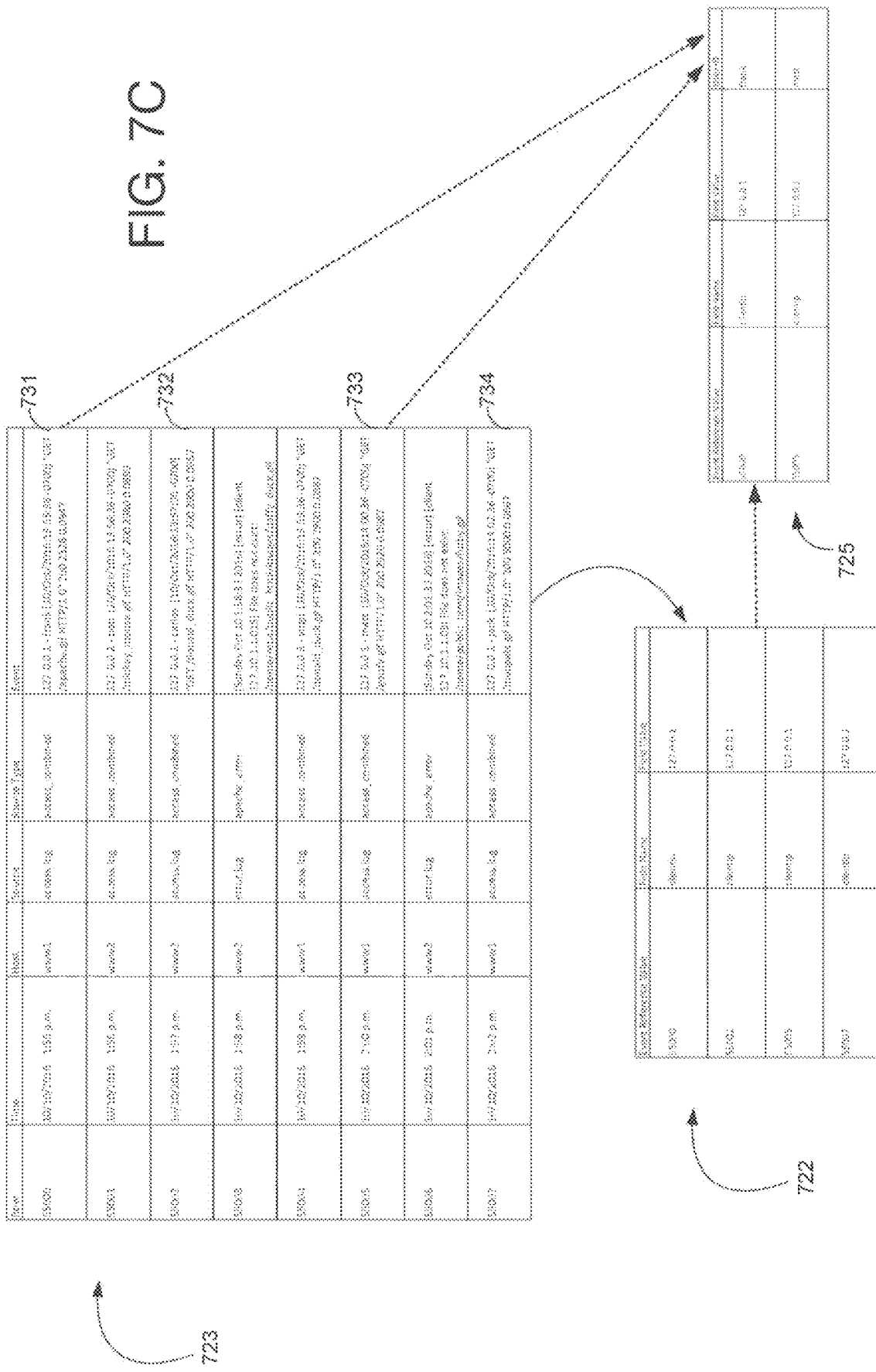
Figure 7D:
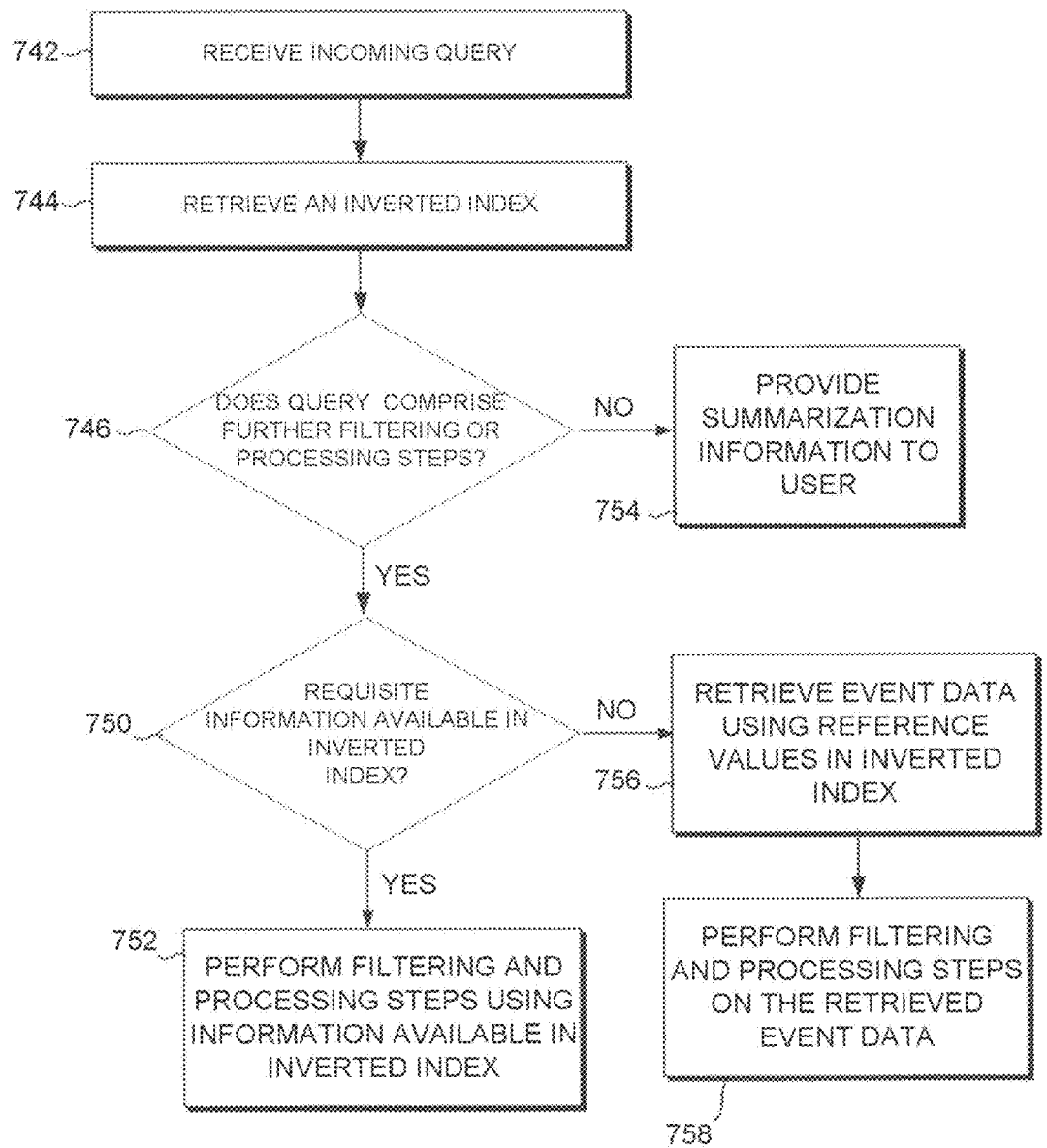
Figure 16:
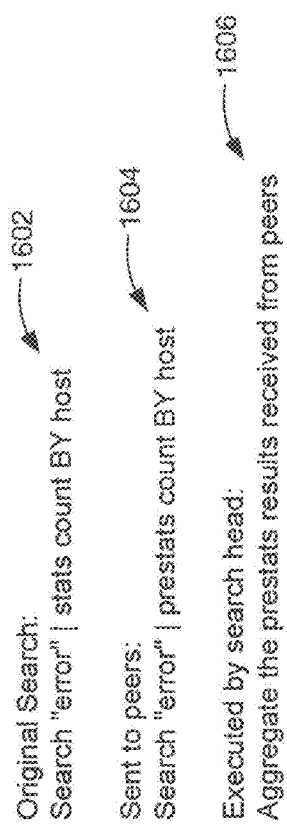
Figure 17A:
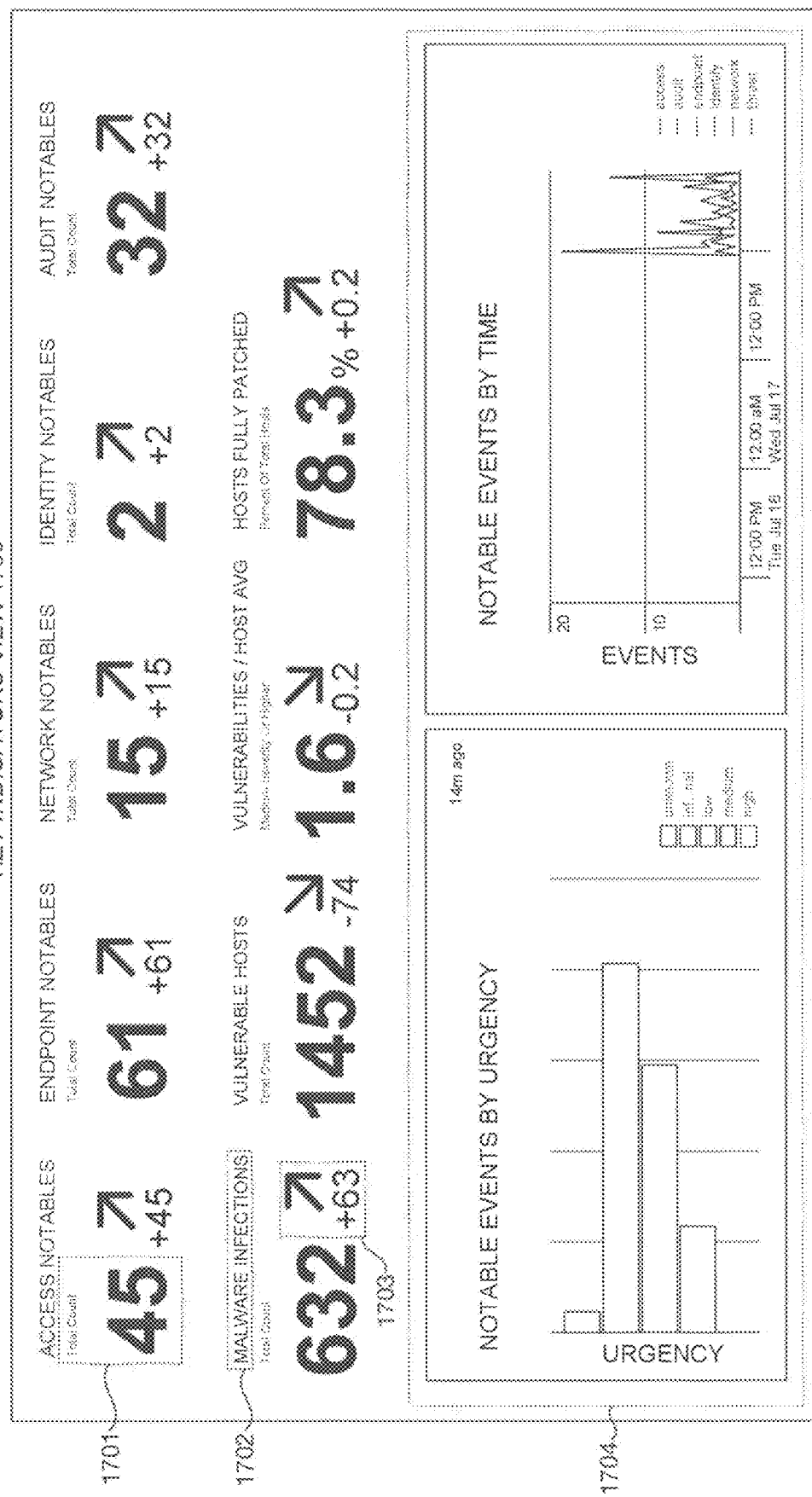
Figure 17B:
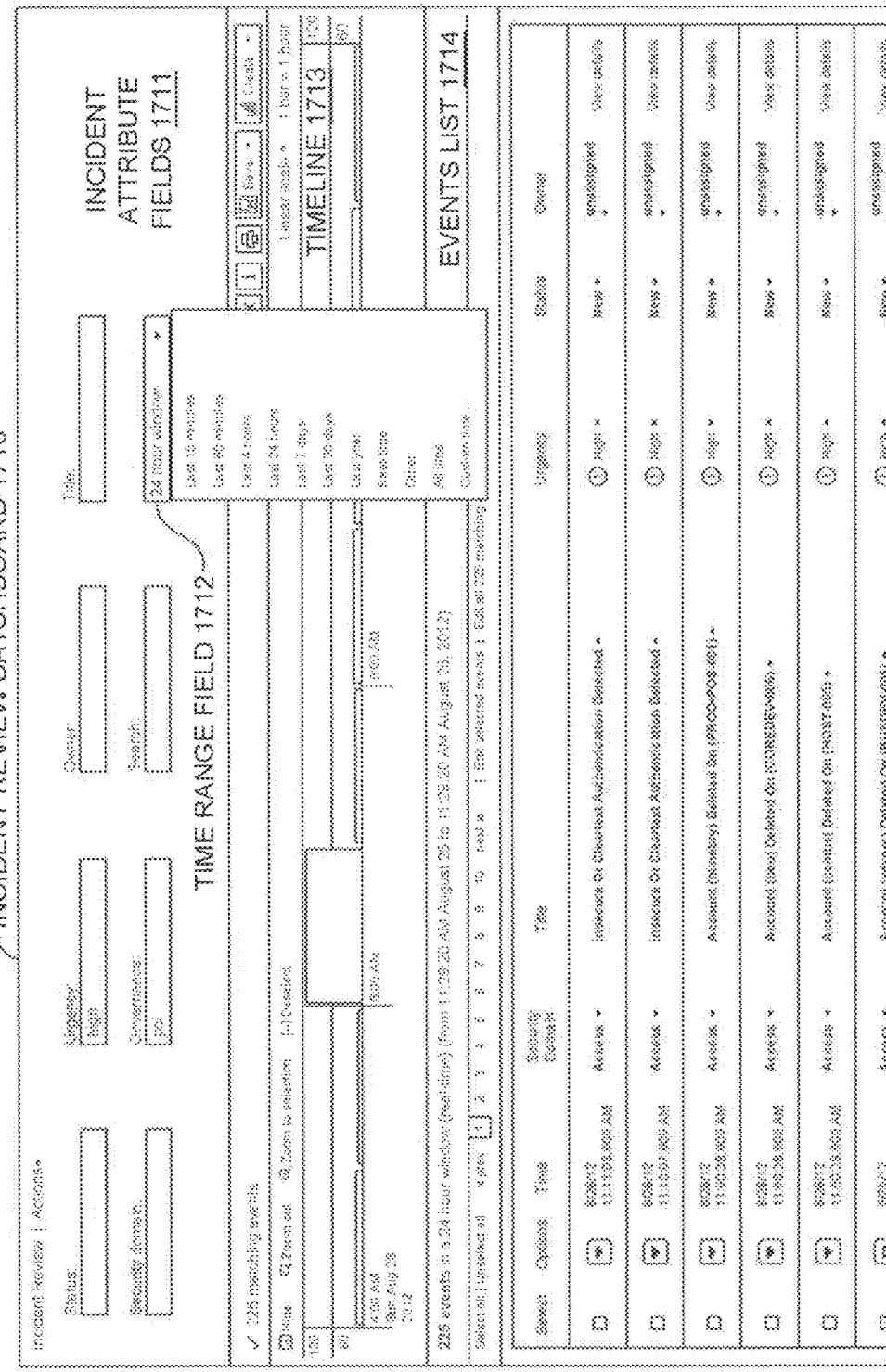
Figure 17C:
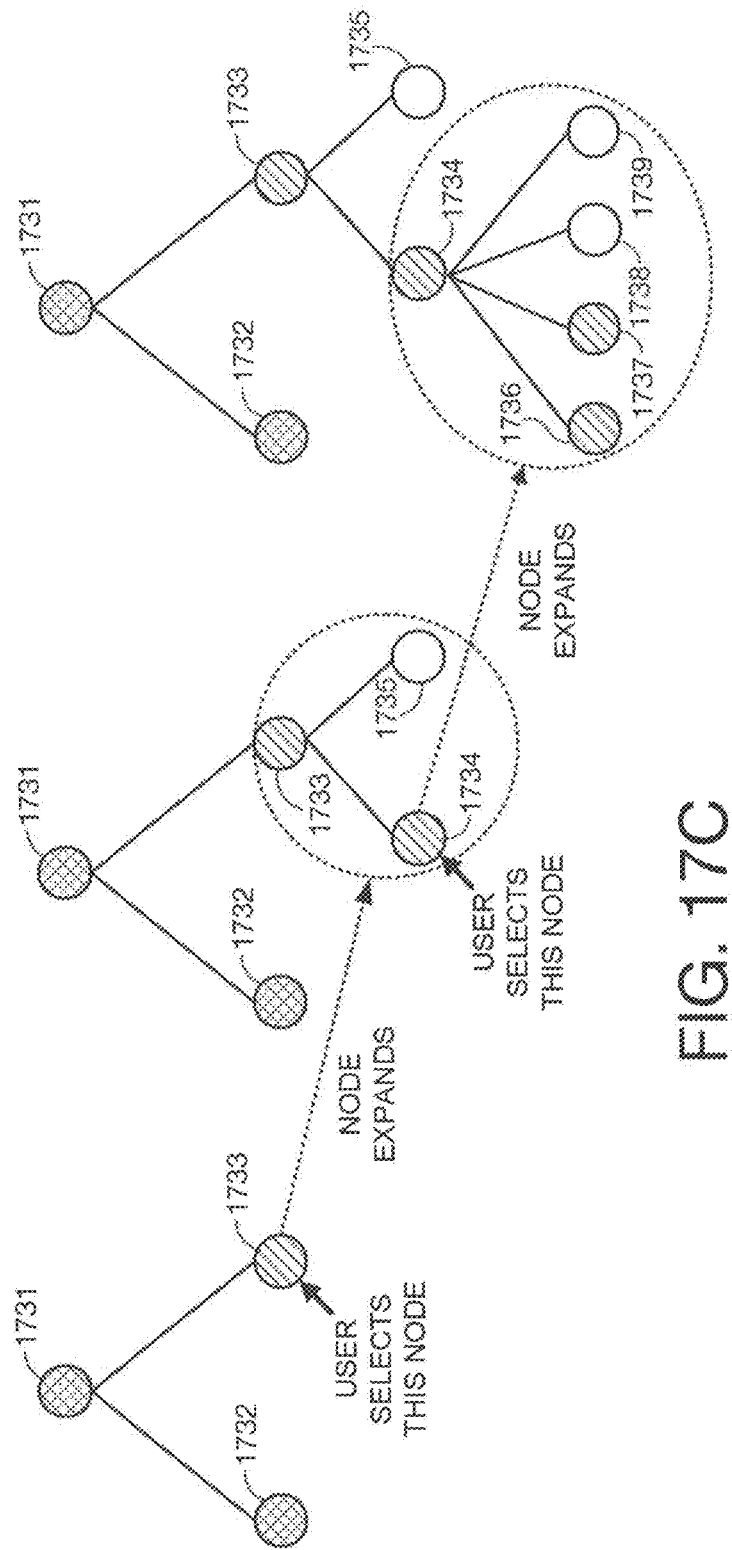
Figure 17D:
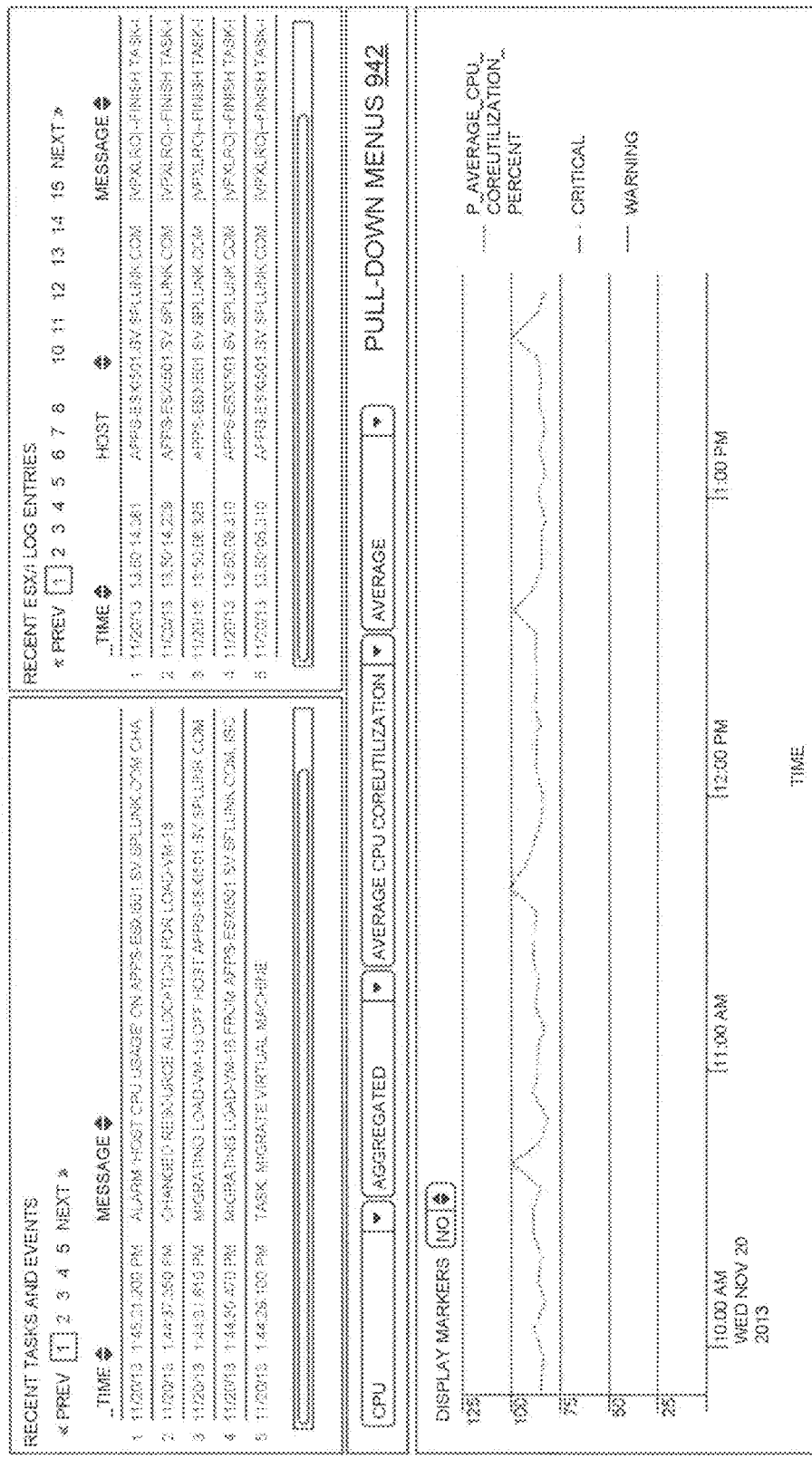
Figure 18A:
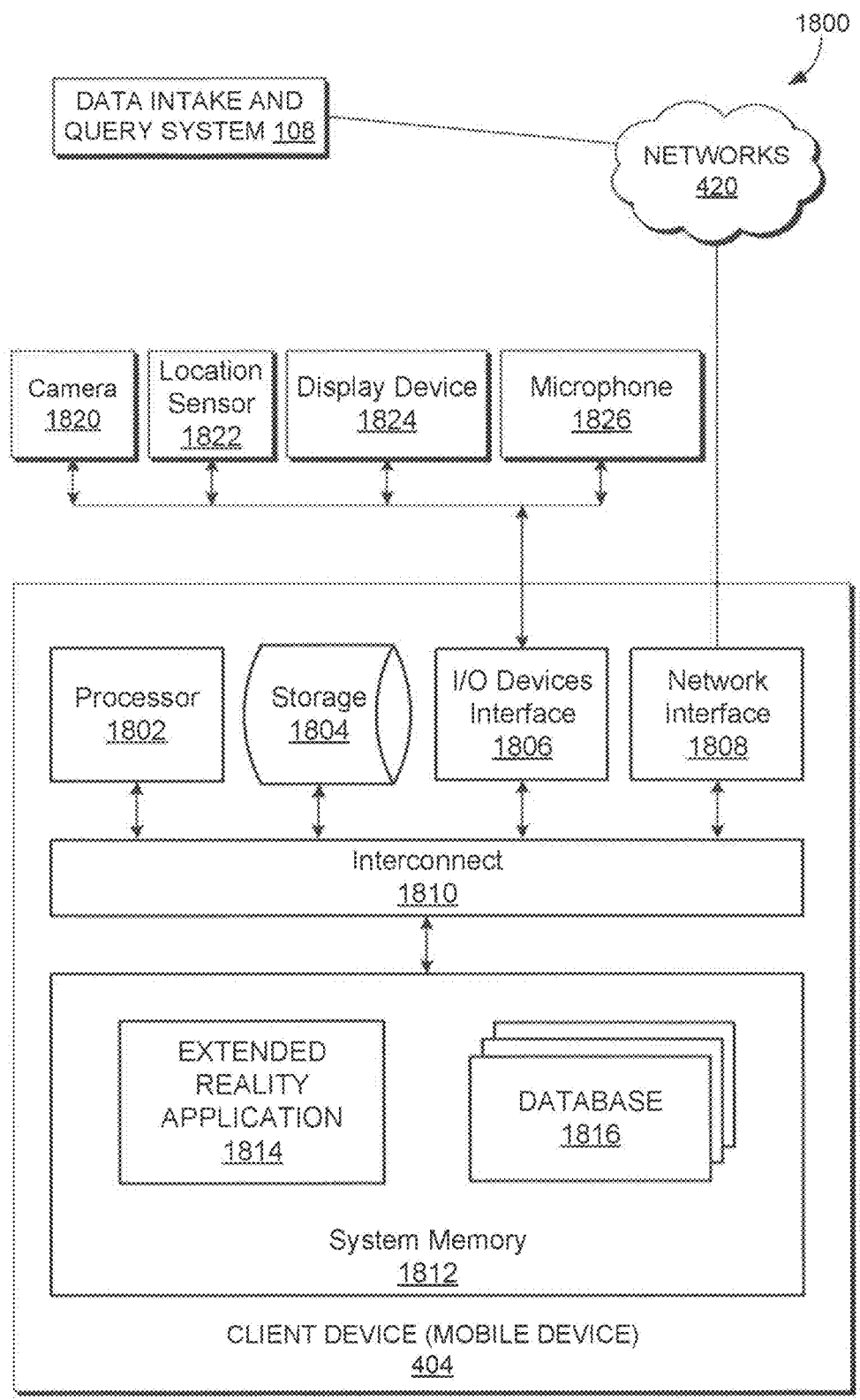
Figure 18B:
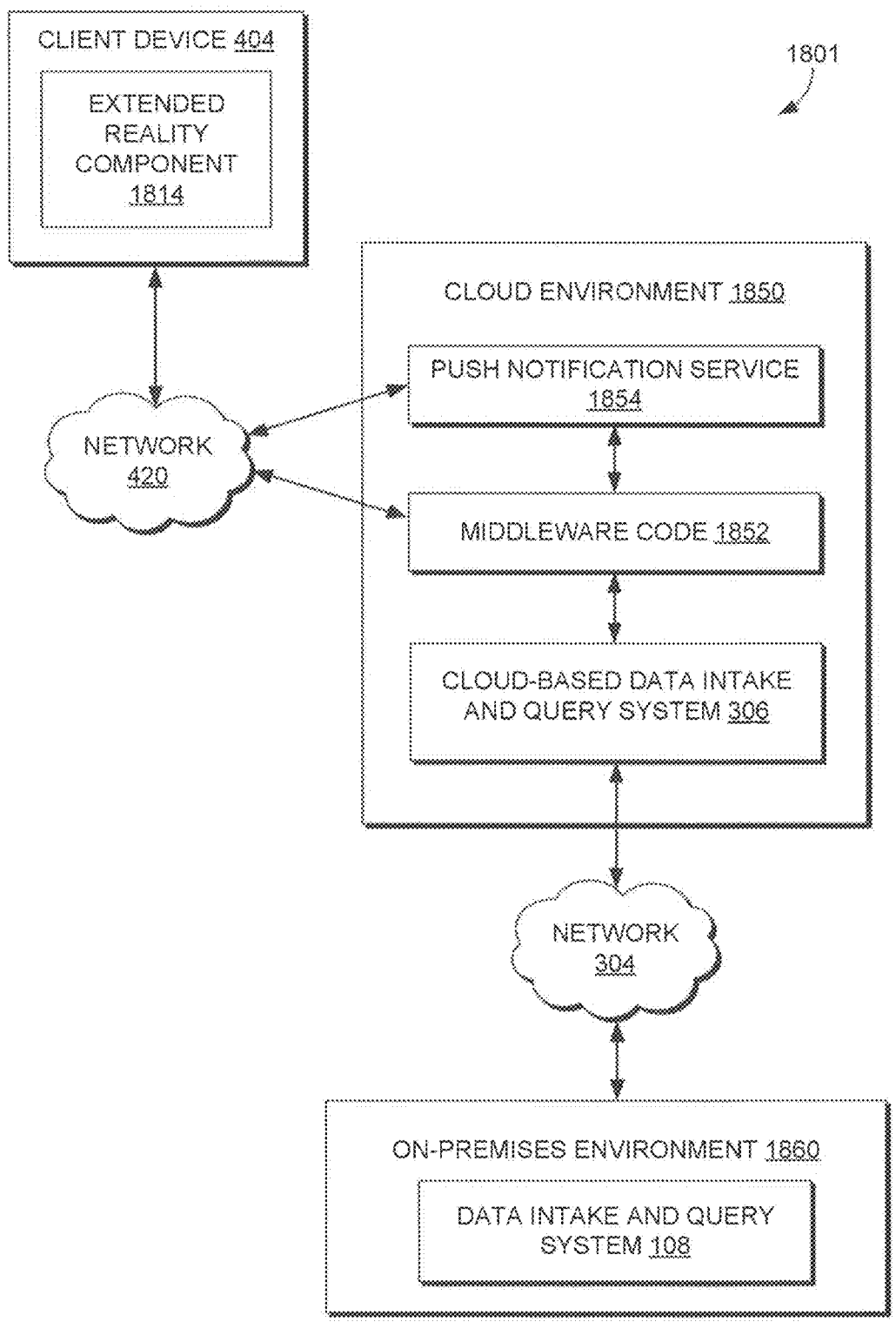
Figure 19:
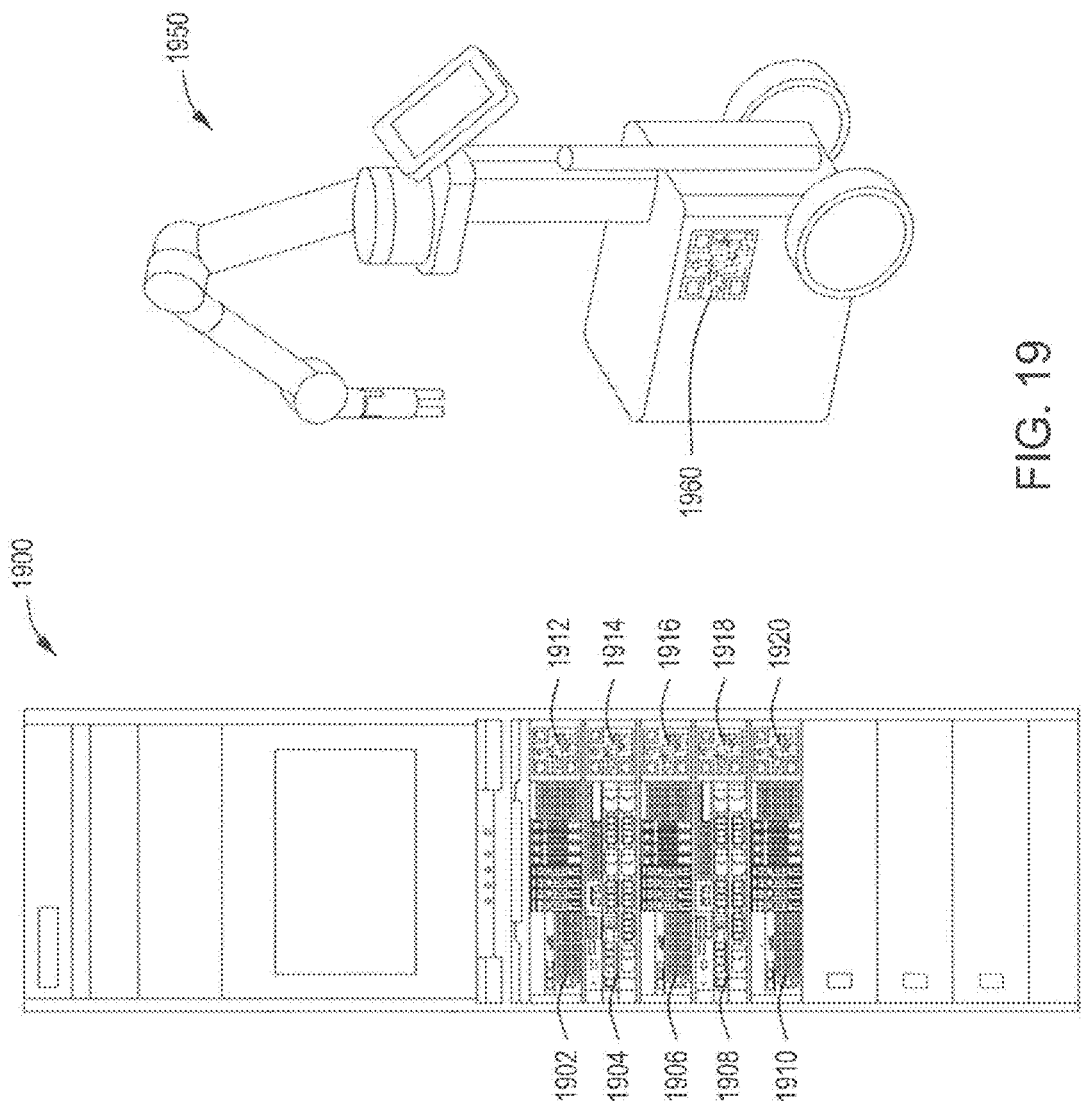
Figure 22A:
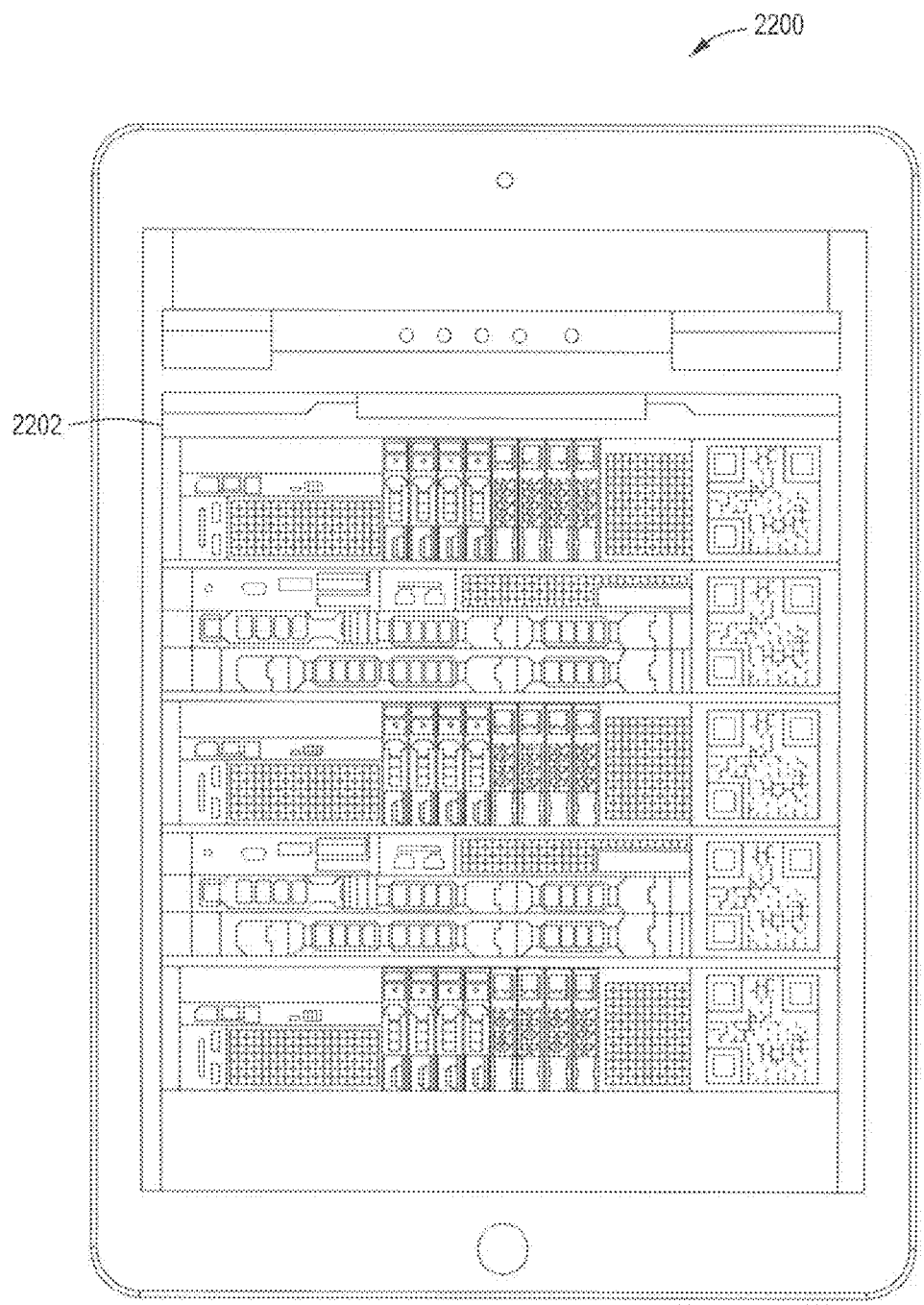
Figure 22B:
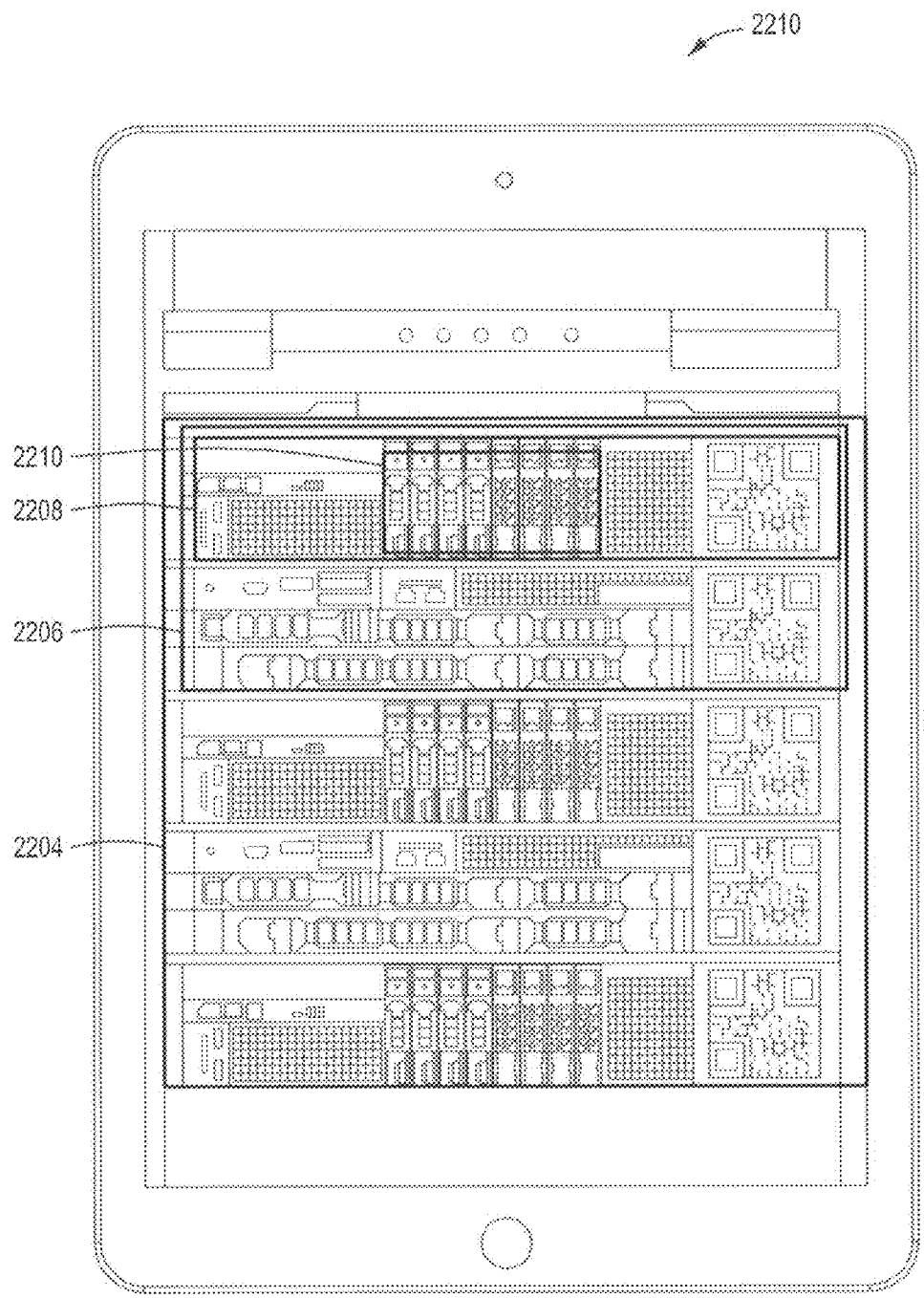
Figure 22C:
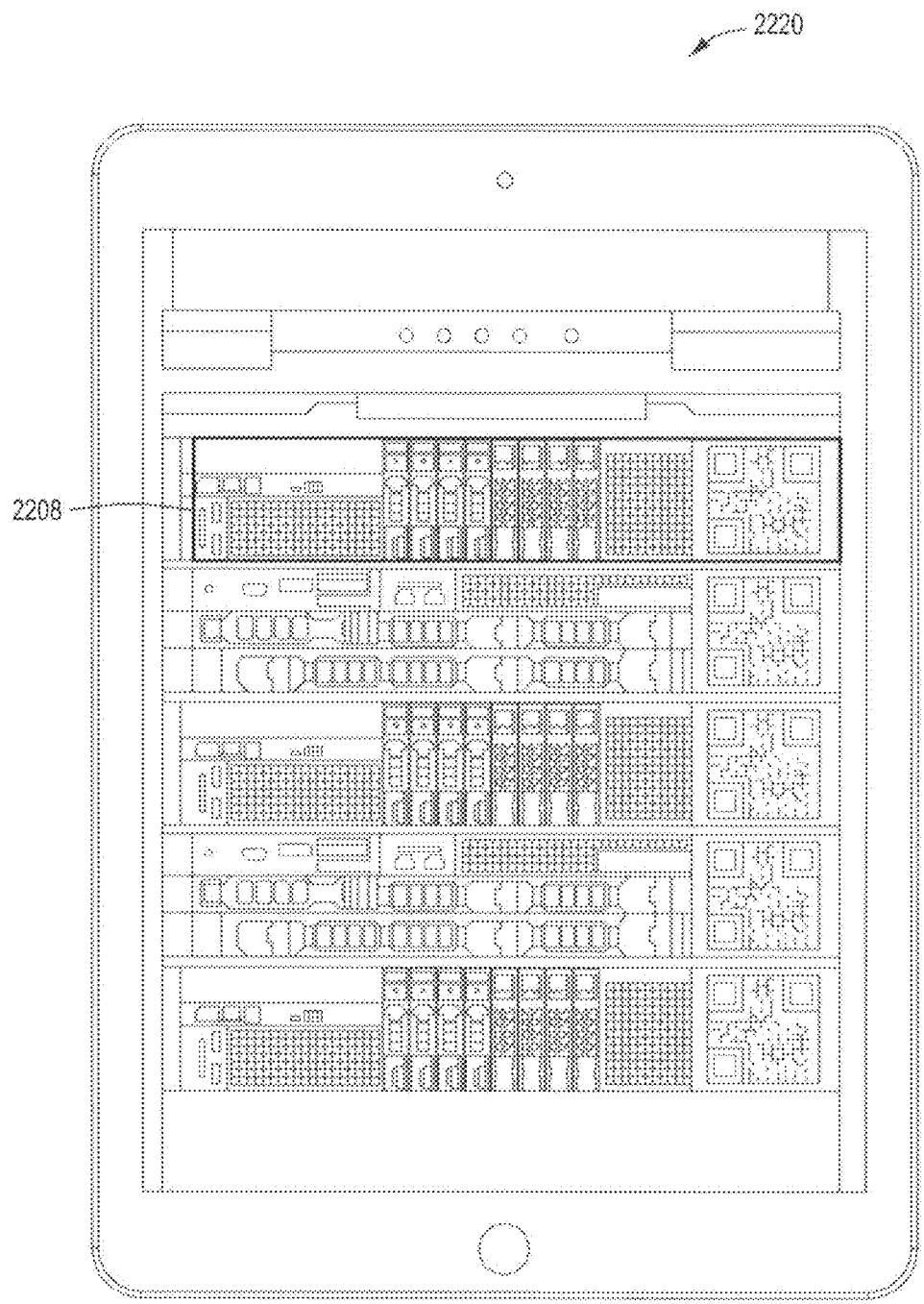
Figure 24A:
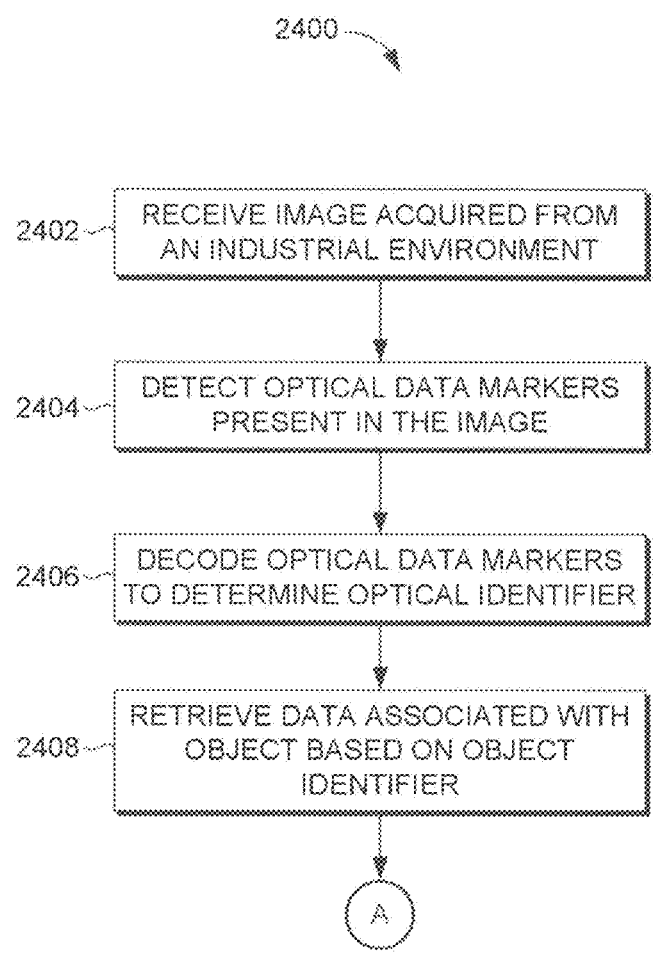
Figure 24B:
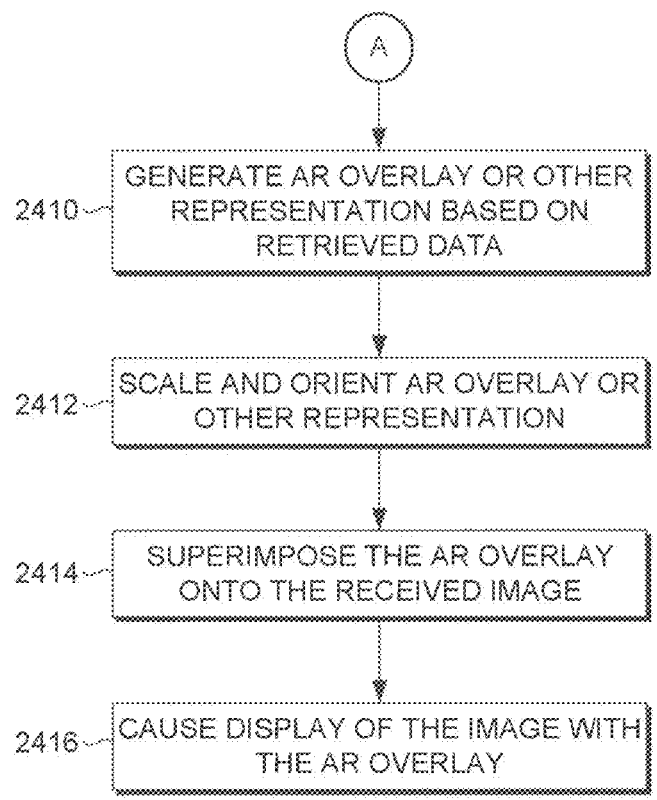
Figure 25:
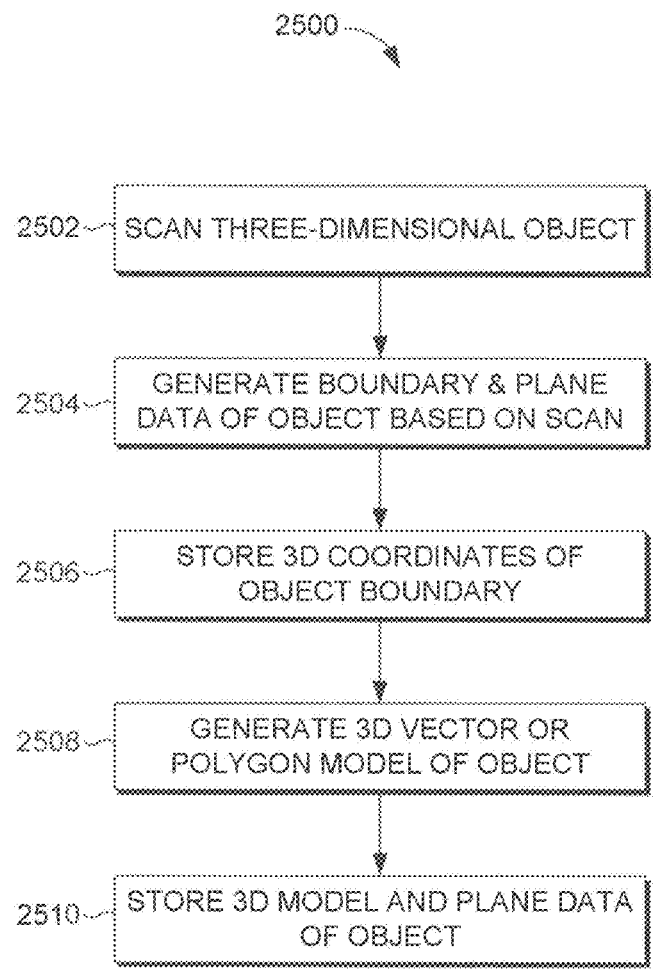
Figure 26:
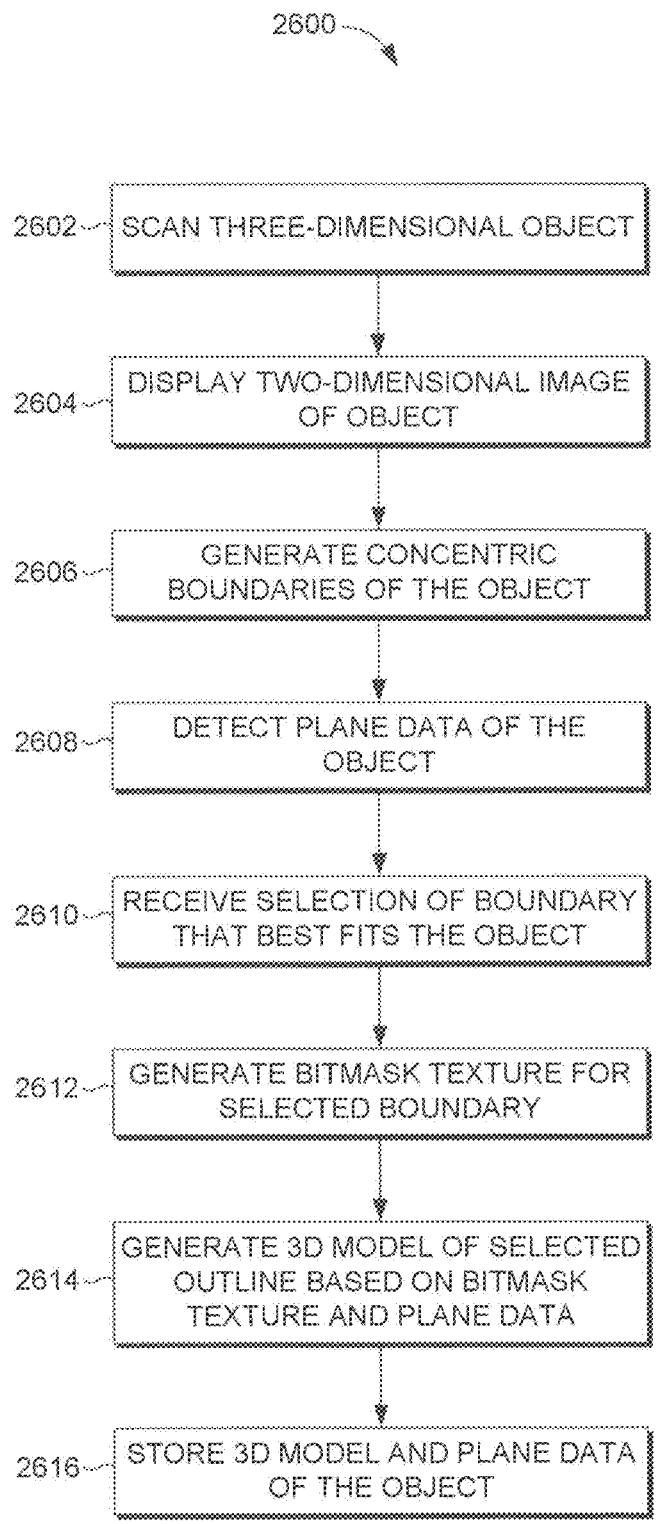
Figure 27A:
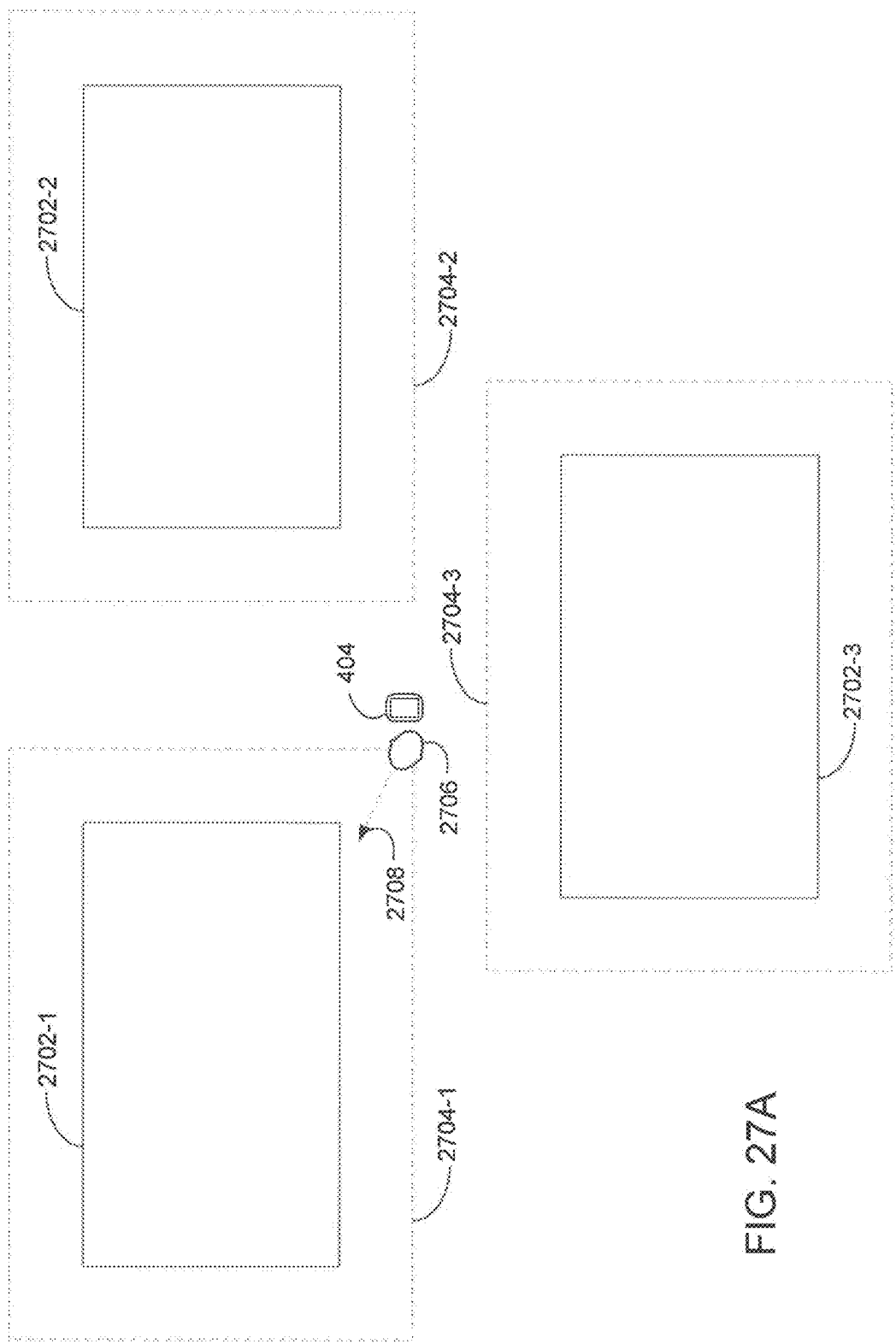
Figure 27B:
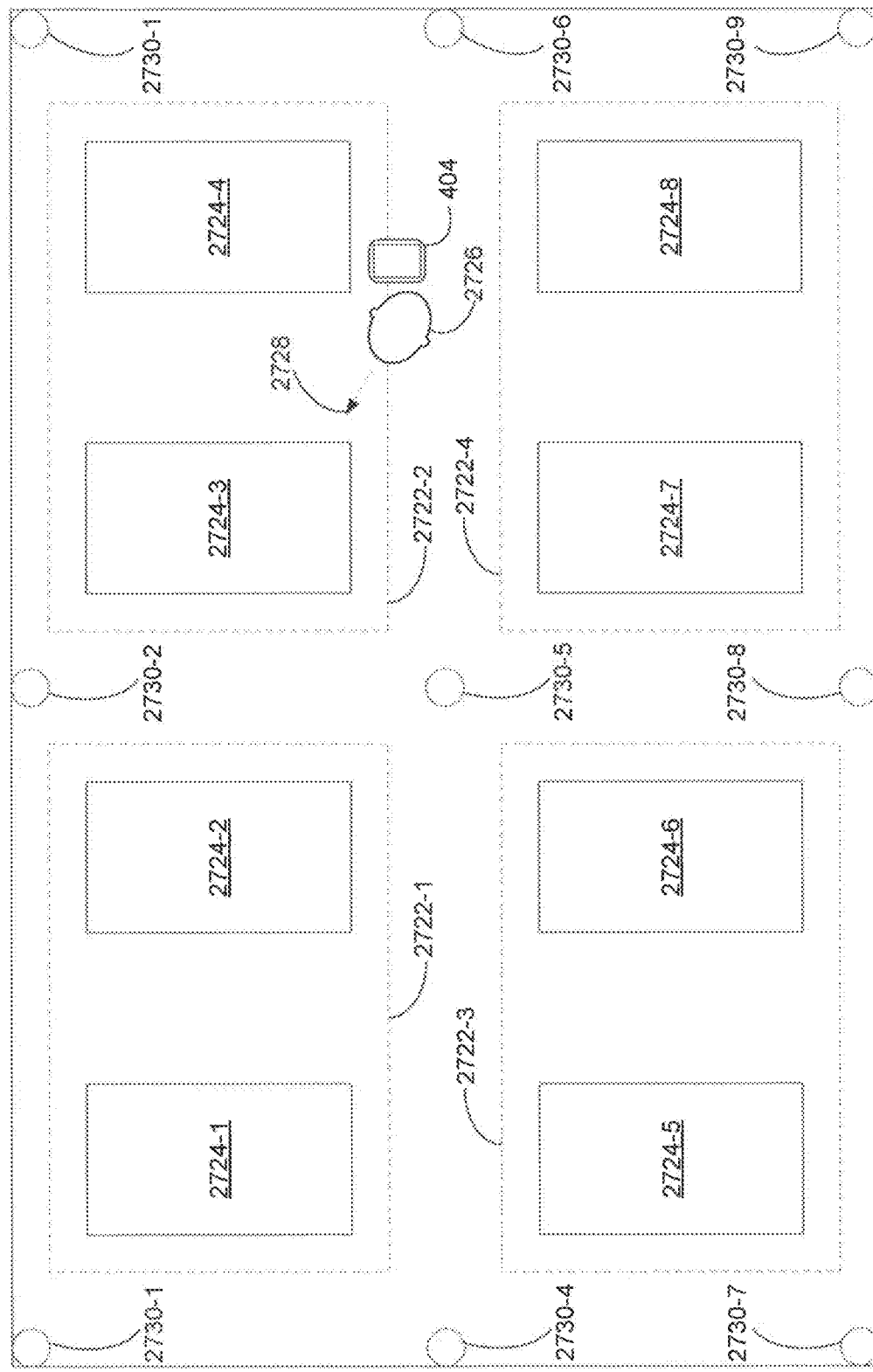
Figure 28A:
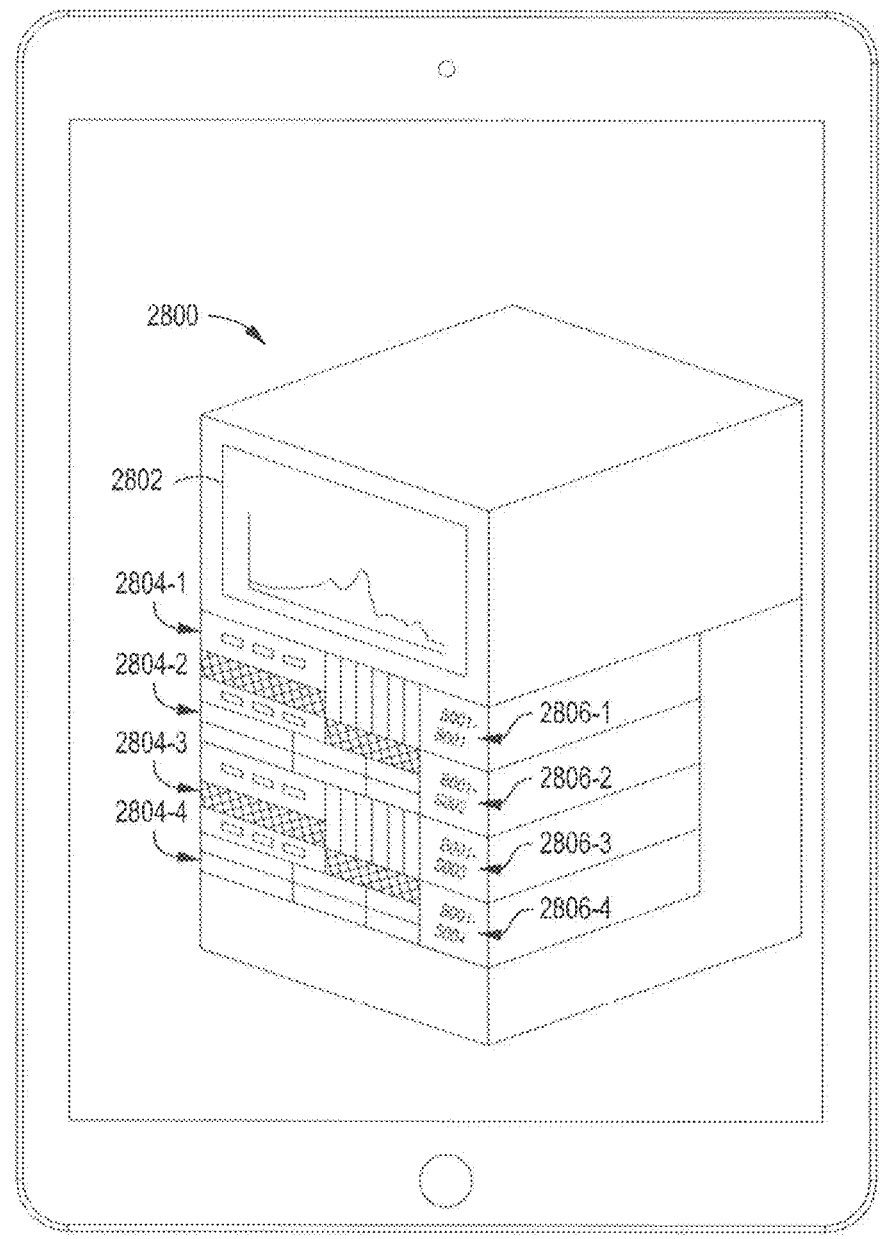
Figure 28B:
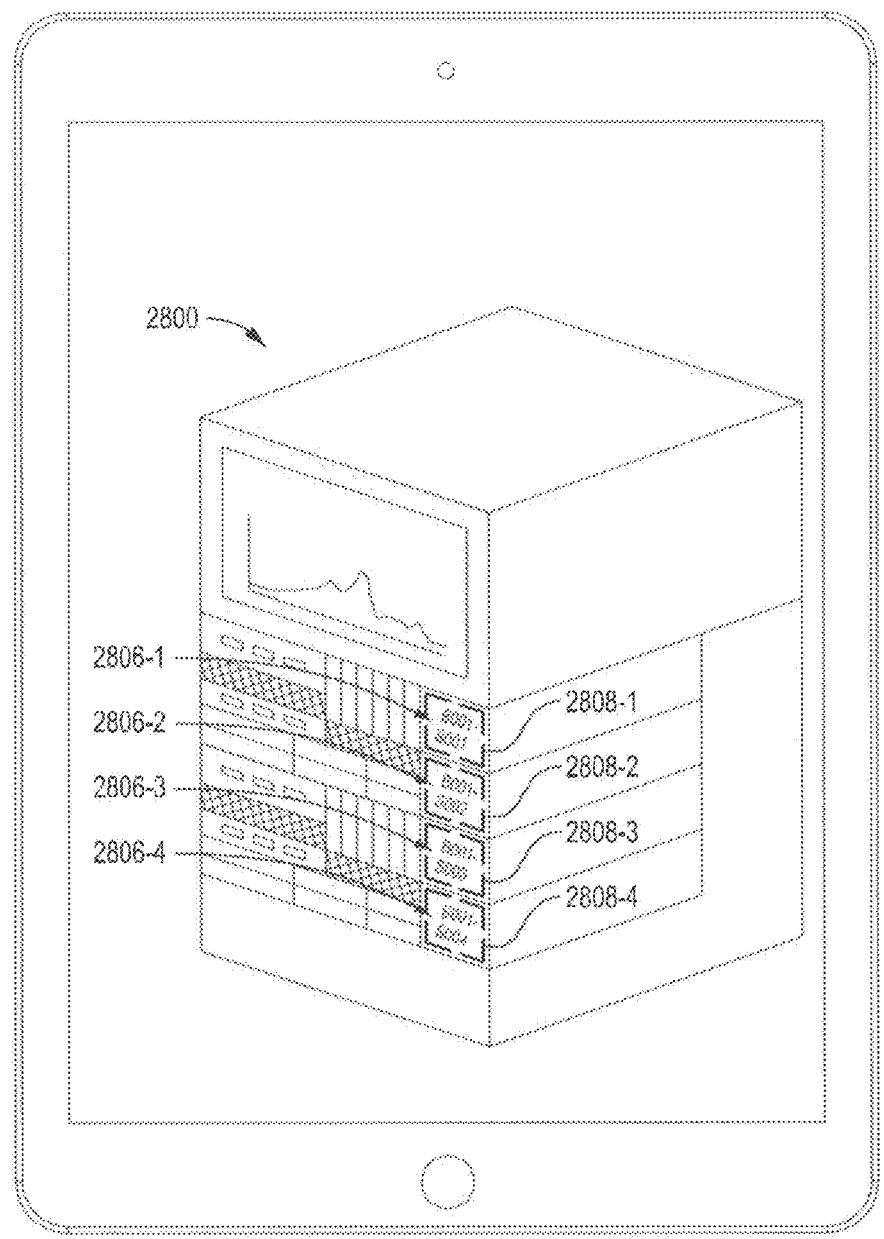
Figure 28C:
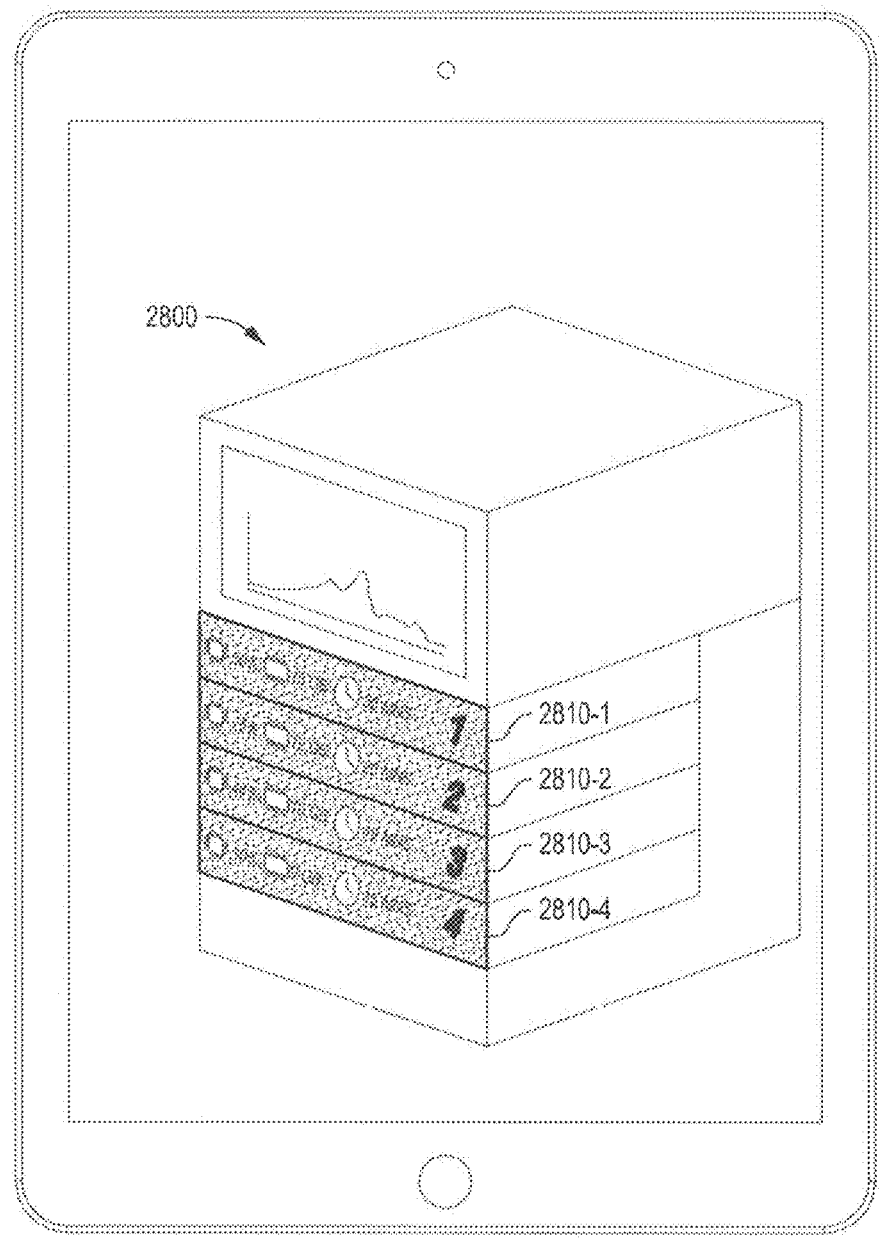
Figure 31:
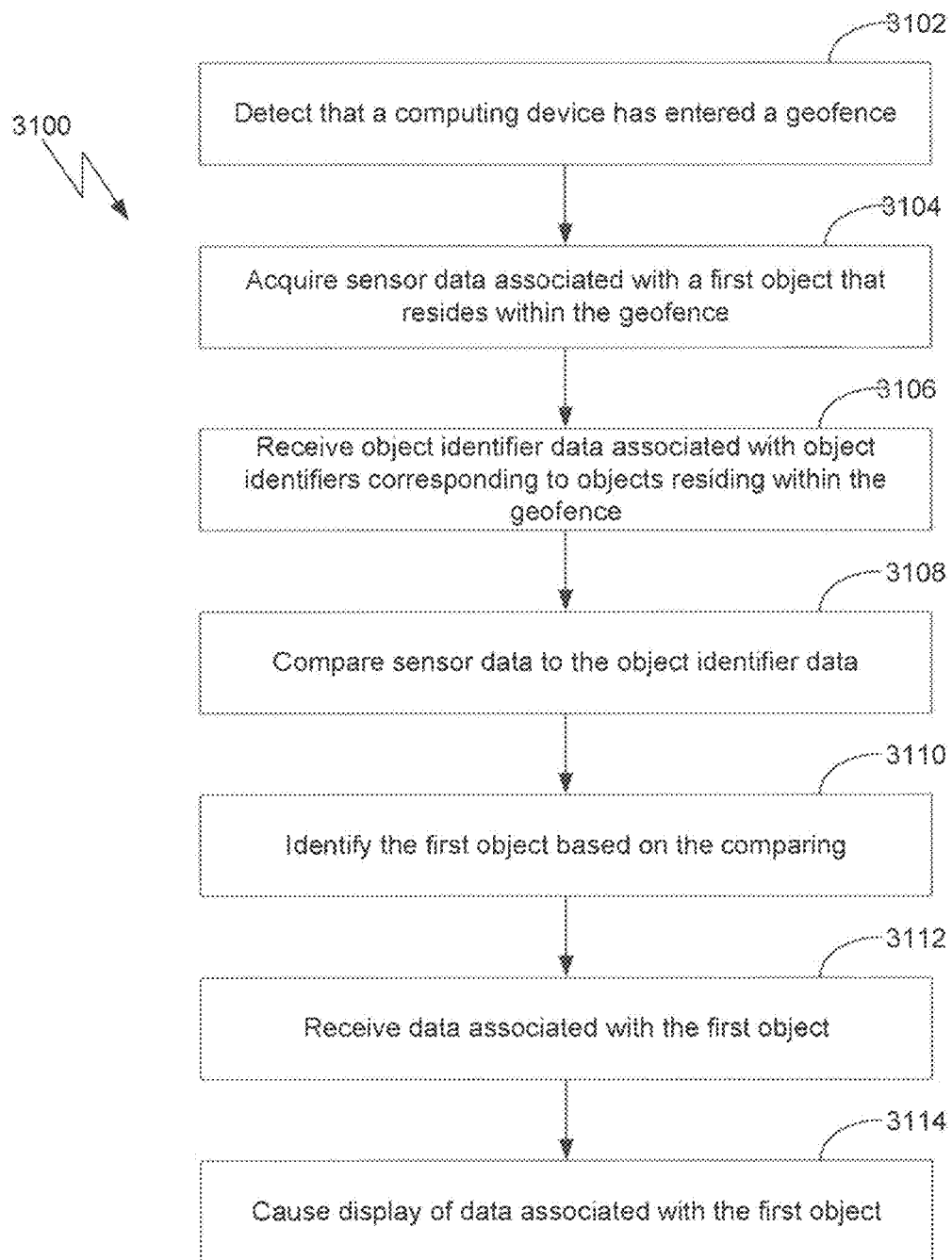
Figure 32:
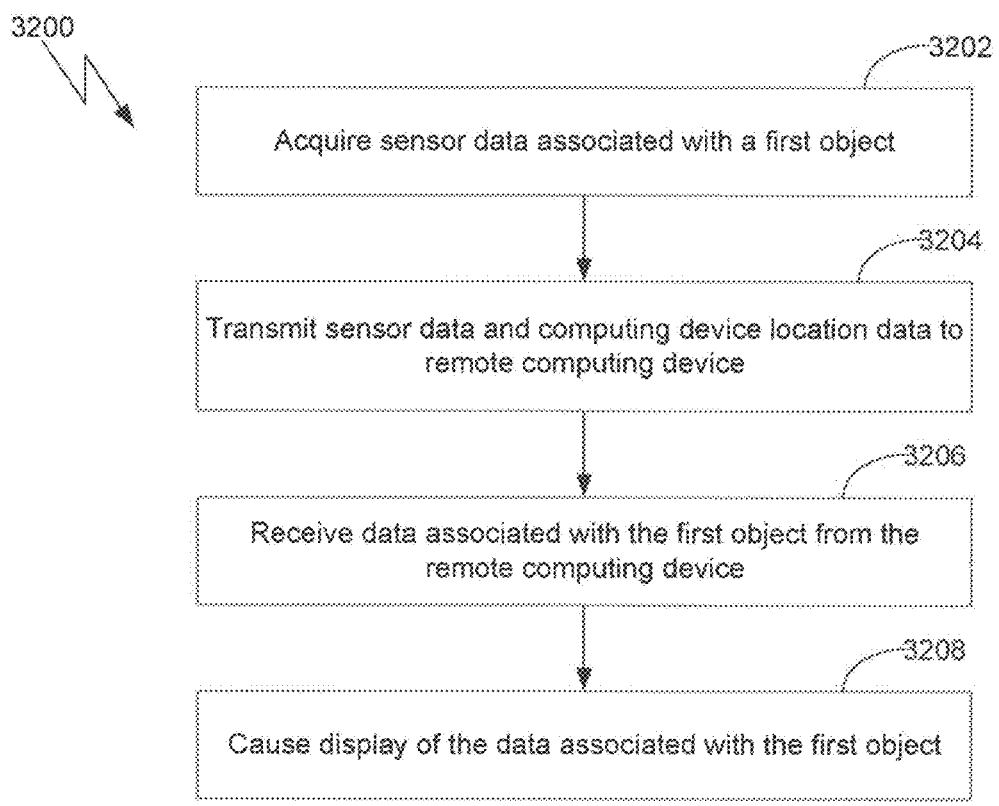
Figure 33A:
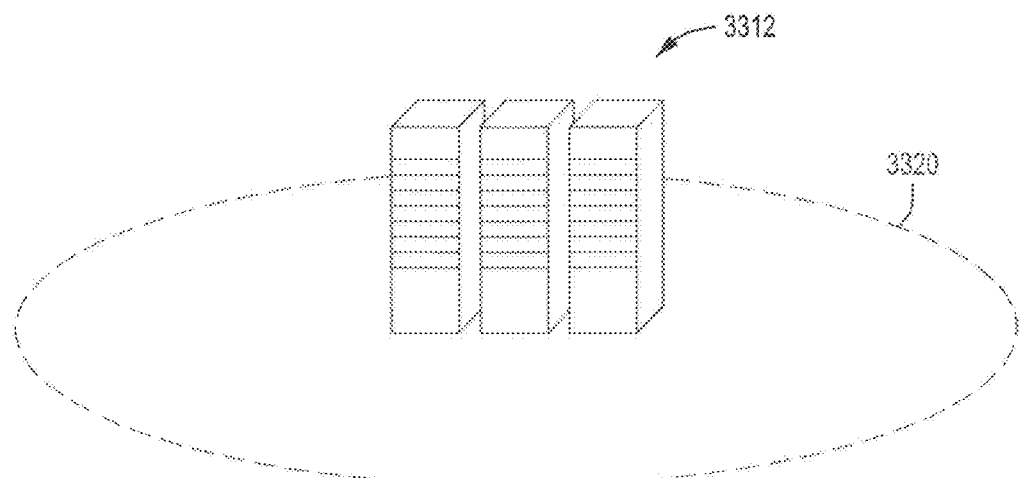
Figure 33B:
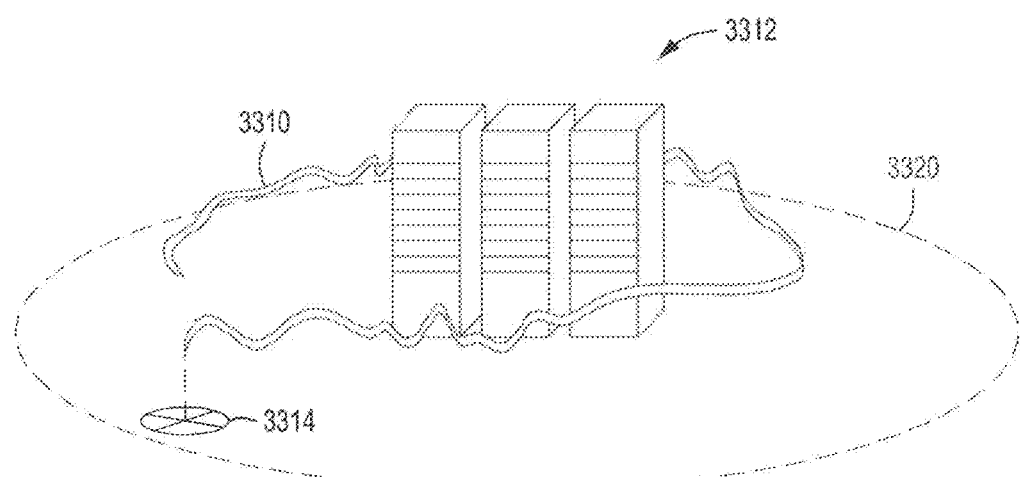
Figure 33C:
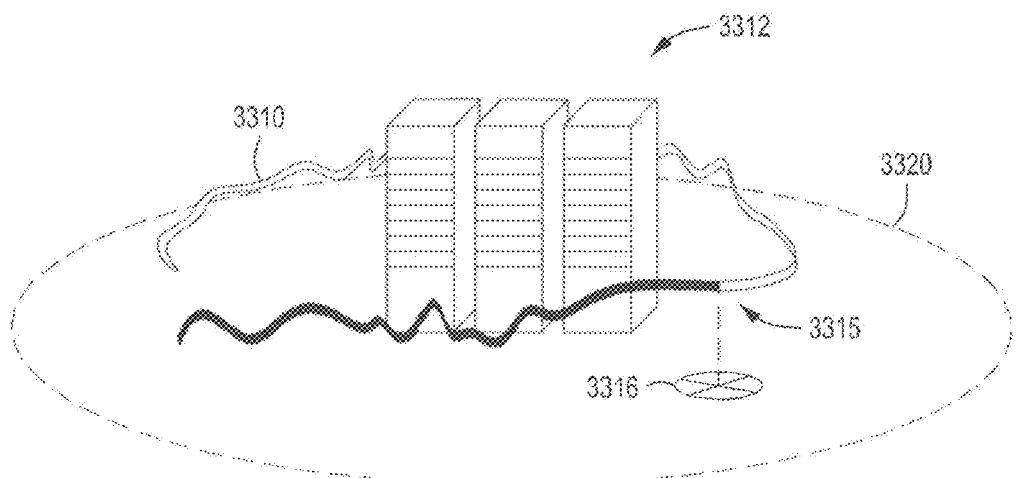
Figure 33D:
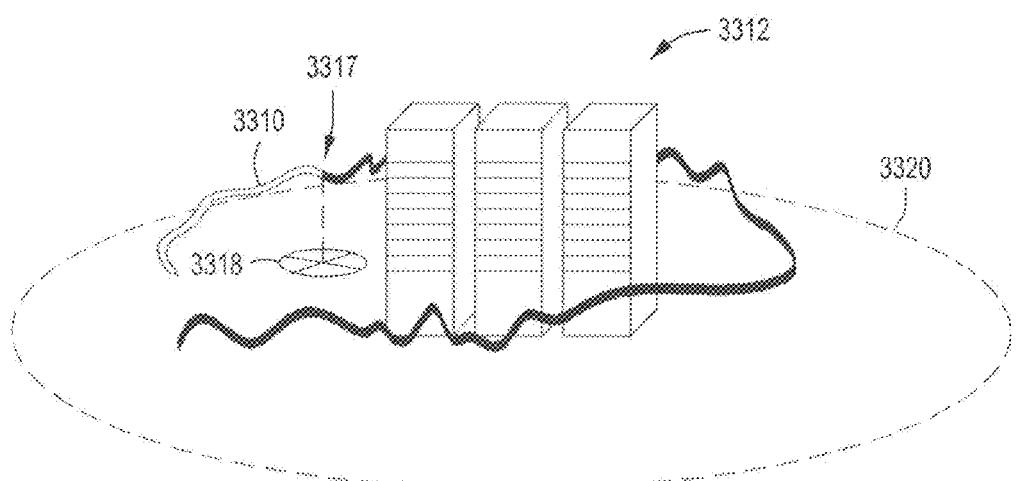
Figure 34:
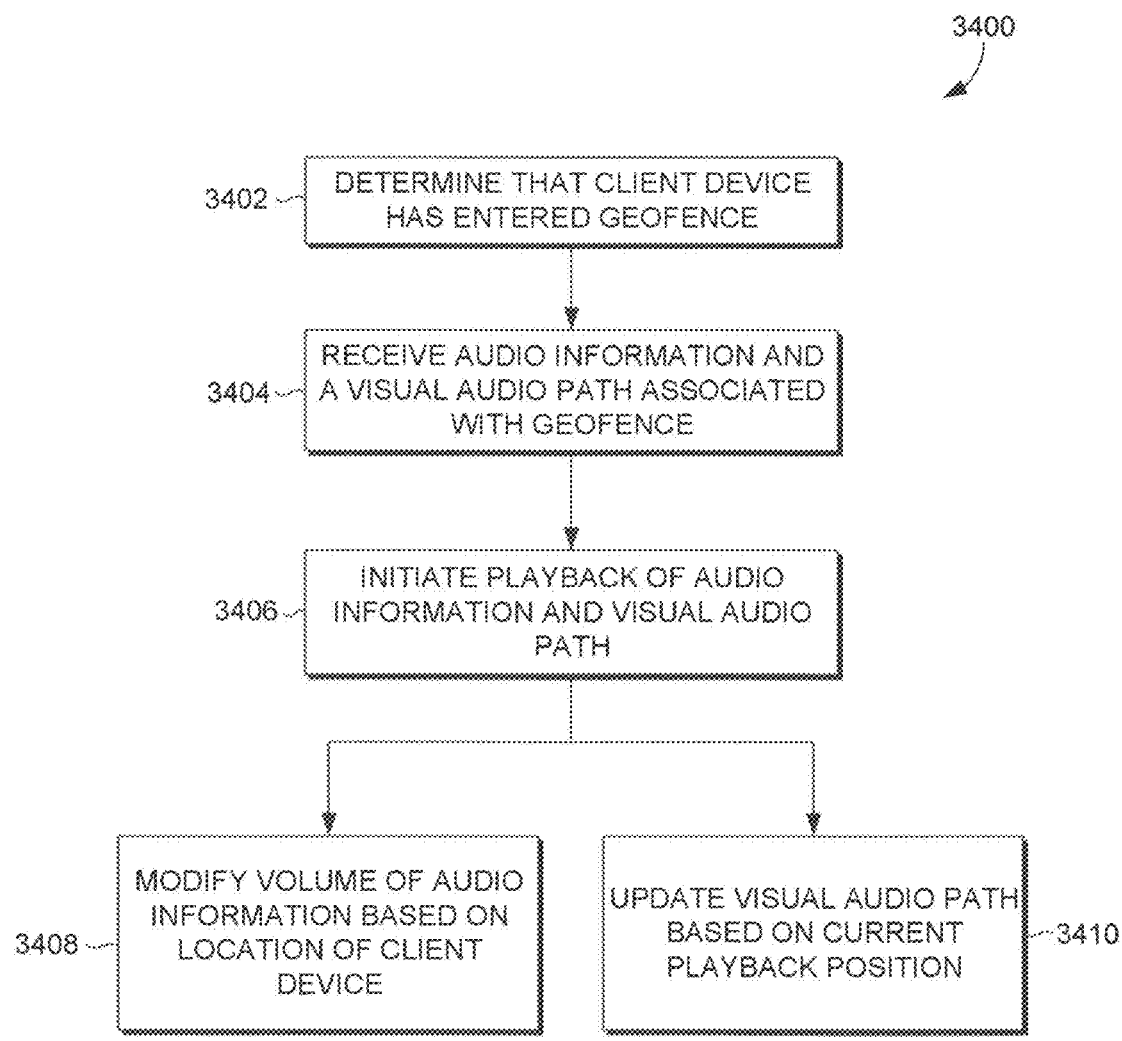

FIG. 5C provides a visual representation of the manner in which a pipelined search language or query operates, in accordance with example embodiments;

FIG. 6A is a flow diagram of an example method that illustrates how a search head and indexers perform a search query, in accordance with example embodiments;

FIG. 6B provides a visual representation of an example manner in which a pipelined command language or query operates, in accordance with example embodiments;

FIG. 7A is a diagram of an example scenario where a common customer identifier is found among log data received from three disparate data sources, in accordance with example embodiments;

FIG. 7B illustrates an example of processing keyword searches and field searches, in accordance with disclosed embodiments;

FIG. 7C illustrates an example of creating and using an inverted index, in accordance with example embodiments;

FIG. 7D depicts a flowchart of example use of an inverted index in a pipelined search query, in accordance with example embodiments;

Figure 8A:
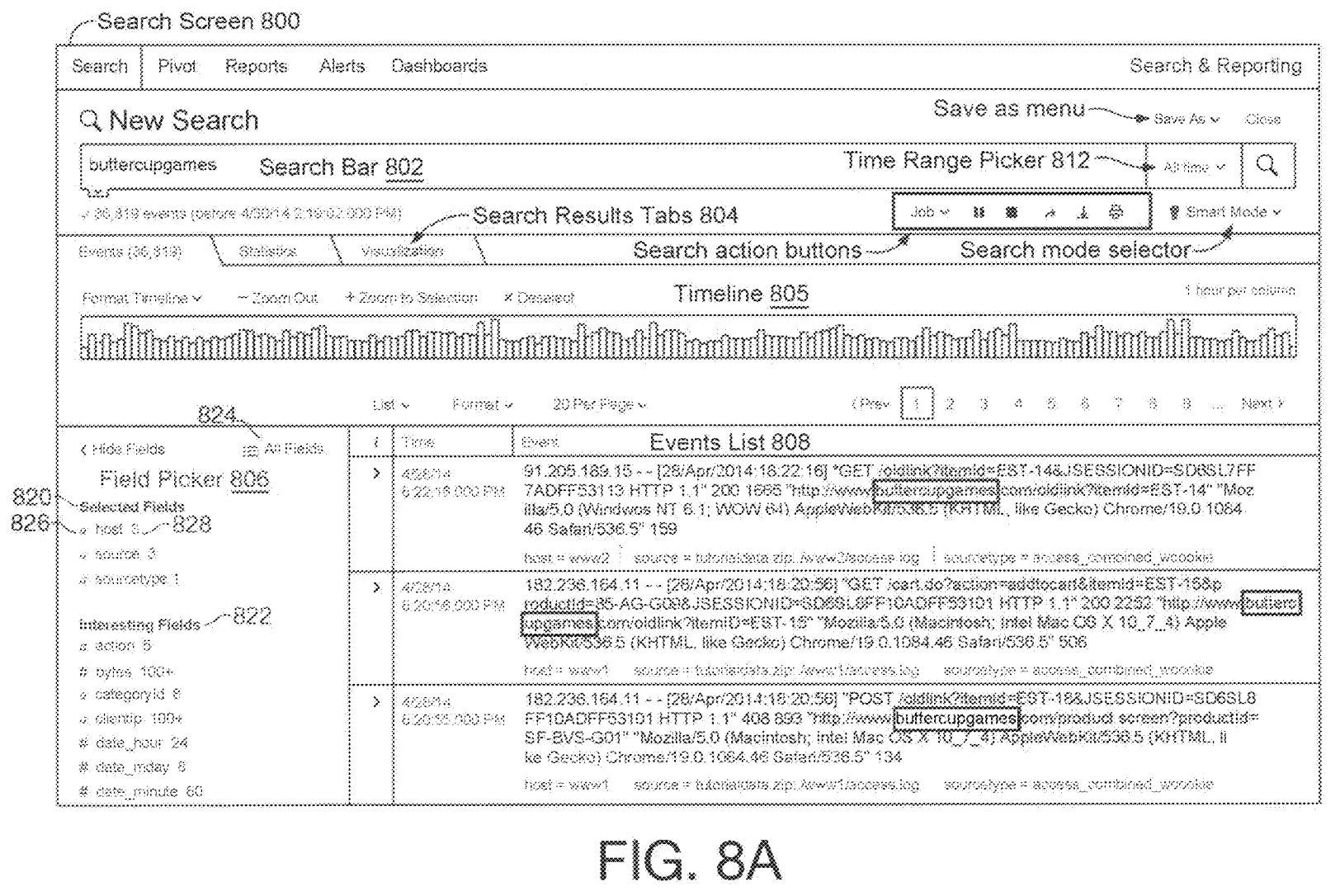

FIG. 8A is an interface diagram of an example user interface for a search screen, in accordance with example embodiments;

FIG. 8B is an interface diagram of an example user interface for a data summary dialog that enables a user to select various data sources, in accordance with example embodiments;

FIGS. 9-15 are interface diagrams of example report generation user interfaces, in accordance with example embodiments;

FIG. 16 is an example search query received from a client and executed by search peers, in accordance with example embodiments;

FIG. 17A is an interface diagram of an example user interface of a key indicators view, in accordance with example embodiments;

FIG. 17B is an interface diagram of an example user interface of an incident review dashboard, in accordance with example embodiments;

FIG. 17C is a tree diagram of an example a proactive monitoring tree, in accordance with example embodiments;

FIG. 17D is an interface diagram of an example a user interface displaying both log data and performance data, in accordance with example embodiments;

FIG. 18A illustrates a more detailed view of the example system of FIG. 4, in accordance with example embodiments;

FIG. 18B illustrates a network architecture that enables secure communications between extended reality application and an on-premises environment for data intake and query system, in accordance with example embodiments;

FIG. 19 illustrates various exemplary objects that may be present in an extended reality environment, in accordance with example embodiments;

FIGS. 20A-20G illustrate how extended reality overlays may be superimposed on various views of the server rack of FIG. 19, in accordance with example embodiments;

FIGS. 21A-21E illustrate 21A-21E illustrate techniques for superimposing AR overlays on various views of an industrial robot, in accordance with example embodiments, in accordance with example embodiments;

FIGS. 22A-22C illustrate a technique for generating and selecting models of the server rack 1900 of FIG. 19, in accordance with example embodiments;

FIGS. 23A-23E illustrate various views related to generating and selecting models of the industrial robot of FIG. 19, in accordance with example embodiments;

FIGS. 24A-24B set forth a flow diagram of method steps for generating and displaying extended reality overlays based on optical data markers, in accordance with example embodiments;

FIG. 25 is a flow diagram of method steps for generating and selecting an AR model for an object in an industrial environment, in accordance with example embodiments;

FIG. 26 is a flow diagram of method steps for generating and selecting an AR model for an object in an industrial environment, in accordance with other example embodiments;

FIG. 27A illustrates a top view of geofences that have been defined to track one or more machines included in different buildings, in accordance with other example embodiments;

FIG. 27B illustrates a top view of geofences that have been defined to track one or more sets of machines within an area, in accordance with other example embodiments;

FIG. 28A illustrates a perspective view of servers mounted onto a server rack included in an information technology (IT) environment, in accordance with other example embodiments;

FIG. 28B illustrates machine identifiers that have been recognized via optical character recognition by a client device and/or by a remote computing device, in accordance with other example embodiments;

FIG. 28C illustrates an extended reality overlay that includes real-time information associated with the servers of FIG. 28A, in accordance with other example embodiments;

FIG. 29 illustrates a technique for recognizing sounds to identify a machine within a geofence, in accordance with other example embodiments;

FIG. 30 illustrates a data structure which may be implemented to store geofence object identifiers in a database, in accordance with other example embodiments;

FIG. 31 is a flowchart of a method for identifying an object within a geofence at a client device, in accordance with other example embodiments;

FIG. 32 is a flowchart of a method for identifying an object in a geofence at a server system, in accordance with other example embodiments;

FIGS. 33A-33D illustrate a visual audio path for providing spatially-referenced audio information in an extended reality environment, in accordance with example embodiments; and FIG. 34 is a flowchart of a method for outputting a visual audio path that corresponds to audio information associated with one or more machines in an industrial environment, in accordance with example embodiments.

DETAILED DESCRIPTION

Embodiments are described herein according to the following outline:
1.0. General Overview
2.0. Operating Environment
  2.1. Host Devices
  2.2. Client Devices
  2.3. Client Device Applications
  2.4. Data Server System
  2.5 Cloud-Based System Overview
  2.6 Searching Externally-Archived Data
    2.6.1. ERP Process Features
  2.7. Data Ingestion
    2.7.1. Input
    2.7.2. Parsing
    2.7.3. Indexing
  2.8. Query Processing
  2.9. Pipelined Search Language
  2.10. Field Extraction
  2.11. Example Search Screen
  2.12. Data Modeling
  2.13. Acceleration Techniques
    2.13.1. Aggregation Technique
    2.13.2. Keyword Index
    2.13.3. High Performance Analytics Store
      2.13.3.1 Extracting Event Data Using Posting Values
    2.13.4. Accelerating Report Generation
  2.14. Security Features
  2.15. Data Center Monitoring
3.0. Extended reality Overlays in an Industrial Environment
  3.1. Optical Data Marker-Based Extended reality Techniques
  3.2. Geofence-Based Extended reality Techniques
  3.3. Spatially-Referenced Audio Information
1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the data intake and query system, machine data are collected and stored as "events". An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp that is derived from the portion of machine data in the event. A timestamp of an event may be determined through interpolation between temporally proximate events having known timestamps or may be determined based on other configurable rules for associating timestamps with events.

In some instances, machine data can have a predefined format, where data items with specific data formats are stored at predefined locations in the data. For example, the machine data may include data associated with fields in a database table. In other instances, machine data may not have a predefined format (e.g., may not be at fixed, predefined locations), but may have repeatable (e.g., nonrandom) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system uses a flexible schema to specify how to extract information from events. A flexible schema may be developed and redefined as needed. Note that a flexible schema may be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp. The system stores the events in a data store. The system enables users to run queries against the stored events to, for example, retrieve events that meet criteria specified in a query, such as criteria indicating certain keywords or having specific values in defined fields. As used herein, the term "field" refers to a location in the machine data of an event containing one or more values for a specific data item. A field may be referenced by a field name associated with the field. As will be described in more detail herein, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file includes one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source type. When events are to be searched based on a particular field name specified in a search, the system uses one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system utilizes a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from events. In some cases, an extraction rule comprises a regular expression, where a sequence of characters form a search pattern. An extraction rule comprising a regular expression is referred to herein as a regex rule. The system applies a regex rule to an event to extract values for a field associated with the regex rule, where the values are extracted by searching the event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources (further discussed with respect to FIG. 7A).

2.0. Operating Environment

Figure 1:
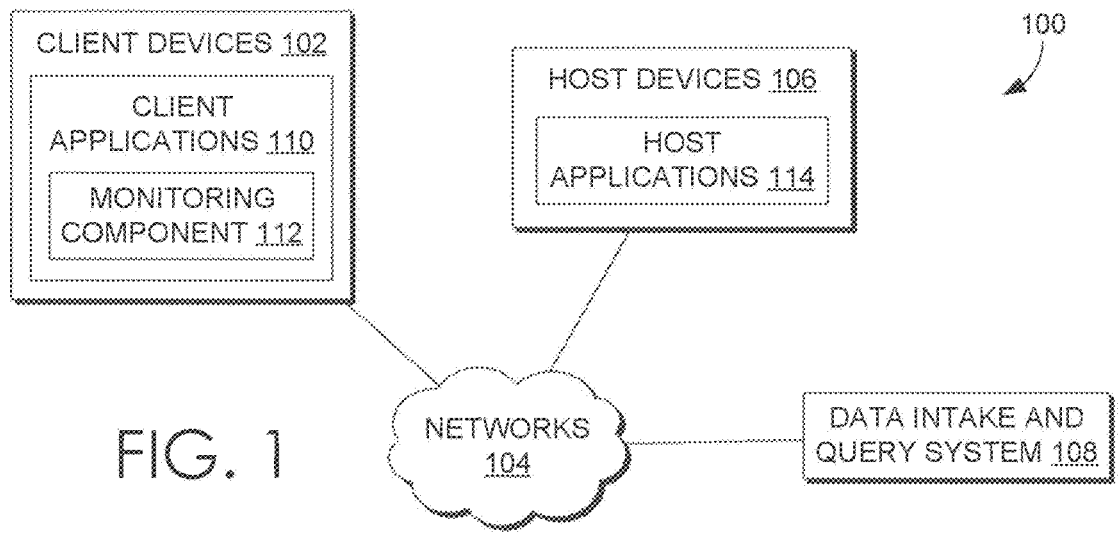

FIG. 1 is a block diagram of an example networked computer environment 100, in accordance with example embodiments. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In some embodiments, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smartphones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In some embodiments, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In some embodiments, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In some embodiments, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some embodiments, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In some embodiments, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In some embodiments, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In some embodiments, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In some embodiments, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In some embodiments, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in FIG. 1) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
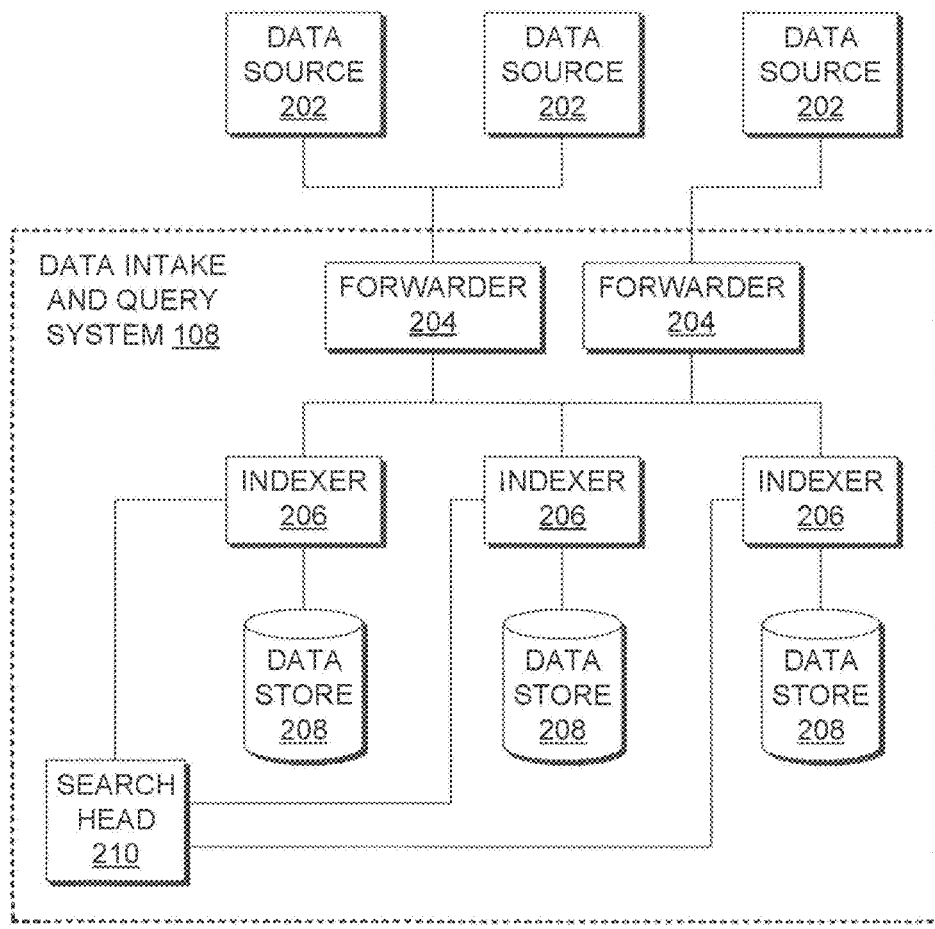

FIG. 2 is a block diagram of an example data intake and query system 108, in accordance with example embodiments. System 108 includes one or more forwarders 204 that receive data from a variety of input data sources 202, and one or more indexers 206 that process and store the data in one or more data stores 208. These forwarders 204 and indexers 208 can comprise separate computer systems, or may alternatively comprise separate processes executing on one or more computer systems.

Each data source 202 broadly represents a distinct source of data that can be consumed by system 108. Examples of data sources 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In some embodiments, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers 206. Data store 208 may contain events derived from machine data from a variety of sources all pertaining to the same component in an IT environment, and this data may be produced by the machine in question or by other components in the IT environment.

2.5. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 3:
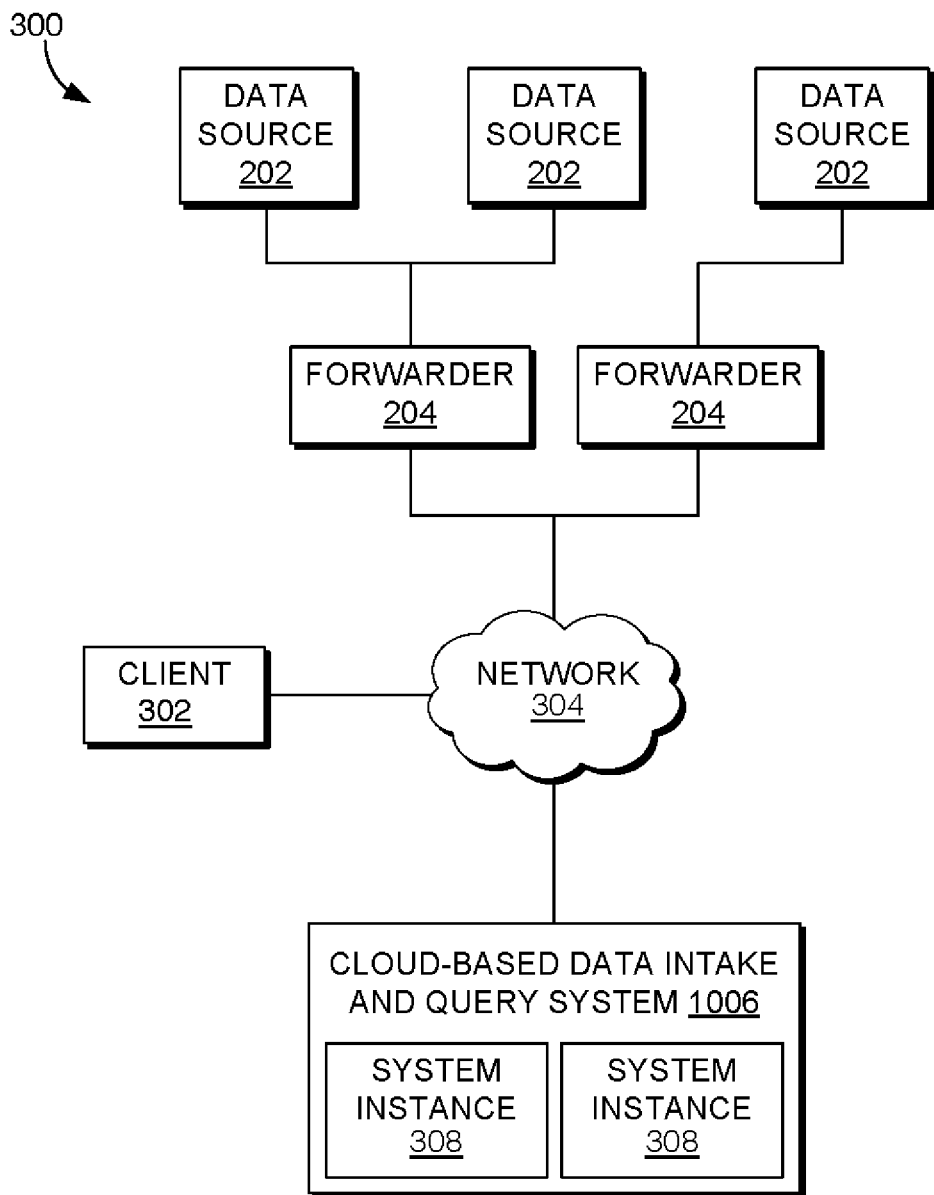

FIG. 3 illustrates a block diagram of an example cloud-based data intake and query system. Similar to the system of FIG. 2, the networked computer system 300 includes input data sources 202 and forwarders 204. These input data sources and forwarders may be in a subscriber's private computing environment. Alternatively, they might be directly managed by the service provider as part of the cloud service. In the example system 300, one or more forwarders 204 and client devices 302 are coupled to a cloud-based data intake and query system 306 via one or more networks 304. Network 304 broadly represents one or more LANs, WANs, cellular networks, intranetworks, internetworks, etc., using any of wired, wireless, terrestrial microwave, satellite links, etc., and may include the public Internet, and is used by client devices 302 and forwarders 204 to access the system 306. Similar to the system of 38, each of the forwarders 204 may be configured to receive data from an input source and to forward the data to other components of the system 306 for further processing.

In some embodiments, a cloud-based data intake and query system 306 may comprise a plurality of system instances 308. In general, each system instance 308 may include one or more computing resources managed by a provider of the cloud-based system 306 made available to a particular subscriber. The computing resources comprising a system instance 308 may, for example, include one or more servers or other devices configured to implement one or more forwarders, indexers, search heads, and other components of a data intake and query system, similar to system 108. As indicated above, a subscriber may use a web browser or other application of a client device 302 to access a web portal or other interface that enables the subscriber to configure an instance 308.

Providing a data intake and query system as described in reference to system 108 as a cloud-based service presents a number of challenges. Each of the components of a system 108 (e.g., forwarders, indexers, and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 308) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment, such as SPLUNK® ENTERPRISE, and a cloud-based environment, such as SPLUNK CLOUD™, are centrally visible).

2.6. Searching Externally-Archived Data

FIG. 4 shows a block diagram of an example of a data intake and query system 108 that provides transparent search facilities for data systems that are external to the data intake and query system. Such facilities are available in the Splunk® Analytics for Hadoop® system provided by Splunk Inc. of San Francisco, Calif. Splunk® Analytics for Hadoop® represents an analytics platform that enables business and IT teams to rapidly explore, analyze, and visualize data in Hadoop® and NoSQL data stores.

The search head 210 of the data intake and query system receives search requests from one or more client devices 404 over network connections 420. As discussed above, the data intake and query system 108 may reside in an enterprise location, in the cloud, etc. FIG. 4 illustrates that multiple client devices 404a, 404b, . . . , 404n may communicate with the data intake and query system 108. The client devices 404 may communicate with the data intake and query system using a variety of connections. For example, one client device in FIG. 4 is illustrated as communicating over an Internet (Web) protocol, another client device is illustrated as communicating via a command line interface, and another client device is illustrated as communicating via a software developer kit (SDK).

The search head 210 analyzes the received search request to identify request parameters. If a search request received from one of the client devices 404 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 410. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 410, 412. FIG. 4 shows two ERP processes 410, 412 that connect to respective remote (external) virtual indices, which are indicated as a Hadoop or another system 414 (e.g., Amazon S3, Amazon EMR, other Hadoop® Compatible File Systems (HCFS), etc.) and a relational database management system (RDBMS) 416. Other virtual indices may include other file organizations and protocols, such as Structured Query Language (SQL) and the like. The ellipses between the ERP processes 410, 412 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to a SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 410, 412 receive a search request from the search head 210. The search head may optimize the received search request for execution at the respective external virtual index. Alternatively, the ERP process may receive a search request as a result of analysis performed by the search head or by a different system process. The ERP processes 410, 412 can communicate with the search head 210 via conventional input/output routines (e.g., standard in/standard out, etc.). In this way, the ERP process receives the search request from a client device such that the search request may be efficiently executed at the corresponding external virtual index.

The ERP processes 410, 412 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 410, 412 generate appropriate search requests in the protocol and syntax of the respective virtual indices 414, 416, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 404 may communicate with the data intake and query system 108 through a network interface 420, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "External Result Provided Process For Retrieving Data Stored Using A Different Configuration Or Protocol", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. Pat. No. 9,514,189, entitled "PROCESSING A SYSTEM SEARCH REQUEST INCLUDING EXTERNAL DATA SOURCES", issued on 6 Dec. 2016, each of which is hereby incorporated by reference in its entirety for all purposes.

2.6.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the machine data obtained from the external data source) are provided to the search head, which can then process the results data (e.g., break the machine data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the machined data or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of machine data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing all the machine data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return machine data to the search head. As noted, the ERP process could be configured to operate in streaming mode alone and return just the machine data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all machine data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.7. Data Ingestion

Figure 5A:
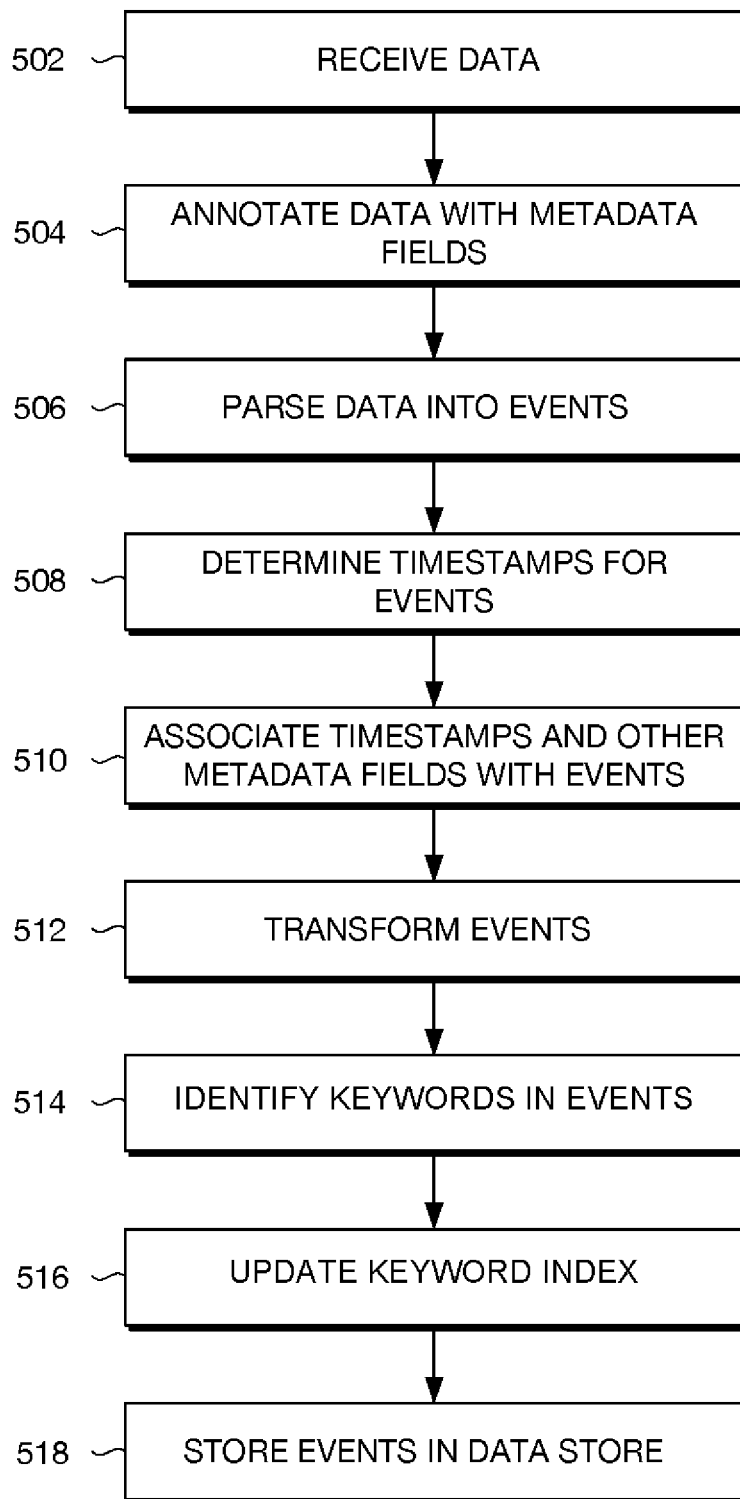

FIG. 5A is a flow chart of an example method that illustrates how indexers process, index, and store data received from forwarders, in accordance with example embodiments. The data flow illustrated in FIG. 5A is provided for illustrative purposes only; those skilled in the art would understand that one or more of the steps of the processes illustrated in FIG. 5A may be removed or that the ordering of the steps may be changed. Furthermore, for the purposes of illustrating a clear example, one or more particular system components are described in the context of performing various operations during each of the data flow stages. For example, a forwarder is described as receiving and processing machine data during an input phase; an indexer is described as parsing and indexing machine data during parsing and indexing phases; and a search head is described as performing a search query during a search phase. However, other system arrangements and distributions of the processing steps across system components may be used.

2.7.1. Input

At block 502, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In some embodiments, a forwarder receives the raw data and may segment the data stream into "blocks", possibly of a uniform data size, to facilitate subsequent processing steps.

At block 504, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In some embodiments, a forwarder forwards the annotated data blocks to another system component (typically an indexer) for further processing.

The data intake and query system allows forwarding of data from one data intake and query instance to another, or even to a third-party system. The data intake and query system can employ different types of forwarders in a configuration.

In some embodiments, a forwarder may contain the essential components needed to forward data. A forwarder can gather data from a variety of inputs and forward the data to an indexer for indexing and searching. A forwarder can also tag metadata (e.g., source, source type, host, etc.).

In some embodiments, a forwarder has the capabilities of the aforementioned forwarder as well as additional capabilities. The forwarder can parse data before forwarding the data (e.g., can associate a time stamp with a portion of data and create an event, etc.) and can route data based on criteria such as source or type of event. The forwarder can also index data locally while forwarding the data to another indexer.

2.7.2. Parsing

At block 506, an indexer receives data blocks from a forwarder and parses the data to organize the data into events. In some embodiments, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, the indexer can apply an inferred source type definition to the data to create the events.

At block 508, the indexer determines a timestamp for each event. Similar to the process for parsing machine data, an indexer may again refer to a source type definition associated with the data to locate one or more properties that indicate instructions for determining a timestamp for each event. The properties may, for example, instruct an indexer to extract a time value from a portion of data for the event, to interpolate time values based on timestamps associated with temporally proximate events, to create a timestamp based on a time the portion of machine data was received or generated, to use the timestamp of a previous event, or use any other rules for determining timestamps.

At block 510, the indexer associates with each event one or more metadata fields including a field containing the timestamp determined for the event. In some embodiments, a timestamp may be included in the metadata fields. These metadata fields may include any number of "default fields" that are associated with all events, and may also include one more custom fields as defined by a user. Similar to the metadata fields associated with the data blocks at block 504, the default metadata fields associated with each event may include a host, source, and source type field including or in addition to a field storing the timestamp.

At block 512, an indexer may optionally apply one or more transformations to data included in the events created at block 506. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to events may, for example, be specified in one or more configuration files and referenced by one or more source type definitions.

FIG. 5C illustrates an illustrative example of machine data can be stored in a data store in accordance with various disclosed embodiments. In other embodiments, machine data can be stored in a flat file in a corresponding bucket with an associated index file, such as a time series index or "TSIDX." As such, the depiction of machine data and associated metadata as rows and columns in the table of FIG. 5C is merely illustrative and is not intended to limit the data format in which the machine data and metadata is stored in various embodiments described herein. In one particular embodiment, machine data can be stored in a compressed or encrypted formatted. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

As mentioned above, certain metadata, e.g., host 536, source 537, source type 538 and timestamps 535 can be generated for each event, and associated with a corresponding portion of machine data 539 when storing the event data in a data store, e.g., data store 208. Any of the metadata can be extracted from the corresponding machine data, or supplied or defined by an entity, such as a user or computer system. The metadata fields can become part of or stored with the event. Note that while the time-stamp metadata field can be extracted from the raw data of each event, the values for the other metadata fields may be determined by the indexer based on information it receives pertaining to the source of the data separate from the machine data.

While certain default or user-defined metadata fields can be extracted from the machine data for indexing purposes, all the machine data within an event can be maintained in its original condition. As such, in embodiments in which the portion of machine data included in an event is unprocessed or otherwise unaltered, it is referred to herein as a portion of raw machine data. In other embodiments, the port of machine data in an event can be processed or otherwise altered. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various default fields.

In FIG. 5C, the first three rows of the table represent events 531, 532, and 533 and are related to a server access log that records requests from multiple clients processed by a server, as indicated by entry of "access.log" in the source column 536.

In the example shown in FIG. 5C, each of the events 531-534 is associated with a discrete request made from a client device. The raw machine data generated by the server and extracted from a server access log can include the IP address of the client 540, the user id of the person requesting the document 541, the time the server finished processing the request 542, the request line from the client 543, the status code returned by the server to the client 545, the size of the object returned to the client (in this case, the gif file requested by the client) 546 and the time spent to serve the request in microseconds 544. As seen in FIG. 5C, all the raw machine data retrieved from the server access log is retained and stored as part of the corresponding events, 1221, 1222, and 1223 in the data store.

Event 534 is associated with an entry in a server error log, as indicated by "error.log" in the source column 537, that records errors that the server encountered when processing a client request. Similar to the events related to the server access log, all the raw machine data in the error log file pertaining to event 534 can be preserved and stored as part of the event 534.

Saving minimally processed or unprocessed machine data in a data store associated with metadata fields in the manner similar to that shown in FIG. 5C is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

2.7.3. Indexing

At blocks 514 and 516, an indexer can optionally generate a keyword index to facilitate fast keyword searching for events. To build a keyword index, at block 514, the indexer identifies a set of keywords in each event. At block 516, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for field name-value pairs found in events, where a field name-value pair can include a pair of keywords connected by a symbol, such as an equals sign or colon. This way, events containing these field name-value pairs can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2".

At block 518, the indexer stores the events with an associated timestamp in a data store 208. Timestamps enable a user to search for events based on a time range. In some embodiments, the stored events are organized into "buckets," where each bucket stores events associated with a specific time range based on the timestamps associated with each event. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize the data retrieval process by searching buckets corresponding to time ranges that are relevant to a query.

In some embodiments, each indexer has a home directory and a cold directory. The home directory of an indexer stores hot buckets and warm buckets, and the cold directory of an indexer stores cold buckets. A hot bucket is a bucket that is capable of receiving and storing events. A warm bucket is a bucket that can no longer receive events for storage but has not yet been moved to the cold directory. A cold bucket is a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, an indexer may also have a quarantine bucket that contains events having potentially inaccurate information, such as an incorrect time stamp associated with the event or a time stamp that appears to be an unreasonable time stamp for the corresponding event. The quarantine bucket may have events from any time range; as such, the quarantine bucket may always be searched at search time. Additionally, an indexer may store old, archived data in a frozen bucket that is not capable of being searched at search time. In some embodiments, a frozen bucket may be stored in slower and/or larger memory, such as a hard disk, and may be stored in offline and/or remote storage.

Moreover, events and buckets can also be replicated across different indexers and data stores to facilitate high availability and disaster recovery as described in U.S. Pat. No. 9,130,971, entitled "Site-Based Search Affinity", issued on 8 Sep. 2015, and in U.S. patent Ser. No. 14/266,817, entitled "Multi-Site Clustering", issued on 1 Sep. 2015, each of which is hereby incorporated by reference in its entirety for all purposes.

Figure 5B:
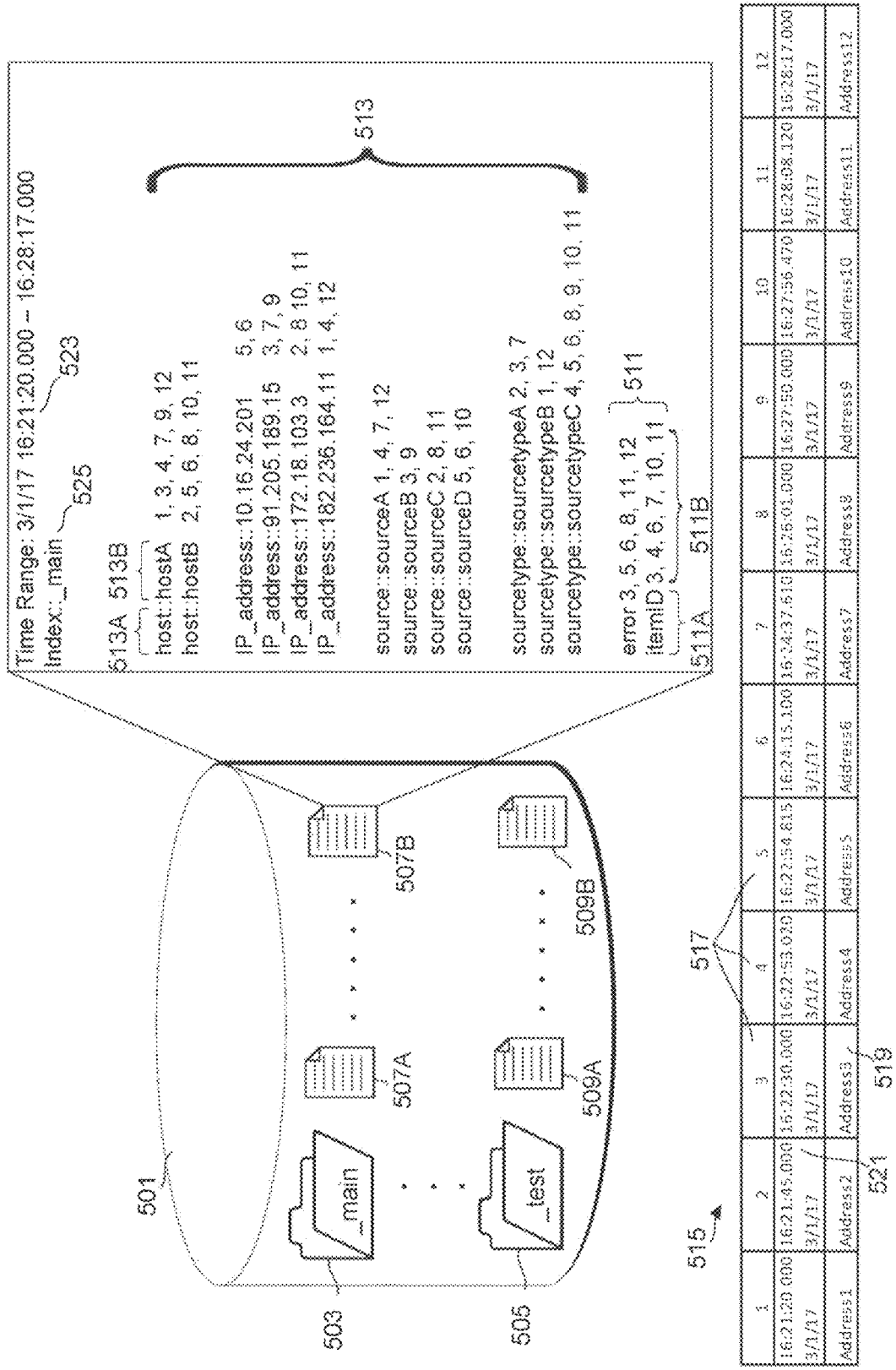

FIG. 5B is a block diagram of an example data store 501 that includes a directory for each index (or partition) that contains a portion of data managed by an indexer. FIG. 5B further illustrates details of an embodiment of an inverted index 507B and an event reference array 515 associated with inverted index 507B.

The data store 501 can correspond to a data store 208 that stores events managed by an indexer 206 or can correspond to a different data store associated with an indexer 206. In the illustrated embodiment, the data store 501 includes a main directory 503 associated with a _main index and a test directory 505 associated with a test index. However, the data store 501 can include fewer or more directories. In some embodiments, multiple indexes can share a single directory or all indexes can share a common directory. Additionally, although illustrated as a single data store 501, it will be understood that the data store 501 can be implemented as multiple data stores storing different portions of the information shown in FIG. 5B. For example, a single index or partition can span multiple directories or multiple data stores, and can be indexed or searched by multiple corresponding indexers.

In the illustrated embodiment of FIG. 5B, the index-specific directories 503 and 505 include inverted indexes 507A, 507B and 509A, 509B, respectively. The inverted indexes 507A . . . 507B, and 509A . . . 509B can be keyword indexes or field-value pair indexes described herein and can include less or more information that depicted in FIG. 5B.

In some embodiments, the inverted index 507A . . . 507B, and 509A . . . 509B can correspond to a distinct time-series bucket that is managed by the indexer 206 and that contains events corresponding to the relevant index (e.g., _main index, _test index). As such, each inverted index can correspond to a particular range of time for an index. Additional files, such as high performance indexes for each time-series bucket of an index, can also be stored in the same directory as the inverted indexes 507A . . . 507B, and 509A . . . 509B. In some embodiments inverted index 507A . . . 507B, and 509A . . . 509B can correspond to multiple time-series buckets or inverted indexes 507A . . . 507B, and 509A . . . 509B can correspond to a single time-series bucket.

Each inverted index 507A . . . 507B, and 509A . . . 509B can include one or more entries, such as keyword (or token) entries or field-value pair entries. Furthermore, in certain embodiments, the inverted indexes 507A . . . 507B, and 509A . . . 509B can include additional information, such as a time range 523 associated with the inverted index or an index identifier 525 identifying the index associated with the inverted index 507A . . . 507B, and 509A . . . 509B. However, each inverted index 507A . . . 507B, and 509A . . . 509B can include less or more information than depicted.

Token entries, such as token entries 511 illustrated in inverted index 507B, can include a token 511A (e.g., "error," "itemID," etc.) and event references 511B indicative of events that include the token. For example, for the token "error," the corresponding token entry includes the token "error" and an event reference, or unique identifier, for each event stored in the corresponding time-series bucket that includes the token "error." In the illustrated embodiment of FIG. 5B, the error token entry includes the identifiers 3, 5, 6, 8, 11, and 12 corresponding to events managed by the indexer 206 and associated with the index _main 503 that are located in the time-series bucket associated with the inverted index 507B.

In some cases, some token entries can be default entries, automatically determined entries, or user specified entries. In some embodiments, the indexer 206 can identify each word or string in an event as a distinct token and generate a token entry for it. In some cases, the indexer 206 can identify the beginning and ending of tokens based on punctuation, spaces, as described in greater detail herein. In certain cases, the indexer 206 can rely on user input or a configuration file to identify tokens for token entries 511, etc. It will be understood that any combination of token entries can be included as a default, automatically determined, a or included based on user-specified criteria.

Similarly, field-value pair entries, such as field-value pair entries 513 shown in inverted index 507B, can include a field-value pair 513A and event references 513B indicative of events that include a field value that corresponds to the field-value pair. For example, for a field-value pair sourcetype::sendmail, a field-value pair entry would include the field-value pair sourcetype::sendmail and a unique identifier, or event reference, for each event stored in the corresponding time-series bucket that includes a sendmail sourcetype.

In some cases, the field-value pair entries 513 can be default entries, automatically determined entries, or user specified entries. As a non-limiting example, the field-value pair entries for the fields host, source, sourcetype can be included in the inverted indexes 507A . . . 507B, and 509A . . . 509B as a default. As such, all of the inverted indexes 507A . . . 507B, and 509A . . . 509B can include field-value pair entries for the fields host, source, sourcetype. As yet another non-limiting example, the field-value pair entries for the IP_address field can be user specified and may only appear in the inverted index 507B based on user-specified criteria. As another non-limiting example, as the indexer indexes the events, it can automatically identify field-value pairs and create field-value pair entries. For example, based on the indexers review of events, it can identify IP_address as a field in each event and add the IP_address field-value pair entries to the inverted index 507B. It will be understood that any combination of field-value pair entries can be included as a default, automatically determined, or included based on user-specified criteria.

Each unique identifier 517, or event reference, can correspond to a unique event located in the time series bucket. However, the same event reference can be located in multiple entries. For example if an event has a sourcetype splunkd, host www1 and token "warning," then the unique identifier for the event will appear in the field-value pair entries sourcetype::splunkd and host::www1, as well as the token entry "warning." With reference to the illustrated embodiment of FIG. 5B and the event that corresponds to the event reference 3, the event reference 3 is found in the field-value pair entries 513 host::hostA, source::sourceB, sourcetype::sourcetypeA, and IP_address::91.205.189.15 indicating that the event corresponding to the event references is from hostA, sourceB, of sourcetypeA, and includes 91.205.189.15 in the event data.

For some fields, the unique identifier is located in only one field-value pair entry for a particular field. For example, the inverted index may include four sourcetype field-value pair entries corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 5B, since the event reference 7 appears in the field-value pair entry sourcetype::sourcetypeA, then it does not appear in the other field-value pair entries for the sourcetype field, including sourcetype::sourcetypeB, sourcetype::sourcetypeC, and sourcetype::sourcetypeD.

The event references 517 can be used to locate the events in the corresponding bucket. For example, the inverted index can include, or be associated with, an event reference array 515. The event reference array 515 can include an array entry 517 for each event reference in the inverted index 507B. Each array entry 517 can include location information 519 of the event corresponding to the unique identifier (non-limiting example: seek address of the event), a timestamp 521 associated with the event, or additional information regarding the event associated with the event reference, etc.

For each token entry 511 or field-value pair entry 513, the event reference 501B or unique identifiers can be listed in chronological order or the value of the event reference can be assigned based on chronological data, such as a timestamp associated with the event referenced by the event reference. For example, the event reference 1 in the illustrated embodiment of FIG. 5B can correspond to the first-in-time event for the bucket, and the event reference 12 can correspond to the last-in-time event for the bucket. However, the event references can be listed in any order, such as reverse chronological order, ascending order, descending order, or some other order, etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 5B, the entries are sorted first by entry type and then alphabetically.

As a non-limiting example of how the inverted indexes 507A . . . 507B, and 509A . . . 509B can be used during a data categorization request command, the indexers can receive filter criteria indicating data that is to be categorized and categorization criteria indicating how the data is to be categorized. Example filter criteria can include, but is not limited to, indexes (or partitions), hosts, sources, sourcetypes, time ranges, field identifier, keywords, etc.

Using the filter criteria, the indexer identifies relevant inverted indexes to be searched. For example, if the filter criteria includes a set of partitions, the indexer can identify the inverted indexes stored in the directory corresponding to the particular partition as relevant inverted indexes. Other means can be used to identify inverted indexes associated with a partition of interest. For example, in some embodiments, the indexer can review an entry in the inverted indexes, such as an index-value pair entry 513 to determine if a particular inverted index is relevant. If the filter criteria does not identify any partition, then the indexer can identify all inverted indexes managed by the indexer as relevant inverted indexes.

Similarly, if the filter criteria includes a time range, the indexer can identify inverted indexes corresponding to buckets that satisfy at least a portion of the time range as relevant inverted indexes. For example, if the time range is last hour then the indexer can identify all inverted indexes that correspond to buckets storing events associated with timestamps within the last hour as relevant inverted indexes.

When used in combination, an index filter criterion specifying one or more partitions and a time range filter criterion specifying a particular time range can be used to identify a subset of inverted indexes within a particular directory (or otherwise associated with a particular partition) as relevant inverted indexes. As such, the indexer can focus the processing to only a subset of the total number of inverted indexes that the indexer manages.

Once the relevant inverted indexes are identified, the indexer can review them using any additional filter criteria to identify events that satisfy the filter criteria. In some cases, using the known location of the directory in which the relevant inverted indexes are located, the indexer can determine that any events identified using the relevant inverted indexes satisfy an index filter criterion. For example, if the filter criteria includes a partition main, then the indexer can determine that any events identified using inverted indexes within the partition main directory (or otherwise associated with the partition main) satisfy the index filter criterion.

Furthermore, based on the time range associated with each inverted index, the indexer can determine that that any events identified using a particular inverted index satisfies a time range filter criterion. For example, if a time range filter criterion is for the last hour and a particular inverted index corresponds to events within a time range of 50 minutes ago to 35 minutes ago, the indexer can determine that any events identified using the particular inverted index satisfy the time range filter criterion. Conversely, if the particular inverted index corresponds to events within a time range of 59 minutes ago to 62 minutes ago, the indexer can determine that some events identified using the particular inverted index may not satisfy the time range filter criterion.

Using the inverted indexes, the indexer can identify event references (and therefore events) that satisfy the filter criteria. For example, if the token "error" is a filter criterion, the indexer can track all event references within the token entry "error." Similarly, the indexer can identify other event references located in other token entries or field-value pair entries that match the filter criteria. The system can identify event references located in all of the entries identified by the filter criteria. For example, if the filter criteria include the token "error" and field-value pair sourcetype::web_ui, the indexer can track the event references found in both the token entry "error" and the field-value pair entry sourcetype::web_ui. As mentioned previously, in some cases, such as when multiple values are identified for a particular filter criterion (e.g., multiple sources for a source filter criterion), the system can identify event references located in at least one of the entries corresponding to the multiple values and in all other entries identified by the filter criteria. The indexer can determine that the events associated with the identified event references satisfy the filter criteria.

In some cases, the indexer can further consult a timestamp associated with the event reference to determine whether an event satisfies the filter criteria. For example, if an inverted index corresponds to a time range that is partially outside of a time range filter criterion, then the indexer can consult a timestamp associated with the event reference to determine whether the corresponding event satisfies the time range criterion. In some embodiments, to identify events that satisfy a time range, the indexer can review an array, such as the event reference array 1614 that identifies the time associated with the events. Furthermore, as mentioned above using the known location of the directory in which the relevant inverted indexes are located (or other index identifier), the indexer can determine that any events identified using the relevant inverted indexes satisfy the index filter criterion.

In some cases, based on the filter criteria, the indexer reviews an extraction rule. In certain embodiments, if the filter criteria includes a field name that does not correspond to a field-value pair entry in an inverted index, the indexer can review an extraction rule, which may be located in a configuration file, to identify a field that corresponds to a field-value pair entry in the inverted index.

For example, the filter criteria includes a field name "sessionID" and the indexer determines that at least one relevant inverted index does not include a field-value pair entry corresponding to the field name sessionID, the indexer can review an extraction rule that identifies how the sessionID field is to be extracted from a particular host, source, or sourcetype (implicitly identifying the particular host, source, or sourcetype that includes a sessionID field). The indexer can replace the field name "sessionID" in the filter criteria with the identified host, source, or sourcetype. In some cases, the field name "sessionID" may be associated with multiples hosts, sources, or sourcetypes, in which case, all identified hosts, sources, and sourcetypes can be added as filter criteria. In some cases, the identified host, source, or sourcetype can replace or be appended to a filter criterion, or be excluded. For example, if the filter criteria includes a criterion for source S1 and the "sessionID" field is found in source S2, the source S2 can replace S1 in the filter criteria, be appended such that the filter criteria includes source S1 and source S2, or be excluded based on the presence of the filter criterion source S1. If the identified host, source, or sourcetype is included in the filter criteria, the indexer can then identify a field-value pair entry in the inverted index that includes a field value corresponding to the identity of the particular host, source, or sourcetype identified using the extraction rule.

Once the events that satisfy the filter criteria are identified, the system, such as the indexer 206 can categorize the results based on the categorization criteria. The categorization criteria can include categories for grouping the results, such as any combination of partition, source, sourcetype, or host, or other categories or fields as desired.

The indexer can use the categorization criteria to identify categorization criteria-value pairs or categorization criteria values by which to categorize or group the results. The categorization criteria-value pairs can correspond to one or more field-value pair entries stored in a relevant inverted index, one or more index-value pairs based on a directory in which the inverted index is located or an entry in the inverted index (or other means by which an inverted index can be associated with a partition), or other criteria-value pair that identifies a general category and a particular value for that category. The categorization criteria values can correspond to the value portion of the categorization criteria-value pair.

As mentioned, in some cases, the categorization criteria-value pairs can correspond to one or more field-value pair entries stored in the relevant inverted indexes. For example, the categorization criteria-value pairs can correspond to field-value pair entries of host, source, and sourcetype (or other field-value pair entry as desired). For instance, if there are ten different hosts, four different sources, and five different sourcetypes for an inverted index, then the inverted index can include ten host field-value pair entries, four source field-value pair entries, and five sourcetype field-value pair entries. The indexer can use the nineteen distinct field-value pair entries as categorization criteria-value pairs to group the results.

Specifically, the indexer can identify the location of the event references associated with the events that satisfy the filter criteria within the field-value pairs, and group the event references based on their location. As such, the indexer can identify the particular field value associated with the event corresponding to the event reference. For example, if the categorization criteria include host and sourcetype, the host field-value pair entries and sourcetype field-value pair entries can be used as categorization criteria-value pairs to identify the specific host and sourcetype associated with the events that satisfy the filter criteria.

In addition, as mentioned, categorization criteria-value pairs can correspond to data other than the field-value pair entries in the relevant inverted indexes. For example, if the partition or index is used as a categorization criterion, the inverted indexes may not include partition field-value pair entries. Rather, the indexer can identify the categorization criteria-value pair associated with the partition based on the directory in which an inverted index is located, information in the inverted index, or other information that associates the inverted index with the partition, etc. As such a variety of methods can be used to identify the categorization criteria-value pairs from the categorization criteria.

Accordingly based on the categorization criteria (and categorization criteria-value pairs), the indexer can generate groupings based on the events that satisfy the filter criteria. As a non-limiting example, if the categorization criteria includes a partition and sourcetype, then the groupings can correspond to events that are associated with each unique combination of partition and sourcetype. For instance, if there are three different partitions and two different sourcetypes associated with the identified events, then the six different groups can be formed, each with a unique partition value-sourcetype value combination. Similarly, if the categorization criteria includes partition, sourcetype, and host and there are two different partitions, three sourcetypes, and five hosts associated with the identified events, then the indexer can generate up to thirty groups for the results that satisfy the filter criteria. Each group can be associated with a unique combination of categorization criteria-value pairs (e.g., unique combinations of partition value sourcetype value, and host value).

In addition, the indexer can count the number of events associated with each group based on the number of events that meet the unique combination of categorization criteria for a particular group (or match the categorization criteria-value pairs for the particular group). With continued reference to the example above, the indexer can count the number of events that meet the unique combination of partition, sourcetype, and host for a particular group.

Each indexer communicates the groupings to the search head. The search head can aggregate the groupings from the indexers and provide the groupings for display. In some cases, the groups are displayed based on at least one of the host, source, sourcetype, or partition associated with the groupings. In some embodiments, the search head can further display the groups based on display criteria, such as a display order or a sort order as described in greater detail above.

As a non-limiting example and with reference to FIG. 5B, consider a request received by an indexer 206 that includes the following filter criteria: keyword=error, partition=_main, time range=3/1/17 16:22.00.000-16:28.00.000, sourcetype=sourcetypeC, host=hostB, and the following categorization criteria: source.

Based on the above criteria, the indexer 206 identifies _main directory 503 and can ignore _test directory 505 and any other partition-specific directories. The indexer determines that inverted partition 507B is a relevant partition based on its location within the _main directory 503 and the time range associated with it. For sake of simplicity in this example, the indexer 206 determines that no other inverted indexes in the _main directory 503, such as inverted index 507A satisfy the time range criterion.

Having identified the relevant inverted index 507B, the indexer reviews the token entries 511 and the field-value pair entries 513 to identify event references, or events, that satisfy all of the filter criteria.

With respect to the token entries 511, the indexer can review the error token entry and identify event references 3, 5, 6, 8, 11, 12, indicating that the term "error" is found in the corresponding events. Similarly, the indexer can identify event references 4, 5, 6, 8, 9, 10, 11 in the field-value pair entry sourcetype::sourcetypeC and event references 2, 5, 6, 8, 10, 11 in the field-value pair entry host::hostB. As the filter criteria did not include a source or an IP_address field-value pair, the indexer can ignore those field-value pair entries.

In addition to identifying event references found in at least one token entry or field-value pair entry (e.g., event references 3, 4, 5, 6, 8, 9, 10, 11, 12), the indexer can identify events (and corresponding event references) that satisfy the time range criterion using the event reference array 1614 (e.g., event references 2, 3, 4, 5, 6, 7, 8, 9, 10). Using the information obtained from the inverted index 507B (including the event reference array 515), the indexer 206 can identify the event references that satisfy all of the filter criteria (e.g., event references 5, 6, 8).

Having identified the events (and event references) that satisfy all of the filter criteria, the indexer 206 can group the event references using the received categorization criteria (source). In doing so, the indexer can determine that event references 5 and 6 are located in the field-value pair entry source::sourceD (or have matching categorization criteria-value pairs) and event reference 8 is located in the field-value pair entry source::sourceC. Accordingly, the indexer can generate a sourceC group having a count of one corresponding to reference 8 and a sourceD group having a count of two corresponding to references 5 and 6. This information can be communicated to the search head. In turn the search head can aggregate the results from the various indexers and display the groupings. As mentioned above, in some embodiments, the groupings can be displayed based at least in part on the categorization criteria, including at least one of host, source, sourcetype, or partition.

It will be understood that a change to any of the filter criteria or categorization criteria can result in different groupings. As a one non-limiting example, a request received by an indexer 206 that includes the following filter criteria: partition=_main, time range=3/1/17 3/1/17 16:21:20.000-16:28:17.000, and the following categorization criteria: host, source, sourcetype would result in the indexer identifying event references 1-12 as satisfying the filter criteria. The indexer would then generate up to 24 groupings corresponding to the 24 different combinations of the categorization criteria-value pairs, including host (hostA, hostB), source (sourceA, sourceB, sourceC, sourceD), and sourcetype (sourcetypeA, sourcetypeB, sourcetypeC). However, as there are only twelve events identifiers in the illustrated embodiment and some fall into the same grouping, the indexer generates eight groups and counts as follows:

Group 1 (hostA, sourceA, sourcetypeA): 1 (event reference 7)

Group 2 (hostA, sourceA, sourcetypeB): 2 (event references 1, 12)

Group 3 (hostA, sourceA, sourcetypeC): 1 (event reference 4)

Group 4 (hostA, sourceB, sourcetypeA): 1 (event reference 3)

Group 5 (hostA, sourceB, sourcetypeC): 1 (event reference 9)

Group 6 (hostB, sourceC, sourcetypeA): 1 (event reference 2)

Group 7 (hostB, sourceC, sourcetypeC): 2 (event references 8, 11)

Group 8 (hostB, sourceD, sourcetypeC): 3 (event references 5, 6, 10)

As noted, each group has a unique combination of categorization criteria-value pairs or categorization criteria values. The indexer communicates the groups to the search head for aggregation with results received from other indexers. In communicating the groups to the search head, the indexer can include the categorization criteria-value pairs for each group and the count. In some embodiments, the indexer can include more or less information. For example, the indexer can include the event references associated with each group and other identifying information, such as the indexer or inverted index used to identify the groups.

As another non-limiting examples, a request received by an indexer 206 that includes the following filter criteria: partition=_main, time range=3/1/17 3/1/17 16:21:20.000-16:28:17.000, source=sourceA, sourceD, and keyword=itemID and the following categorization criteria: host, source, sourcetype would result in the indexer identifying event references 4, 7, and 10 as satisfying the filter criteria, and generate the following groups:

Group 1 (hostA, sourceA, sourcetypeC): 1 (event reference 4)

Group 2 (hostA, sourceA, sourcetypeA): 1 (event reference 7)

Group 3 (hostB, sourceD, sourcetypeC): 1 (event references 10)

The indexer communicates the groups to the search head for aggregation with results received from other indexers. As will be understand there are myriad ways for filtering and categorizing the events and event references. For example, the indexer can review multiple inverted indexes associated with an partition or review the inverted indexes of multiple partitions, and categorize the data using any one or any combination of partition, host, source, sourcetype, or other category, as desired.

Further, if a user interacts with a particular group, the indexer can provide additional information regarding the group. For example, the indexer can perform a targeted search or sampling of the events that satisfy the filter criteria and the categorization criteria for the selected group, also referred to as the filter criteria corresponding to the group or filter criteria associated with the group.

In some cases, to provide the additional information, the indexer relies on the inverted index. For example, the indexer can identify the event references associated with the events that satisfy the filter criteria and the categorization criteria for the selected group and then use the event reference array 515 to access some or all of the identified events. In some cases, the categorization criteria values or categorization criteria-value pairs associated with the group become part of the filter criteria for the review.

With reference to FIG. 5B for instance, suppose a group is displayed with a count of six corresponding to event references 4, 5, 6, 8, 10, 11 (i.e., event references 4, 5, 6, 8, 10, 11 satisfy the filter criteria and are associated with matching categorization criteria values or categorization criteria-value pairs) and a user interacts with the group (e.g., selecting the group, clicking on the group, etc.). In response, the search head communicates with the indexer to provide additional information regarding the group.

In some embodiments, the indexer identifies the event references associated with the group using the filter criteria and the categorization criteria for the group (e.g., categorization criteria values or categorization criteria-value pairs unique to the group). Together, the filter criteria and the categorization criteria for the group can be referred to as the filter criteria associated with the group. Using the filter criteria associated with the group, the indexer identifies event references 4, 5, 6, 8, 10, 11.

Based on a sampling criteria, discussed in greater detail above, the indexer can determine that it will analyze a sample of the events associated with the event references 4, 5, 6, 8, 10, 11. For example, the sample can include analyzing event data associated with the event references 5, 8, 10. In some embodiments, the indexer can use the event reference array 1616 to access the event data associated with the event references 5, 8, 10. Once accessed, the indexer can compile the relevant information and provide it to the search head for aggregation with results from other indexers. By identifying events and sampling event data using the inverted indexes, the indexer can reduce the amount of actual data this is analyzed and the number of events that are accessed in order to generate the summary of the group and provide a response in less time.

2.8. Query Processing

FIG. 6A is a flow diagram of an example method that illustrates how a search head and indexers perform a search query, in accordance with example embodiments. At block 602, a search head receives a search query from a client. At block 604, the search head analyzes the search query to determine what portion(s) of the query can be delegated to indexers and what portions of the query can be executed locally by the search head. At block 606, the search head distributes the determined portions of the query to the appropriate indexers. In some embodiments, a search head cluster may take the place of an independent search head where each search head in the search head cluster coordinates with peer search heads in the search head cluster to schedule jobs, replicate search results, update configurations, fulfill search requests, etc. In some embodiments, the search head (or each search head) communicates with a master node (also known as a cluster master, not shown in FIG. 2) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 608, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 608 may use the late-binding schema to extract values for specified fields from events at the time the query is processed. In some embodiments, one or more rules for extracting field values may be specified as part of a source type definition in a configuration file. The indexers may then either send the relevant events back to the search head, or use the events to determine a partial result, and send the partial result back to the search head.

At block 610, the search head combines the partial results and/or events received from the indexers to produce a final result for the query. In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries, which may be particularly helpful for queries that are performed on a periodic basis.

2.9. Pipelined Search Language

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can operate to search or filter for specific data in particular set of data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "|". In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms at the beginning of the pipeline. Such search terms can include any combination of keywords, phrases, times, dates, Boolean expressions, fieldname-field value pairs, etc. that specify which results should be obtained from an index. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field value criteria. For example, a search command can filter out all events containing the word "warning" or filter out all events where a field value associated with a field "clientip" is "10.0.1.2."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns contain basic information about the data and also may contain data that has been dynamically extracted at search time.

FIG. 6B provides a visual representation of the manner in which a pipelined command language or query operates in accordance with the disclosed embodiments. The query 630 can be inputted by the user into a search. The query comprises a search, the results of which are piped to two commands (namely, command 1 and command 2) that follow the search step.

Disk 622 represents the event data in the raw record data store.

When a user query is processed, a search step will precede other queries in the pipeline in order to generate a set of events at block 640. For example, the query can comprise search terms "sourcetype=syslog ERROR" at the front of the pipeline as shown in FIG. 6B. Intermediate results table 624 shows fewer rows because it represents the subset of events retrieved from the index that matched the search terms "sourcetype=syslog ERROR" from search command 630. By way of further example, instead of a search step, the set of events at the head of the pipeline may be generating by a call to a pre-existing inverted index (as will be explained later).

At block 642, the set of events generated in the first part of the query may be piped to a query that searches the set of events for field-value pairs or for keywords. For example, the second intermediate results table 626 shows fewer columns, representing the result of the top command, "top user" which may summarize the events into a list of the top 10 users and may display the user, count, and percentage.

Finally, at block 644, the results of the prior stage can be pipelined to another stage where further filtering or processing of the data can be performed, e.g., preparing the data for display purposes, filtering the data based on a condition, performing a mathematical calculation with the data, etc. As shown in FIG. 6B, the "fields—percent" part of command 630 removes the column that shows the percentage, thereby, leaving a final results table 628 without a percentage column. In different embodiments, other query languages, such as the Structured Query Language ("SQL"), can be used to create a query.

2.10 Field Extraction

The search head 210 allows users to search and visualize events generated from machine data received from homogenous data sources. The search head 210 also allows users to search and visualize events generated from machine data received from heterogeneous data sources. The search head 210 includes various mechanisms, which may additionally reside in an indexer 206, for processing a query. A query language may be used to create a query, such as any suitable pipelined query language. For example, Splunk Processing Language (SPL) can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for fields in the events being searched. The search head 210 obtains extraction rules that specify how to extract a value for fields from an event. Extraction rules can comprise regex rules that specify how to extract values for the fields corresponding to the extraction rules. In addition to specifying how to extract field values, the extraction rules may also include instructions for deriving a field value by performing a function on a character string or value retrieved by the extraction rule. For example, an extraction rule may truncate a character string or convert the character string into a different data format. In some cases, the query itself can specify one or more extraction rules.

The search head 210 can apply the extraction rules to events that it receives from indexers 206. Indexers 206 may apply the extraction rules to events in an associated data store 208. Extraction rules can be applied to all the events in a data store or to a subset of the events that have been filtered based on some criteria (e.g., event time stamp values, etc.). Extraction rules can be used to extract one or more values for a field from events by parsing the portions of machine data in the events and examining the data for one or more patterns of characters, numbers, delimiters, etc., that indicate where the field begins and, optionally, ends.

FIG. 7A is a diagram of an example scenario where a common customer identifier is found among log data received from three disparate data sources, in accordance with example embodiments. In this example, a user submits an order for merchandise using a vendor's shopping application program 701 running on the user's system. In this example, the order was not delivered to the vendor's server due to a resource exception at the destination server that is detected by the middleware code 702. The user then sends a message to the customer support server 703 to complain about the order failing to complete. The three systems 701, 702, and 703 are disparate systems that do not have a common logging format. The order application 701 sends log data 704 to the data intake and query system in one format, the middleware code 702 sends error log data 705 in a second format, and the support server 703 sends log data 706 in a third format.

Using the log data received at one or more indexers 206 from the three systems, the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems. There is a semantic relationship between the customer ID field values generated by the three systems. The search head 210 requests events from the one or more indexers 206 to gather relevant events from the three systems. The search head 210 then applies extraction rules to the events in order to extract field values that it can correlate. The search head may apply a different extraction rule to each set of events from each system when the event format differs among systems. In this example, the user interface can display to the administrator the events corresponding to the common customer ID field values 707, 708, and 709, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, a visualization (e.g., a graph or chart) generated from the values, and the like.

The search system enables users to run queries against the stored data to retrieve events that meet criteria specified in a query, such as containing certain keywords or having specific values in defined fields. FIG. 7B illustrates the manner in which keyword searches and field searches are processed in accordance with disclosed embodiments.

If a user inputs a search query into search bar 1401 that includes only keywords (also known as "tokens"), e.g., the keyword "error" or "warning", the query search engine of the data intake and query system searches for those keywords directly in the event data 722 stored in the raw record data store. Note that while FIG. 7B only illustrates four events, the raw record data store (corresponding to data store 208 in FIG. 2) may contain records for millions of events.

As disclosed above, an indexer can optionally generate a keyword index to facilitate fast keyword searching for event data. The indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword. For example, if the keyword "HTTP" was indexed by the indexer at index time, and the user searches for the keyword "HTTP", events 713 to 715 will be identified based on the results returned from the keyword index. As noted above, the index contains reference pointers to the events containing the keyword, which allows for efficient retrieval of the relevant events from the raw record data store.

If a user searches for a keyword that has not been indexed by the indexer, the data intake and query system would nevertheless be able to retrieve the events by searching the event data for the keyword in the raw record data store directly as shown in FIG. 7B. For example, if a user searches for the keyword "frank", and the name "frank" has not been indexed at index time, the DATA INTAKE AND QUERY system will search the event data directly and return the first event 713. Note that whether the keyword has been indexed at index time or not, in both cases the raw data with the events 712 is accessed from the raw data record store to service the keyword search. In the case where the keyword has been indexed, the index will contain a reference pointer that will allow for a more efficient retrieval of the event data from the data store. If the keyword has not been indexed, the search engine will need to search through all the records in the data store to service the search.

In most cases, however, in addition to keywords, a user's search will also include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the search, "status=404". This search query finds events with "status" fields that have a value of "404." When the search is run, the search engine does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "November 15 09:33:22 johnmedlock."

The data intake and query system advantageously allows for search time field extraction. In other words, fields can be extracted from the event data at search time using late-binding schema as opposed to at data ingestion time, which was a major limitation of the prior art systems.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

FIG. 7B illustrates the manner in which configuration files may be used to configure custom fields at search time in accordance with the disclosed embodiments. In response to receiving a search query, the data intake and query system determines if the query references a "field." For example, a query may request a list of events where the "clientip" field equals "127.0.0.1." If the query itself does not specify an extraction rule and if the field is not a metadata field, e.g., time, host, source, source type, etc., then in order to determine an extraction rule, the search engine may, in one or more embodiments, need to locate configuration file 712 during the execution of the search as shown in FIG. 7B.

Configuration file 712 may contain extraction rules for all the various fields that are not metadata fields, e.g., the "clientip" field. The extraction rules may be inserted into the configuration file in a variety of ways. In some embodiments, the extraction rules can comprise regular expression rules that are manually entered in by the user. Regular expressions match patterns of characters in text and are used for extracting custom fields in text.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system would then generate a regular expression that extracts those fields from similar events and store the regular expression as an extraction rule for the associated field in the configuration file 712.

In some embodiments, the indexers may automatically discover certain custom fields at index time and the regular expressions for those fields will be automatically generated at index time and stored as part of extraction rules in configuration file 712. For example, fields that appear in the event data as "key=value" pairs may be automatically extracted as part of an automatic field discovery process. Note that there may be several other ways of adding field definitions to configuration files in addition to the methods discussed herein.

The search head 210 can apply the extraction rules derived from configuration file 1402 to event data that it receives from indexers 206. Indexers 206 may apply the extraction rules from the configuration file to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

In one more embodiments, the extraction rule in configuration file 712 will also need to define the type or set of events that the rule applies to. Because the raw record data store will contain events from multiple heterogeneous sources, multiple events may contain the same fields in different locations because of discrepancies in the format of the data generated by the various sources. Furthermore, certain events may not contain a particular field at all. For example, event 719 also contains "clientip" field, however, the "clientip" field is in a different format from events 713-715. To address the discrepancies in the format and content of the different types of events, the configuration file will also need to specify the set of events that an extraction rule applies to, e.g., extraction rule 716 specifies a rule for filtering by the type of event and contains a regular expression for parsing out the field value. Accordingly, each extraction rule will pertain to only a particular type of event. If a particular field, e.g., "clientip" occurs in multiple events, each of those types of events would need its own corresponding extraction rule in the configuration file 712 and each of the extraction rules would comprise a different regular expression to parse out the associated field value. The most common way to categorize events is by source type because events generated by a particular source can have the same format.

The field extraction rules stored in configuration file 712 perform search-time field extractions. For example, for a query that requests a list of events with source type "access_combined" where the "clientip" field equals "127.0.0.1," the query search engine would first locate the configuration file 712 to retrieve extraction rule 716 that would allow it to extract values associated with the "clientip" field from the event data 720 "where the source type is "access_combined." After the "clientip" field has been extracted from all the events comprising the "clientip" field where the source type is "access_combined," the query search engine can then execute the field criteria by performing the compare operation to filter out the events where the "clientip" field equals "127.0.0.1." In the example shown in FIG. 7B, events 713-715 would be returned in response to the user query. In this manner, the search engine can service queries containing field criteria in addition to queries containing keyword criteria (as explained above).

The configuration file can be created during indexing. It may either be manually created by the user or automatically generated with certain predetermined field extraction rules. As discussed above, the events may be distributed across several indexers, wherein each indexer may be responsible for storing and searching a subset of the events contained in a corresponding data store. In a distributed indexer system, each indexer would need to maintain a local copy of the configuration file that is synchronized periodically across the various indexers.

The ability to add schema to the configuration file at search time results in increased efficiency. A user can create new fields at search time and simply add field definitions to the configuration file. As a user learns more about the data in the events, the user can continue to refine the late-binding schema by adding new fields, deleting fields, or modifying the field extraction rules in the configuration file for use the next time the schema is used by the system. Because the data intake and query system maintains the underlying raw data and uses late-binding schema for searching the raw data, it enables a user to continue investigating and learn valuable insights about the raw data long after data ingestion time.

The ability to add multiple field definitions to the configuration file at search time also results in increased flexibility. For example, multiple field definitions can be added to the configuration file to capture the same field across events generated by different source types. This allows the data intake and query system to search and correlate data across heterogeneous sources flexibly and efficiently.

Further, by providing the field definitions for the queried fields at search time, the configuration file 712 allows the record data store 712 to be field searchable. In other words, the raw record data store 712 can be searched using keywords as well as fields, wherein the fields are searchable name/value pairings that distinguish one event from another and can be defined in configuration file 1402 using extraction rules. In comparison to a search containing field names, a keyword search does not need the configuration file and can search the event data directly as shown in FIG. 7B.

It should also be noted that any events filtered out by performing a search-time field extraction using a configuration file can be further processed by directing the results of the filtering step to a processing step using a pipelined search language. Using the prior example, a user could pipeline the results of the compare step to an aggregate function by asking the query search engine to count the number of events where the "clientip" field equals "127.0.0.1."

2.11. Example Search Screen

FIG. 8A is an interface diagram of an example user interface for a search screen 800, in accordance with example embodiments. Search screen 800 includes a search bar 802 that accepts user input in the form of a search string. It also includes a time range picker 812 that enables the user to specify a time range for the search. For historical searches (e.g., searches based on a particular historical time range), the user can select a specific time range, or alternatively a relative time range, such as "today," "yesterday" or "last week." For real-time searches (e.g., searches whose results are based on data received in real-time), the user can select the size of a preceding time window to search for real-time events. Search screen 800 also initially may display a "data summary" dialog as is illustrated in FIG. 8B that enables the user to select different sources for the events, such as by selecting specific hosts and log files.

After the search is executed, the search screen 800 in FIG. 8A can display the results through search results tabs 804, wherein search results tabs 804 includes: an "events tab" that may display various information about events returned by the search; a "statistics tab" that may display statistics about the search results; and a "visualization tab" that may display various visualizations of the search results. The events tab illustrated in FIG. 8A may display a timeline graph 805 that graphically illustrates the number of events that occurred in one-hour intervals over the selected time range. The events tab also may display an events list 808 that enables a user to view the machine data in each of the returned events.

The events tab additionally may display a sidebar that is an interactive field picker 806. The field picker 806 may be displayed to a user in response to the search being executed and allows the user to further analyze the search results based on the fields in the events of the search results. The field picker 806 includes field names that reference fields present in the events in the search results. The field picker may display any Selected Fields 820 that a user has preselected for display (e.g., host, source, sourcetype) and may also display any Interesting Fields 822 that the system determines may be interesting to the user based on pre-specified criteria (e.g., action, bytes, categoryid, clientip, date_hour, date_mday, date_minute, etc.). The field picker also provides an option to display field names for all the fields present in the events of the search results using the All Fields control 824.

Each field name in the field picker 806 has a value type identifier to the left of the field name, such as value type identifier 826. A value type identifier identifies the type of value for the respective field, such as an "a" for fields that include literal values or a "#" for fields that include numerical values.

Each field name in the field picker also has a unique value count to the right of the field name, such as unique value count 828. The unique value count indicates the number of unique values for the respective field in the events of the search results.

Each field name is selectable to view the events in the search results that have the field referenced by that field name. For example, a user can select the "host" field name, and the events shown in the events list 808 will be updated with events in the search results that have the field that is reference by the field name "host."

2.12. Data Models

A data model is a hierarchically structured search-time mapping of semantic knowledge about one or more datasets. It encodes the domain knowledge used to build a variety of specialized searches of those datasets. Those searches, in turn, can be used to generate reports.

A data model is composed of one or more "objects" (or "data model objects") that define or otherwise correspond to a specific set of data. An object is defined by constraints and attributes. An object's constraints are search criteria that define the set of events to be operated on by running a search having that search criteria at the time the data model is selected. An object's attributes are the set of fields to be exposed for operating on that set of events generated by the search criteria.

Objects in data models can be arranged hierarchically in parent/child relationships. Each child object represents a subset of the dataset covered by its parent object. The top-level objects in data models are collectively referred to as "root objects."

Child objects have inheritance. Child objects inherit constraints and attributes from their parent objects and may have additional constraints and attributes of their own. Child objects provide a way of filtering events from parent objects. Because a child object may provide an additional constraint in addition to the constraints it has inherited from its parent object, the dataset it represents may be a subset of the dataset that its parent represents. For example, a first data model object may define a broad set of data pertaining to e-mail activity generally, and another data model object may define specific datasets within the broad dataset, such as a subset of the e-mail data pertaining specifically to e-mails sent. For example, a user can simply select an "e-mail activity" data model object to access a dataset relating to e-mails generally (e.g., sent or received), or select an "e-mails sent" data model object (or data sub-model object) to access a dataset relating to e-mails sent.

Because a data model object is defined by its constraints (e.g., a set of search criteria) and attributes (e.g., a set of fields), a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. A user iteratively applies a model development tool (not shown in FIG. 8A) to prepare a query that defines a subset of events and assigns an object name to that subset. A child subset is created by further limiting a query that generated a parent subset.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. Pat. No. 9,128,980, entitled "GENERATION OF A DATA MODEL APPLIED TO QUERIES", issued on 8 Sep. 2015, and U.S.

Pat. No. 9,589,012, entitled "GENERATION OF A DATA MODEL APPLIED TO OBJECT QUERIES", issued on 7 Mar. 2017, each of which is hereby incorporated by reference in its entirety for all purposes.

A data model can also include reports. One or more report formats can be associated with a particular data model and be made available to run against the data model. A user can use child objects to design reports with object datasets that already have extraneous data pre-filtered out. In some embodiments, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes. Data visualizations also can be generated in a variety of formats, by reference to the data model. Reports, data visualizations, and data model objects can be saved and associated with the data model for future use. The data model object may be used to perform searches of other data.

FIGS. 9-15 are interface diagrams of example report generation user interfaces, in accordance with example embodiments. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 9:
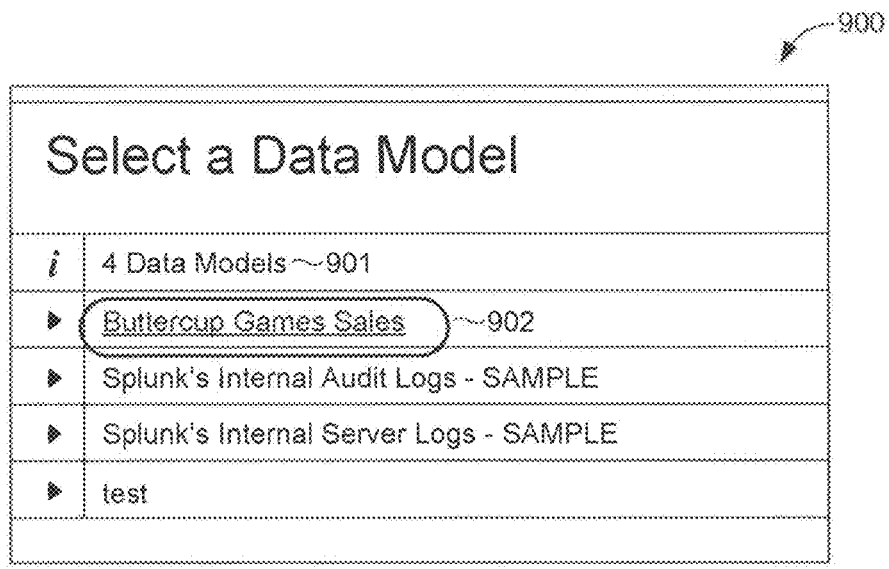

The selection of a data model object for use in driving a report generation may be facilitated by a data model object selection interface. FIG. 9 illustrates an example interactive data model selection graphical user interface 900 of a report editor that may display a listing of available data models 901. The user may select one of the data models 902.

Figure 10:
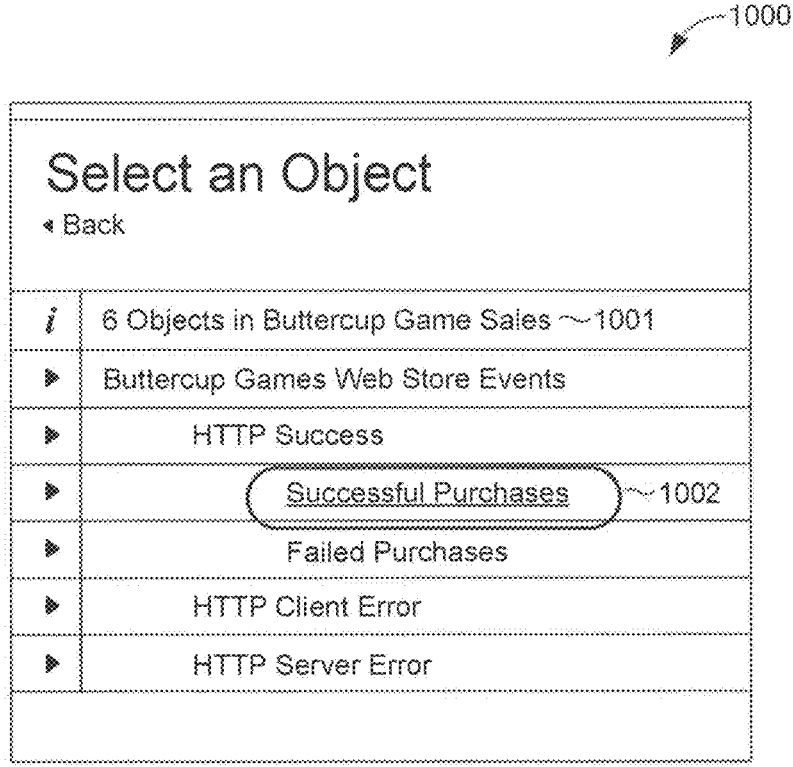

FIG. 10 illustrates an example data model object selection graphical user interface 1000 that may display available data objects 1001 for the selected data object model 902. The user may select one of the displayed data model objects 1002 for use in driving the report generation process.

Figure 11A:
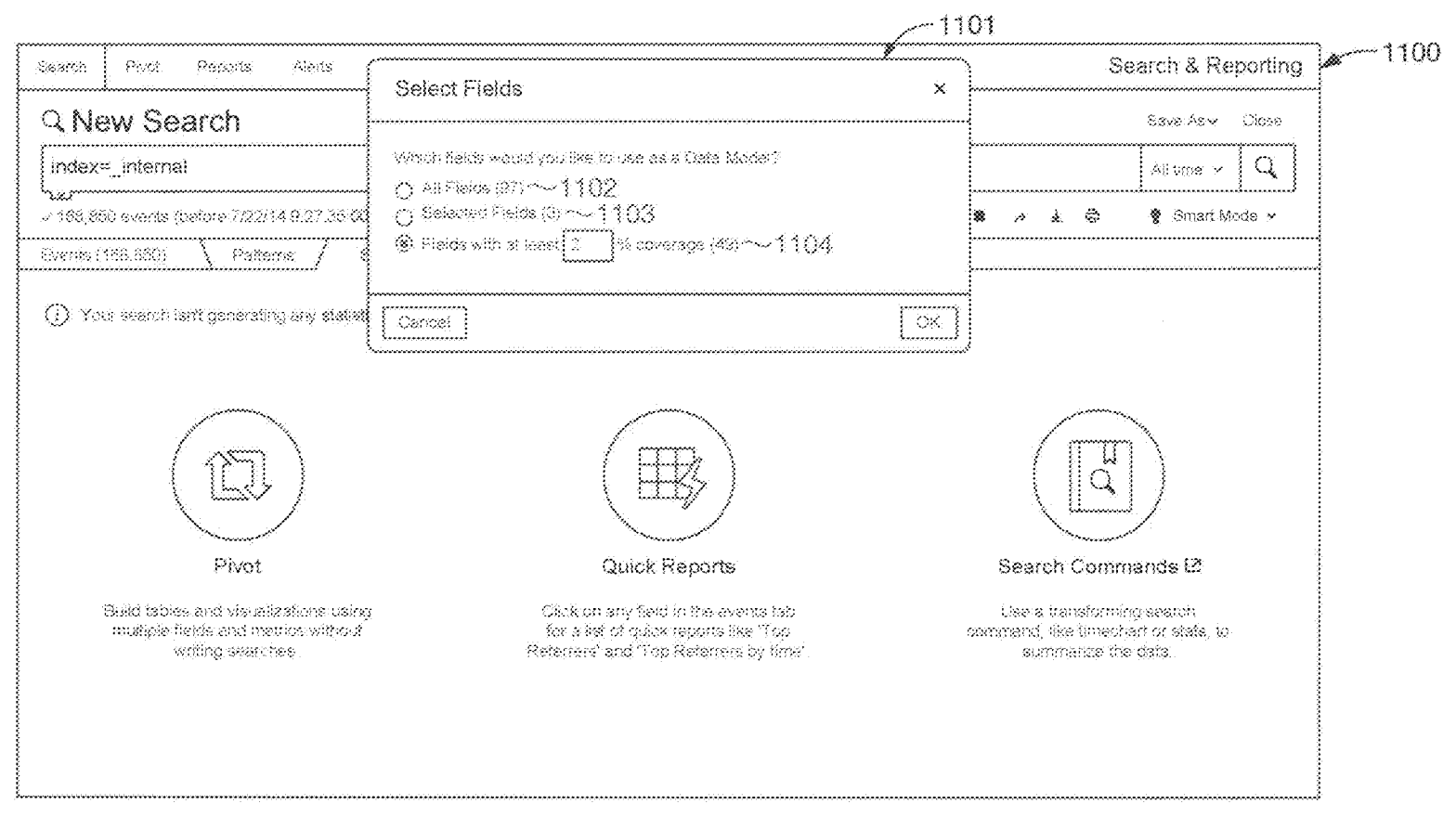

Once a data model object is selected by the user, a user interface screen 1100 shown in FIG. 11A may display an interactive listing of automatic field identification options 1101 based on the selected data model object. For example, a user may select one of the three illustrated options (e.g., the "All Fields" option 1102, the "Selected Fields" option 1103, or the "Coverage" option (e.g., fields with at least a specified % of coverage) 1104). If the user selects the "All Fields" option 1102, all of the fields identified from the events that were returned in response to an initial search query may be selected. That is, for example, all of the fields of the identified data model object fields may be selected. If the user selects the "Selected Fields" option 1103, only the fields from the fields of the identified data model object fields that are selected by the user may be used. If the user selects the "Coverage" option 1104, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 1102 indicates that 97 fields will be selected if the "All Fields" option is selected. The "3" displayed next to the "Selected Fields" option 1103 indicates that 3 of the 97 fields will be selected if the "Selected Fields" option is selected. The "49" displayed next to the "Coverage" option 1104 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 11B:
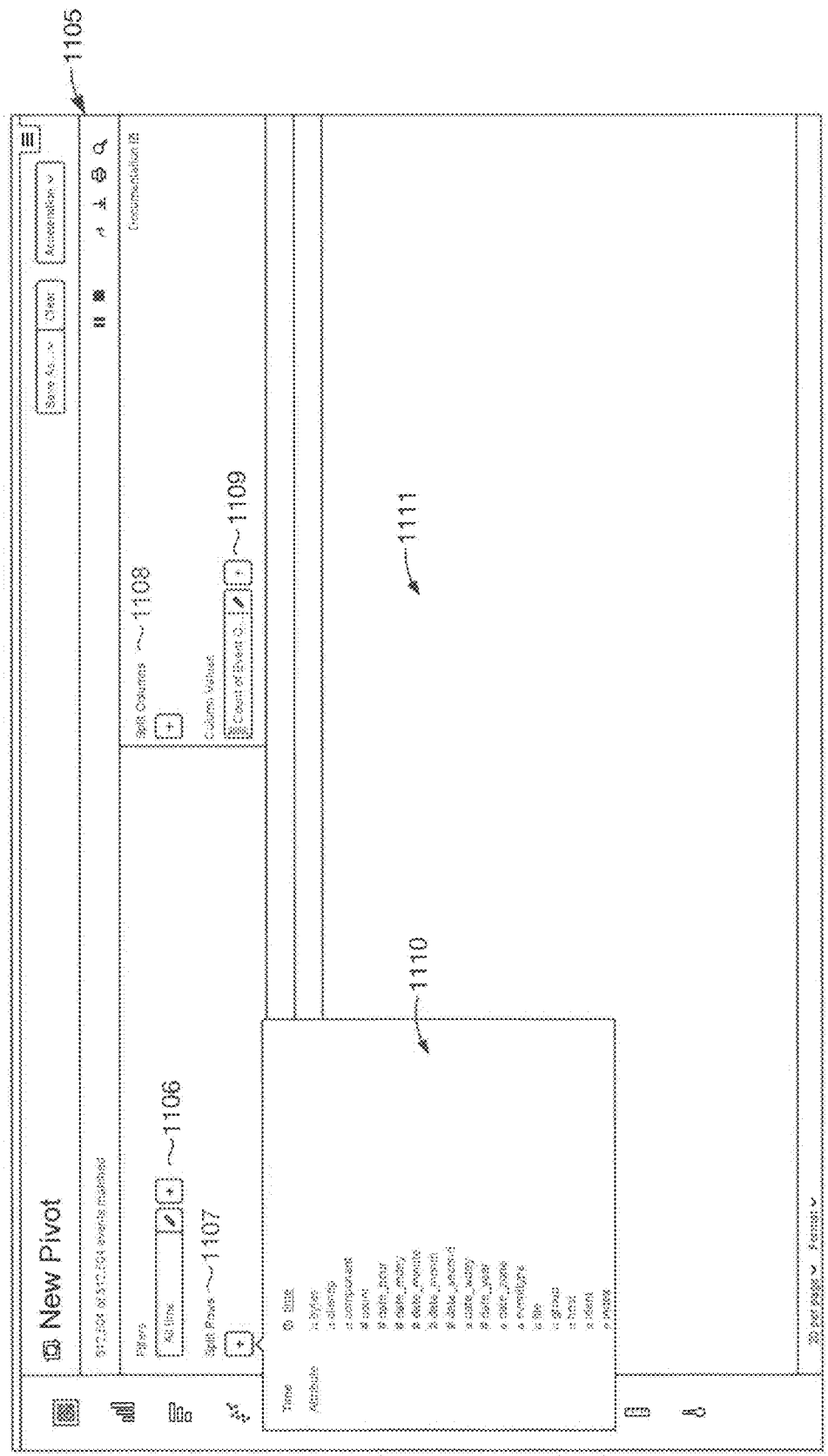
Figure 11C:
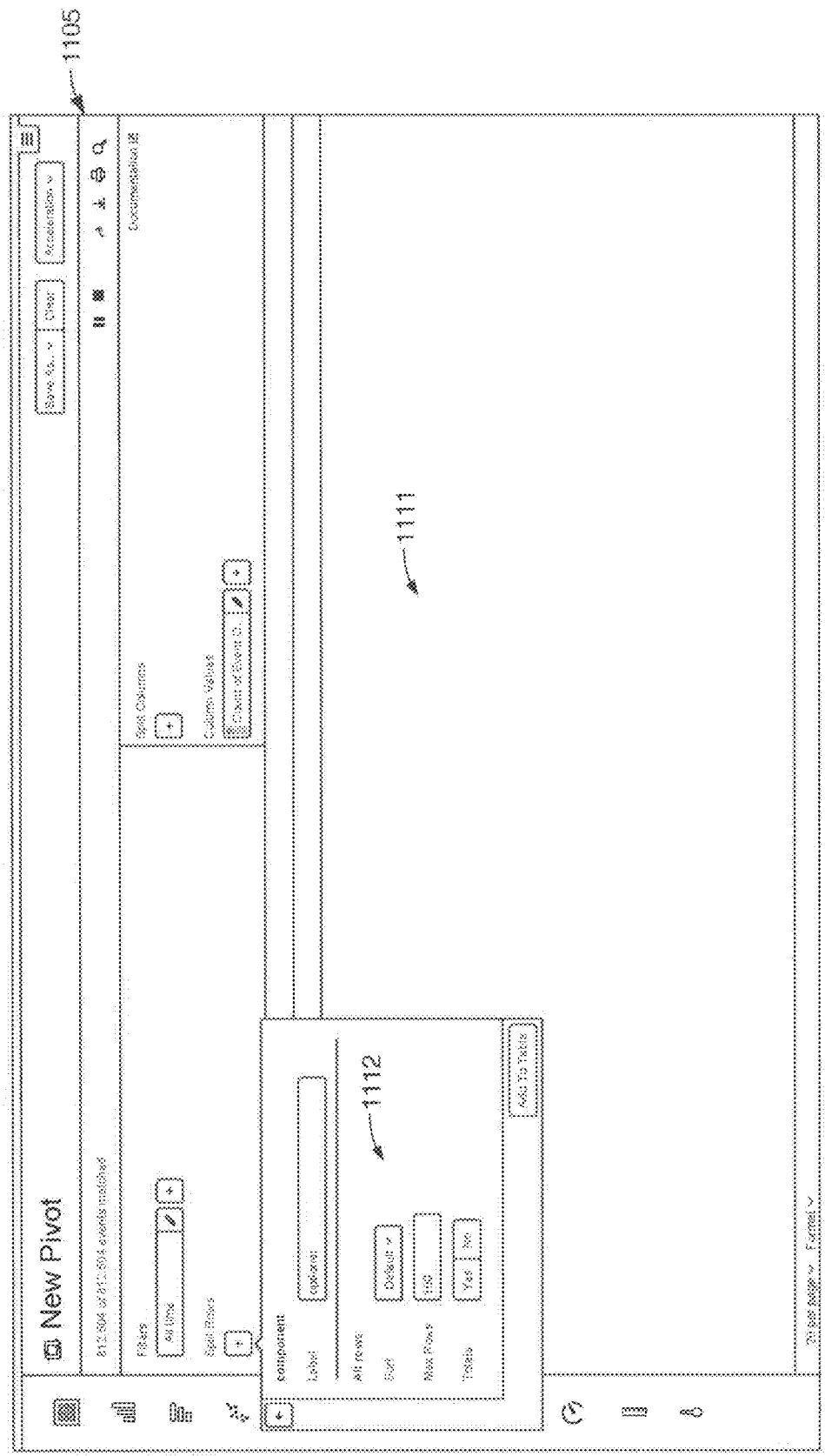

FIG. 11B illustrates an example graphical user interface screen 1105 displaying the reporting application's "Report Editor" page. The screen may display interactive elements for defining various elements of a report. For example, the page includes a "Filters" element 1106, a "Split Rows" element 1107, a "Split Columns" element 1108, and a "Column Values" element 1109. The page may include a list of search results 1111. In this example, the Split Rows element 1107 is expanded, revealing a listing of fields 1110 that can be used to define additional criteria (e.g., reporting criteria). The listing of fields 1110 may correspond to the selected fields. That is, the listing of fields 1110 may list only the fields previously selected, either automatically and/or manually by a user. FIG. 11C illustrates a formatting dialogue 1112 that may be displayed upon selecting a field from the listing of fields 1110. The dialogue can be used to format the display of the results of the selection (e.g., label the column for the selected field to be displayed as "component").

Figure 11D:
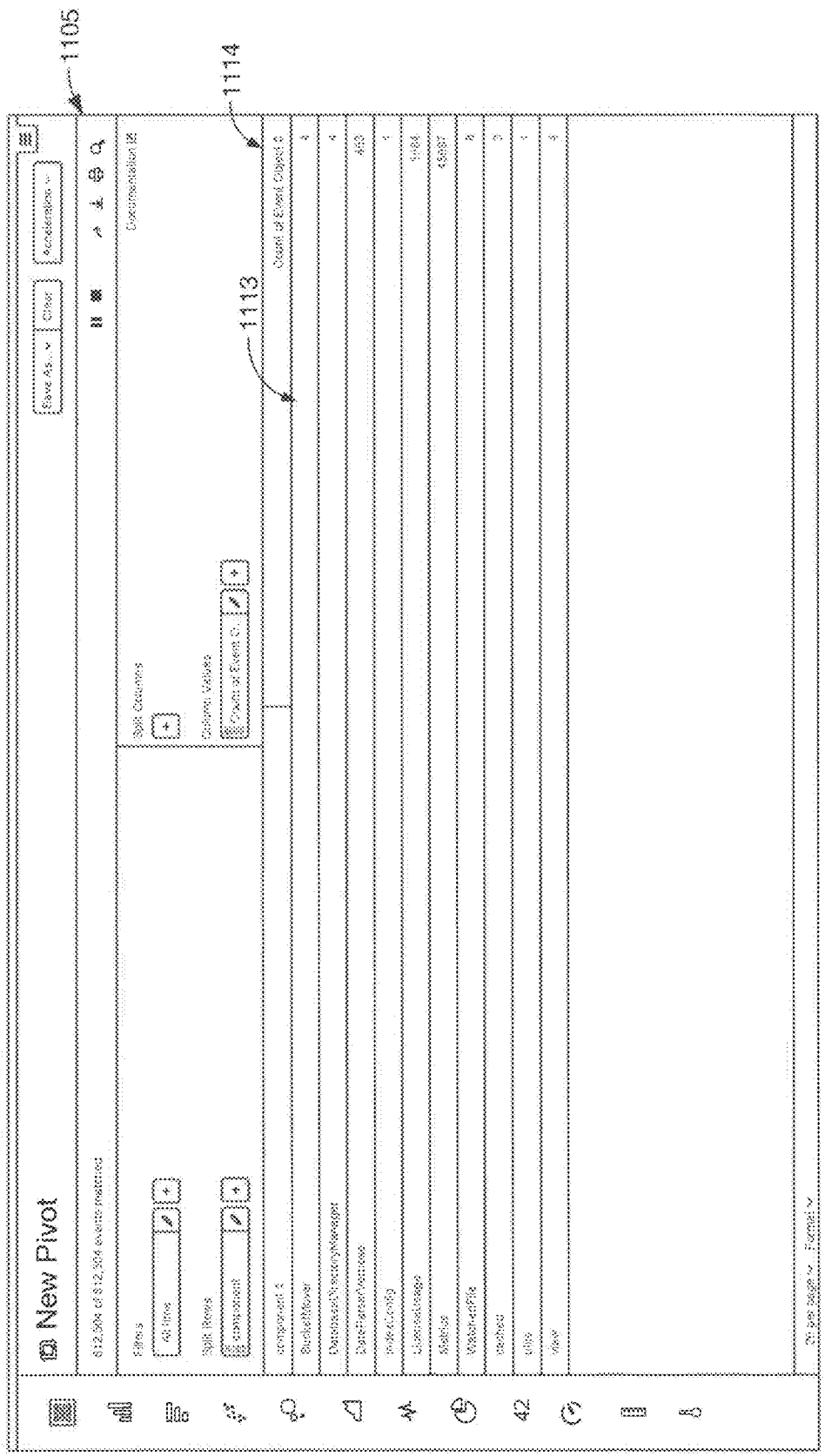

FIG. 11D illustrates an example graphical user interface screen 1105 including a table of results 1113 based on the selected criteria including splitting the rows by the "component" field. A column 1114 having an associated count for each component listed in the table may be displayed that indicates an aggregate count of the number of times that the particular field-value pair (e.g., the value in a row for a particular field, such as the value "BucketMover" for the field "component") occurs in the set of events responsive to the initial search query.

Figure 12:
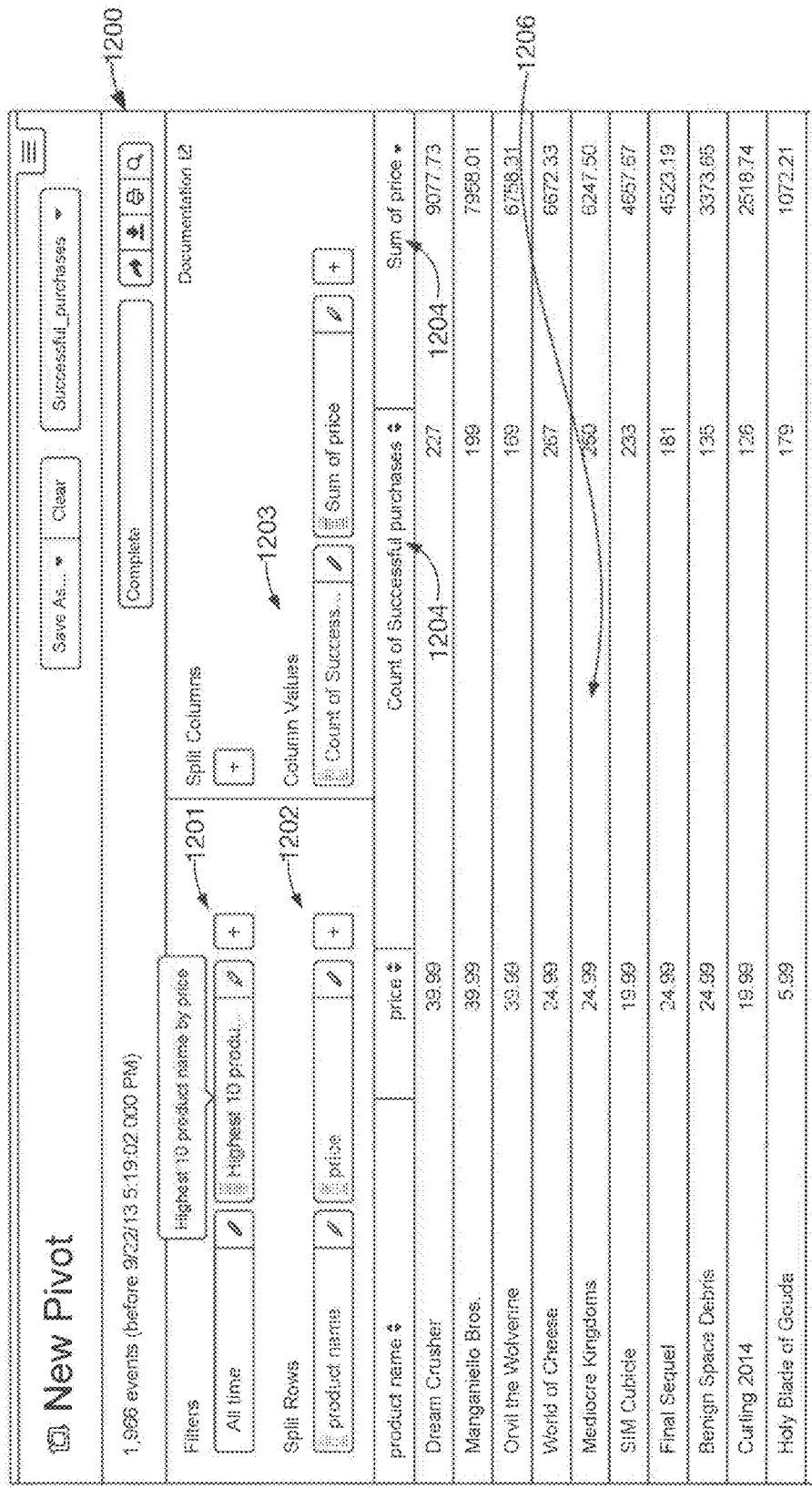

FIG. 12 illustrates an example graphical user interface screen 1200 that allows the user to filter search results and to perform statistical analysis on values extracted from specific fields in the set of events. In this example, the top ten product names ranked by price are selected as a filter 1201 that causes the display of the ten most popular products sorted by price. Each row is displayed by product name and price 1202. This results in each product displayed in a column labeled "product name" along with an associated price in a column labeled "price" 1206. Statistical analysis of other fields in the events associated with the ten most popular products have been specified as column values 1203. A count of the number of successful purchases for each product is displayed in column 1204. These statistics may be produced by filtering the search results by the product name, finding all occurrences of a successful purchase in a field within the events and generating a total of the number of occurrences. A sum of the total sales is displayed in column 1205, which is a result of the multiplication of the price and the number of successful purchases for each product.

Figure 13:
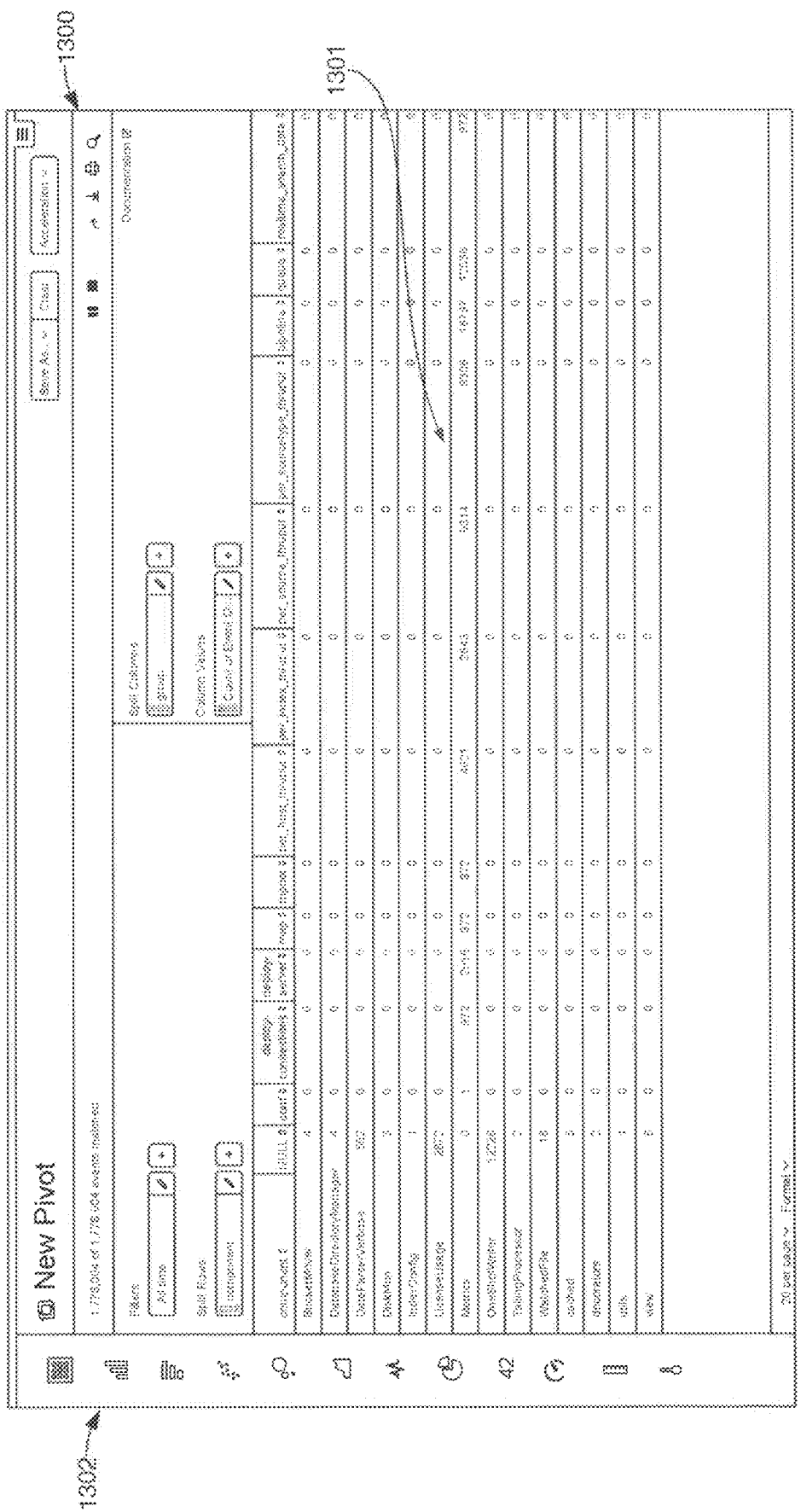
Figure 14:
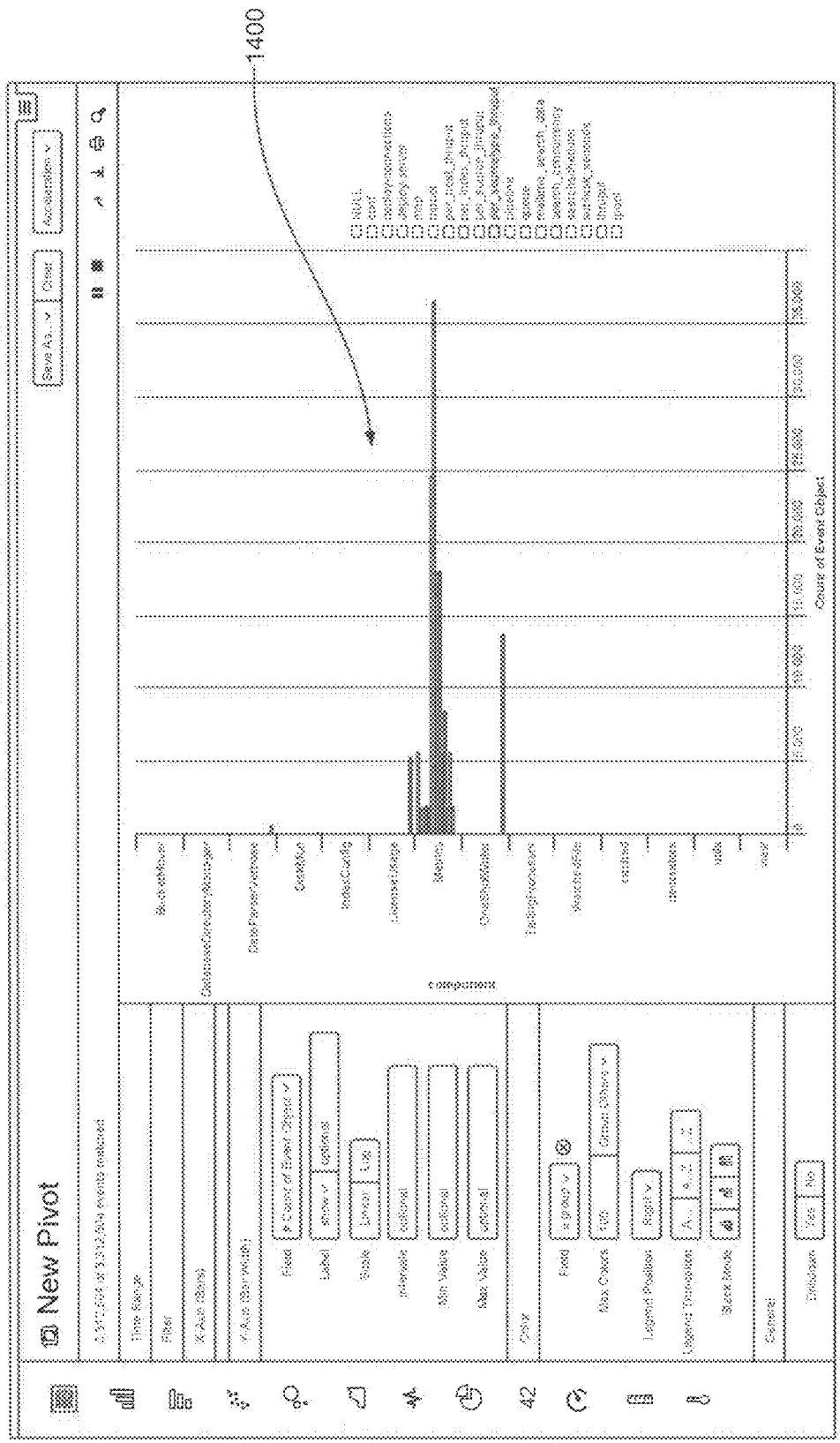
Figure 15:
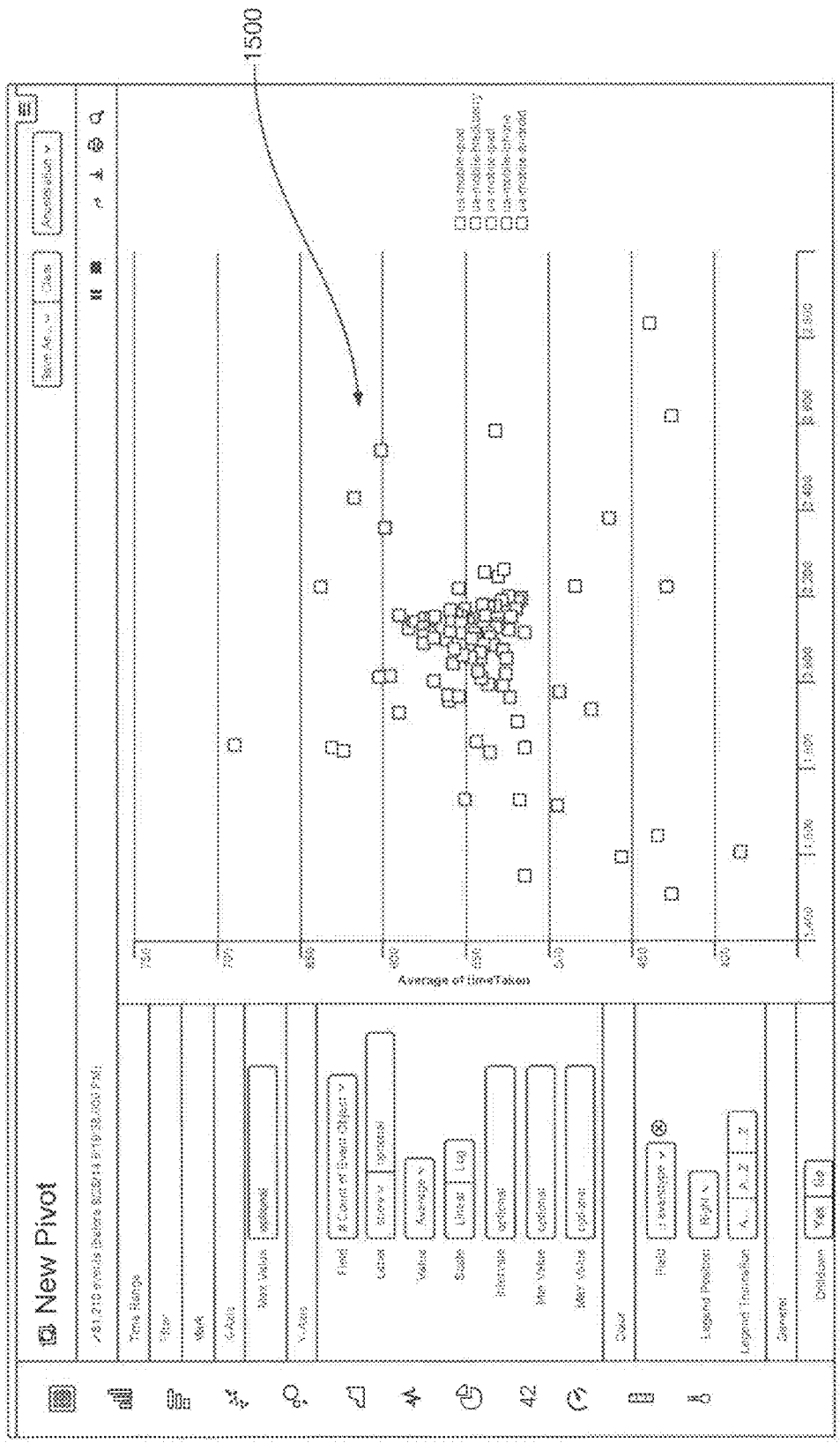

The reporting application allows the user to create graphical visualizations of the statistics generated for a report. For example, FIG. 13 illustrates an example graphical user interface 1300 that may display a set of components and associated statistics 1301. The reporting application allows the user to select a visualization of the statistics in a graph (e.g., bar chart, scatter plot, area chart, line chart, pie chart, radial gauge, marker gauge, filler gauge, etc.), where the format of the graph may be selected using the user interface controls 1302 along the left panel of the user interface 1300. FIG. 14 illustrates an example of a bar chart visualization 1400 of an aspect of the statistical data 1301. FIG. 15 illustrates a scatter plot visualization 1500 of an aspect of the statistical data 1301.

2.13. Acceleration Technique

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, the data intake and query system also employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.13.1. Aggregation Technique

To facilitate faster query processing, a query can be structured such that multiple indexers perform the query in parallel, while aggregation of search results from the multiple indexers is performed locally at the search head. For example, FIG. 16 is an example search query received from a client and executed by search peers, in accordance with example embodiments. FIG. 16 illustrates how a search query 1602 received from a client at a search head 210 can split into two phases, including: (1) subtasks 1604 (e.g., data retrieval or simple filtering) that may be performed in parallel by indexers 206 for execution, and (2) a search results aggregation operation 1606 to be executed by the search head when the results are ultimately collected from the indexers.

During operation, upon receiving search query 1602, a search head 210 determines that a portion of the operations involved with the search query may be performed locally by the search head. The search head modifies search query 1602 by substituting "stats" (create aggregate statistics over results sets received from the indexers at the search head) with "prestats" (create statistics by the indexer from local results set) to produce search query 1604, and then distributes search query 1604 to distributed indexers, which are also referred to as "search peers" or "peer indexers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 6A, or may alternatively distribute a modified version (e.g., a more restricted version) of the search query to the search peers. In this example, the indexers are responsible for producing the results and sending them to the search head. After the indexers return the results to the search head, the search head aggregates the received results 1606 to form a single search result set. By executing the query in this manner, the system effectively distributes the computational operations across the indexers while minimizing data transfers.

2.13.2. Keyword Index

As described above with reference to the flow charts in FIG. 5A and FIG. 6A, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.13.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the events and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", issued on 8 Sep. 2015, and U.S. patent application Ser. No. 14/815,973, entitled "GENERATING AND STORING SUMMARIZATION TABLES FOR SETS OF SEARCHABLE EVENTS", filed on 1 Aug. 2015, each of which is hereby incorporated by reference in its entirety for all purposes.

To speed up certain types of queries, e.g., frequently encountered queries or computationally intensive queries, some embodiments of system 108 create a high performance analytics store, which is referred to as a "summarization table," (also referred to as a "lexicon" or "inverted index") that contains entries for specific field-value pairs. Each of these entries keeps track of instances of a specific value in a specific field in the event data and includes references to events containing the specific value in the specific field. For example, an example entry in an inverted index can keep track of occurrences of the value "94107" in a "ZIP code" field of a set of events and the entry includes references to all of the events that contain the value "94107" in the ZIP code field. Creating the inverted index data structure avoids needing to incur the computational overhead each time a statistical query needs to be run on a frequently encountered field-value pair. In order to expedite queries, in most embodiments, the search engine will employ the inverted index separate from the raw record data store to generate responses to the received queries.

Note that the term "summarization table" or "inverted index" as used herein is a data structure that may be generated by an indexer that includes at least field names and field values that have been extracted and/or indexed from event records. An inverted index may also include reference values that point to the location(s) in the field searchable data store where the event records that include the field may be found. Also, an inverted index may be stored using well-known compression techniques to reduce its storage size.

Further, note that the term "reference value" (also referred to as a "posting value") as used herein is a value that references the location of a source record in the field searchable data store. In some embodiments, the reference value may include additional information about each record, such as timestamps, record size, meta-data, or the like. Each reference value may be a unique identifier which may be used to access the event data directly in the field searchable data store. In some embodiments, the reference values may be ordered based on each event record's timestamp. For example, if numbers are used as identifiers, they may be sorted so event records having a later timestamp always have a lower valued identifier than event records with an earlier timestamp, or vice-versa. Reference values are often included in inverted indexes for retrieving and/or identifying event records.

In one or more embodiments, an inverted index is generated in response to a user-initiated collection query. The term "collection query" as used herein refers to queries that include commands that generate summarization information and inverted indexes (or summarization tables) from event records stored in the field searchable data store.

Note that a collection query is a special type of query that can be user-generated and is used to create an inverted index. A collection query is not the same as a query that is used to call up or invoke a pre-existing inverted index. In one or more embodiment, a query can comprise an initial step that calls up a pre-generated inverted index on which further filtering and processing can be performed. For example, referring back to FIG. 13, a set of events generated at block 1320 by either using a "collection" query to create a new inverted index or by calling up a pre-generated inverted index. A query with several pipelined steps will start with a pre-generated index to accelerate the query.

FIG. 7C illustrates the manner in which an inverted index is created and used in accordance with the disclosed embodiments. As shown in FIG. 7C, an inverted index 722 can be created in response to a user-initiated collection query using the event data 723 stored in the raw record data store. For example, a non-limiting example of a collection query may include "collect clientip=127.0.0.1" which may result in an inverted index 722 being generated from the event data 723 as shown in FIG. 7C. Each entry in inverted index 722 includes an event reference value that references the location of a source record in the field searchable data store. The reference value may be used to access the original event record directly from the field searchable data store.

In one or more embodiments, if one or more of the queries is a collection query, the responsive indexers may generate summarization information based on the fields of the event records located in the field searchable data store. In at least one of the various embodiments, one or more of the fields used in the summarization information may be listed in the collection query and/or they may be determined based on terms included in the collection query. For example, a collection query may include an explicit list of fields to summarize. Or, in at least one of the various embodiments, a collection query may include terms or expressions that explicitly define the fields, e.g., using regex rules. In FIG. 7C, prior to running the collection query that generates the inverted index 722, the field name "clientip" may need to be defined in a configuration file by specifying the "access_combined" source type and a regular expression rule to parse out the client IP_address. Alternatively, the collection query may contain an explicit definition for the field name "clientip" which may obviate the need to reference the configuration file at search time.

In one or more embodiments, collection queries may be saved and scheduled to run periodically. These scheduled collection queries may periodically update the summarization information corresponding to the query. For example, if the collection query that generates inverted index 722 is scheduled to run periodically, one or more indexers would periodically search through the relevant buckets to update inverted index 722 with event data for any new events with the "clientip" value of "127.0.0.1."

In some embodiments, the inverted indexes that include fields, values, and reference value (e.g., inverted index 722) for event records may be included in the summarization information provided to the user. In other embodiments, a user may not be interested in specific fields and values contained in the inverted index, but may need to perform a statistical query on the data in the inverted index. For example, referencing the example of FIG. 7C rather than viewing the fields within summarization table 722, a user may want to generate a count of all client requests from IP address "127.0.0.1." In this case, the search engine would simply return a result of "4" rather than including details about the inverted index 722 in the information provided to the user.

The pipelined search language, e.g., SPL of the SPLUNK® ENTERPRISE system can be used to pipe the contents of an inverted index to a statistical query using the "stats" command for example. A "stats" query refers to queries that generate result sets that may produce aggregate and statistical results from event records, e.g., average, mean, max, min, rms, etc. Where sufficient information is available in an inverted index, a "stats" query may generate their result sets rapidly from the summarization information available in the inverted index rather than directly scanning event records. For example, the contents of inverted index 722 can be pipelined to a stats query, e.g., a "count" function that counts the number of entries in the inverted index and returns a value of "4." In this way, inverted indexes may enable various stats queries to be performed absent scanning or search the event records. Accordingly, this optimization technique enables the system to quickly process queries that seek to determine how many events have a particular value for a particular field. To this end, the system can examine the entry in the inverted index to count instances of the specific value in the field without having to go through the individual events or perform data extractions at search time.

In some embodiments, the system maintains a separate inverted index for each of the above-described time-specific buckets that stores events for a specific time range. A bucket-specific inverted index includes entries for specific field-value combinations that occur in events in the specific bucket. Alternatively, the system can maintain a separate inverted index for each indexer. The indexer-specific inverted index includes entries for the events in a data store that are managed by the specific indexer. Indexer-specific inverted indexes may also be bucket-specific. In at least one or more embodiments, if one or more of the queries is a stats query, each indexer may generate a partial result set from previously generated summarization information. The partial result sets may be returned to the search head that received the query and combined into a single result set for the query As mentioned above, the inverted index can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination. In some embodiments, if summarization information is absent from an indexer that includes responsive event records, further actions may be taken, such as, the summarization information may generated on the fly, warnings may be provided the user, the collection query operation may be halted, the absence of summarization information may be ignored, or the like, or combination thereof.

In one or more embodiments, an inverted index may be set up to update continually. For example, the query may ask for the inverted index to update its result periodically, e.g., every hour. In such instances, the inverted index may be a dynamic data structure that is regularly updated to include information regarding incoming events.

In some cases, e.g., where a query is executed before an inverted index updates, when the inverted index may not cover all of the events that are relevant to a query, the system can use the inverted index to obtain partial results for the events that are covered by inverted index, but may also have to search through other events that are not covered by the inverted index to produce additional results on the fly. In other words, an indexer would need to search through event data on the data store to supplement the partial results. These additional results can then be combined with the partial results to produce a final set of results for the query. Note that in typical instances where an inverted index is not completely up to date, the number of events that an indexer would need to search through to supplement the results from the inverted index would be relatively small. In other words, the search to get the most recent results can be quick and efficient because only a small number of event records will be searched through to supplement the information from the inverted index. The inverted index and associated techniques are described in more detail in U.S. Pat. No. 8,682,925, entitled "DISTRIBUTED HIGH PERFORMANCE ANALYTICS STORE", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.13.3.1 Extracting Event Data Using Posting

In one or more embodiments, if the system needs to process all events that have a specific field-value combination, the system can use the references in the inverted index entry to directly access the events to extract further information without having to search all of the events to find the specific field-value combination at search time. In other words, the system can use the reference values to locate the associated event data in the field searchable data store and extract further information from those events, e.g., extract further field values from the events for purposes of filtering or processing or both.

The information extracted from the event data using the reference values can be directed for further filtering or processing in a query using the pipeline search language. The pipelined search language will, in one embodiment, include syntax that can direct the initial filtering step in a query to an inverted index. In one embodiment, a user would include syntax in the query that explicitly directs the initial searching or filtering step to the inverted index.

Referencing the example in FIG. 15, if the user determines that she needs the user id fields associated with the client requests from IP address "127.0.0.1," instead of incurring the computational overhead of performing a brand new search or re-generating the inverted index with an additional field, the user can generate a query that explicitly directs or pipes the contents of the already generated inverted index 1502 to another filtering step requesting the user ids for the entries in inverted index 1502 where the server response time is greater than "0.0900" microseconds. The search engine would use the reference values stored in inverted index 722 to retrieve the event data from the field searchable data store, filter the results based on the "response time" field values and, further, extract the user id field from the resulting event data to return to the user. In the present instance, the user ids "frank" and "carlos" would be returned to the user from the generated results table 722.

In one embodiment, the same methodology can be used to pipe the contents of the inverted index to a processing step. In other words, the user is able to use the inverted index to efficiently and quickly perform aggregate functions on field values that were not part of the initially generated inverted index. For example, a user may want to determine an average object size (size of the requested gif) requested by clients from IP address "127.0.0.1." In this case, the search engine would again use the reference values stored in inverted index 722 to retrieve the event data from the field searchable data store and, further, extract the object size field values from the associated events 731, 732, 733 and 734. Once, the corresponding object sizes have been extracted (i.e. 2326, 2900, 2920, and 5000), the average can be computed and returned to the user.

In one embodiment, instead of explicitly invoking the inverted index in a user-generated query, e.g., by the use of special commands or syntax, the SPLUNK® ENTERPRISE system can be configured to automatically determine if any prior-generated inverted index can be used to expedite a user query. For example, the user's query may request the average object size (size of the requested gif) requested by clients from IP address "127.0.0.1." without any reference to or use of inverted index 722. The search engine, in this case, would automatically determine that an inverted index 722 already exists in the system that could expedite this query. In one embodiment, prior to running any search comprising a field-value pair, for example, a search engine may search though all the existing inverted indexes to determine if a pre-generated inverted index could be used to expedite the search comprising the field-value pair. Accordingly, the search engine would automatically use the pre-generated inverted index, e.g., index 722 to generate the results without any user-involvement that directs the use of the index.

Using the reference values in an inverted index to be able to directly access the event data in the field searchable data store and extract further information from the associated event data for further filtering and processing is highly advantageous because it avoids incurring the computation overhead of regenerating the inverted index with additional fields or performing a new search.

The data intake and query system includes one or more forwarders that receive raw machine data from a variety of input data sources, and one or more indexers that process and store the data in one or more data stores. By distributing events among the indexers and data stores, the indexers can analyze events for a query in parallel. In one or more embodiments, a multiple indexer implementation of the search system would maintain a separate and respective inverted index for each of the above-described time-specific buckets that stores events for a specific time range. A bucket-specific inverted index includes entries for specific field-value combinations that occur in events in the specific bucket. As explained above, a search head would be able to correlate and synthesize data from across the various buckets and indexers.

This feature advantageously expedites searches because instead of performing a computationally intensive search in a centrally located inverted index that catalogues all the relevant events, an indexer is able to directly search an inverted index stored in a bucket associated with the time-range specified in the query. This allows the search to be performed in parallel across the various indexers. Further, if the query requests further filtering or processing to be conducted on the event data referenced by the locally stored bucket-specific inverted index, the indexer is able to simply access the event records stored in the associated bucket for further filtering and processing instead of needing to access a central repository of event records, which would dramatically add to the computational overhead.

In one embodiment, there may be multiple buckets associated with the time-range specified in a query. If the query is directed to an inverted index, or if the search engine automatically determines that using an inverted index would expedite the processing of the query, the indexers will search through each of the inverted indexes associated with the buckets for the specified time-range. This feature allows the High Performance Analytics Store to be scaled easily.

In certain instances, where a query is executed before a bucket-specific inverted index updates, when the bucket-specific inverted index may not cover all of the events that are relevant to a query, the system can use the bucket-specific inverted index to obtain partial results for the events that are covered by bucket-specific inverted index, but may also have to search through the event data in the bucket associated with the bucket-specific inverted index to produce additional results on the fly. In other words, an indexer would need to search through event data stored in the bucket (that was not yet processed by the indexer for the corresponding inverted index) to supplement the partial results from the bucket-specific inverted index.

FIG. 7D presents a flowchart illustrating how an inverted index in a pipelined search query can be used to determine a set of event data that can be further limited by filtering or processing in accordance with the disclosed embodiments.

At block 742, a query is received by a data intake and query system. In some embodiments, the query can be received as a user generated query entered into a search bar of a graphical user search interface. The search interface also includes a time range control element that enables specification of a time range for the query.

At block 744, an inverted index is retrieved. Note, that the inverted index can be retrieved in response to an explicit user search command inputted as part of the user generated query. Alternatively, the search engine can be configured to automatically use an inverted index if it determines that using the inverted index would expedite the servicing of the user generated query. Each of the entries in an inverted index keeps track of instances of a specific value in a specific field in the event data and includes references to events containing the specific value in the specific field. In order to expedite queries, in most embodiments, the search engine will employ the inverted index separate from the raw record data store to generate responses to the received queries.

At block 746, the query engine determines if the query contains further filtering and processing steps. If the query contains no further commands, then, in one embodiment, summarization information can be provided to the user at block 754.

If, however, the query does contain further filtering and processing commands, then at block 750, the query engine determines if the commands relate to further filtering or processing of the data extracted as part of the inverted index or whether the commands are directed to using the inverted index as an initial filtering step to further filter and process event data referenced by the entries in the inverted index. If the query can be completed using data already in the generated inverted index, then the further filtering or processing steps, e.g., a "count" number of records function, "average" number of records per hour etc. are performed and the results are provided to the user at block 752.

If, however, the query references fields that are not extracted in the inverted index, then the indexers will access event data pointed to by the reference values in the inverted index to retrieve any further information required at block 756. Subsequently, any further filtering or processing steps are performed on the fields extracted directly from the event data and the results are provided to the user at step 758.

2.13.4. Accelerating Report Generation

In some embodiments, a data server system such as the data intake and query system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on these additional events. Then, the results returned by this query on the additional events, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer events needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety for all purposes.

2.14. Security Features

The data intake and query system provides various schemas, dashboards, and visualizations that simplify developers' tasks to create applications with additional capabilities. One such application is the an enterprise security application, such as SPLUNK® ENTERPRISE SECURITY, which performs monitoring and alerting operations and includes analytics to facilitate identifying both known and unknown security threats based on large volumes of data stored by the data intake and query system. The enterprise security application provides the security practitioner with visibility into security-relevant threats found in the enterprise infrastructure by capturing, monitoring, and reporting on data from enterprise security devices, systems, and applications. Through the use of the data intake and query system searching and reporting capabilities, the enterprise security application provides a top-down and bottom-up view of an organization's security posture.

The enterprise security application leverages the data intake and query system search-time normalization techniques, saved searches, and correlation searches to provide visibility into security-relevant threats and activity and generate notable events for tracking. The enterprise security application enables the security practitioner to investigate and explore the data to find new or unknown threats that do not follow signature-based patterns.

Conventional Security Information and Event Management (STEM) systems lack the infrastructure to effectively store and analyze large volumes of security-related data. Traditional SIEM systems typically use fixed schemas to extract data from pre-defined security-related fields at data ingestion time and store the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the enterprise security application system stores large volumes of minimally-processed security-related data at ingestion time for later retrieval and analysis at search time when a live security threat is being investigated. To facilitate this data retrieval process, the enterprise security application provides pre-specified schemas for extracting relevant values from the different types of security-related events and enables a user to define such schemas.

The enterprise security application can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. Pat. No. 9,215,240, entitled "INVESTIGATIVE AND DYNAMIC DETECTION OF POTENTIAL SECURITY-THREAT INDICATORS FROM EVENTS IN BIG DATA", issued on 15 Dec. 2015, U.S. Pat. No. 9,173,801, entitled "GRAPHIC DISPLAY OF SECURITY THREATS BASED ON INDICATIONS OF ACCESS TO NEWLY REGISTERED DOMAINS", issued on 3 Nov. 2015, U.S. Pat. No. 9,248,068, entitled "SECURITY THREAT DETECTION OF NEWLY REGISTERED DOMAINS", issued on 2 Feb. 2016, U.S. Pat. No. 9,426,172, entitled "SECURITY THREAT DETECTION USING DOMAIN NAME ACCESSES", issued on 23 Aug. 2016, and U.S. Pat. No. 9,432,396, entitled "SECURITY THREAT DETECTION USING DOMAIN NAME REGISTRATIONS", issued on 30 Aug. 2016, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the enterprise security application facilitates detecting "notable events" that are likely to indicate a security threat. A notable event represents one or more anomalous incidents, the occurrence of which can be identified based on one or more events (e.g., time stamped portions of raw machine data) fulfilling pre-specified and/or dynamically-determined (e.g., based on machine-learning) criteria defined for that notable event. Examples of notable events include the repeated occurrence of an abnormal spike in network usage over a period of time, a single occurrence of unauthorized access to system, a host communicating with a server on a known threat list, and the like. These notable events can be detected in a number of ways, such as: (1) a user can notice a correlation in events and can manually identify that a corresponding group of one or more events amounts to a notable event; or (2) a user can define a "correlation search" specifying criteria for a notable event, and every time one or more events satisfy the criteria, the application can indicate that the one or more events correspond to a notable event; and the like. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

The enterprise security application provides various visualizations to aid in discovering security threats, such as a "key indicators view" that enables a user to view security metrics, such as counts of different types of notable events. For example, FIG. 17A illustrates an example key indicators view 1700 that comprises a dashboard, which can display a value 1701, for various security-related metrics, such as malware infections 1702. It can also display a change in a metric value 1703, which indicates that the number of malware infections increased by 63 during the preceding interval. Key indicators view 1700 additionally displays a histogram panel 1704 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 17B illustrates an example incident review dashboard 1710 that includes a set of incident attribute fields 1711 that, for example, enables a user to specify a time range field 1712 for the displayed events. It also includes a timeline 1713 that graphically illustrates the number of incidents that occurred in time intervals over the selected time range. It additionally displays an events list 1714 that enables a user to view a list of all of the notable events that match the criteria in the incident attributes fields 1711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.15. Data Center Monitoring

As mentioned above, the data intake and query platform provides various features that simplify the developers' task to create various applications. One such application is a virtual machine monitoring application, such as SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the virtual machine monitoring application stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the virtual machine monitoring application provides pre-specified schemas for extracting relevant values from different types of performance-related events, and also enables a user to define such schemas.

The virtual machine monitoring application additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 17C, wherein nodes 1733 and 1734 are selectively expanded. Note that nodes 1731-1739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. Pat. No. 9,185,007, entitled "PROACTIVE MONITORING TREE WITH SEVERITY STATE SORTING", issued on 10 Nov. 2015, and U.S. Pat. No. 9,426,045, also entitled "PROACTIVE MONITORING TREE WITH SEVERITY STATE SORTING", issued on 23 Aug. 2016, each of which is hereby incorporated by reference in its entirety for all purposes.

The virtual machine monitoring application also provides a user interface that enables a user to select a specific time range and then view heterogeneous data comprising events, log data, and associated performance metrics for the selected time range. For example, the screen illustrated in FIG. 17D displays a listing of recent "tasks and events" and a listing of recent "log entries" for a selected time range above a performance-metric graph for "average CPU core utilization" for the selected time range. Note that a user is able to operate pull-down menus 1742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

3.0. Extended Reality Overlays in an Industrial Environment

As described above, one problem with the conventional approaches for monitoring and/or servicing machines in a particular operating environment is that a user may have difficulty locating a physical machine for which information is sought. Additionally, once a user has located a particular machine, the user may not be able to determine a status of that machine.

Accordingly, in various embodiments disclosed herein, optical data markers may be implemented to enable machines to be quickly and reliably identified. Further, data stored in association with an optical data marker may be used to overlay relevant information onto the machine. Alternatively, if an optical data marker is unavailable for a particular machine, a geofence in which the machine is located may be determined. The machine may then be identified based on a listing of known machines included in the geofence as well as based on visual and/or auditory data that is acquired from the machine. These techniques are described below in further detail in conjunction with FIGS. 18A-34.

3.1. Optical Data Marker-Based Extended Reality Techniques

FIG. 18A illustrates a more detailed view of the example networked computer environment 100 of FIG. 1, in accordance with example embodiments. As shown, the networked computer environment 1800 may include, without limitation, a data intake and query system 108, and a client device 404 (also referred to herein as a mobile device) communicating with one another over one or more networks 420. The data intake and query system 108 and client device 404 function substantially the same as described in conjunction with FIGS. 1 and 4, except as further described herein. Examples of client devices 404 may include, without limitation, smartphones, tablet computers, handheld computers, wearable devices, laptop computers, desktop computers, servers, portable media players, gaming devices, and so forth. The client device 404 may include, without limitation, a processor 1802, storage 1804, an input/output (I/O) device interface 1806, a network interface 1808, an interconnect 1810, and a system memory 1812.

In general, processor 1802 may retrieve and execute programming instructions stored in system memory 1812. Processor 1802 may be any technically feasible form of processing device configured to process data and execute program code. Processor 1802 could be, for example, a central processing unit (CPU), a graphics processing unit (GPU), an application-specific integrated circuit (ASIC), a field-programmable gate array (FPGA), and so forth. Processor 1802 stores and retrieves application data residing in the system memory 1812. Processor 1802 is included to be representative of a single CPU, multiple CPUs, a single CPU having multiple processing cores, and the like. In operation, processor 1802 is the master processor of the client device 404, controlling and coordinating operations of other system components. System memory 1812 stores software application programs and data for use by processor 1802. Processor 1802 executes software application programs stored within system memory 1812 and optionally an operating system. In particular, processor 1802 executes software and then performs one or more of the functions and operations set forth in the present application.

The storage 1804 may be a disk drive storage device. Although shown as a single unit, the storage 1804 may be a combination of fixed and/or removable storage devices, such as fixed disc drives, floppy disc drives, tape drives, removable memory cards, or optical storage, network attached storage (NAS), or a storage area-network (SAN). Processor 1802 communicates to other computing devices and systems via network interface 1808, where network interface 1808 is configured to transmit and receive data via one or more communications networks 420.

The interconnect 1810 facilitates transmission, such as of programming instructions and application data, between the processor 1802, input/output (I/O) devices interface 1806, storage 1804, network interface 1808, and system memory 1812. The I/O devices interface 1806 is configured to receive input data from user I/O devices. These I/O devices include, without limitation, camera(s) 1820, location sensor(s) 1822, a display device 1824, and microphone(s) 1826. Display device 1824 generally represents any technically feasible means for generating an image for display. For example, the display device may be a liquid crystal display (LCD) display, organic light emitting diode (OLED) display, or DLP display. Camera 1820 acquires images via a lens and converts the images into digital form. The images acquired by the camera 1820 may be stored in storage 1804 and/or system memory 1812. An acquired image may be displayed on the display device 1824, either alone or in conjunction with one or more other acquired images, graphical overlays, and/or other data.

Location sensor 1822 enables client device 404 to determine the physical location and orientation of client device 404. In some embodiments, location sensor 1822 may include a network-based sensor that communicates with data intake and query system 108 via one or more network(s) 420, which may be part of a production monitoring network. In some embodiments, location sensor 1822 may include a network-based sensor that communicates with one or more data intake and query systems via a local area network and/or a wide area network. In various embodiments, the production monitoring environment may include multiple machines and/or multiples client devices 404, each of which may communicate with a data intake and query system and each of which is capable of identifying one or more machines based on optical data markers, geofences, and/or any other machine identification technique disclosed herein. Microphone 1826 acquires audio signals for storage and analysis. Additional examples of user I/O devices (not explicitly shown) may include one or more buttons, a keyboard, and a mouse or other pointing device. The I/O devices interface 1806 may also include an audio output unit configured to generate an electrical audio output signal, and the additional user I/O devices may further include a speaker configured to generate an acoustic output in response to the electrical audio output signal.

The system memory 1812 may include, without limitation, an extended reality application 1814 and a database 1816. Processor 1802 executes the extended reality application 1814, to perform one or more of the techniques disclosed herein and to store data in and retrieve data from database 1816.

FIG. 18B illustrates a network architecture 1801 that enables secure communications between extended reality application 1814 and an on-premises environment 1860 for data intake and query system 108, in accordance with example embodiments. As described above, a user may install and configure, on computing devices owned and operated by the user, one or more software applications that implement some or all of the data intake and query system 108. For example, a user may install a software application on server computers owned by the user and configure each server to operate as one or more of a forwarder, an indexer, a search head, etc. This arrangement generally may be referred to as an "on-premises" solution. An on-premises solution may provide a greater level of control over the configuration of certain aspects of the system (e.g., security, privacy, standards, controls, etc.).

Implementing data intake and query system 108 in an on-premises environment 1860 may present various challenges. For example, enabling instances of extended reality application 1814 executing on client devices 404 to securely communicate with data intake and query system 108 may require the on-premises environment 1860 to allow mobile applications to bypass a firewall, which may create security concerns. Accordingly, in various embodiments, cloud-based data intake and query system 306 executing in cloud environment 1850 may serve as a secure bridge between extended reality application 1814 and an on-premises environment 1860. In other implementations, the on-premises environment 1860 may be omitted and the entire computational process may be carried out in one or more aspects or components of cloud environment 1850.

As shown in FIG. 18B, cloud environment 1850 may include cloud-based data intake and query system 306, which communicates with data intake and query system 108 via network 304. Cloud environment 1850 may further include middleware code 1852 and/or push notification service 1854, which communicate with extended reality application 1814 via network 420. In various embodiments, network 304 and network 420 may be the same network or may include one or more shared network components that communicate with both network 304 and network 420.

In operation, extended reality application 1814 executing on client device 404 may establish secure, bidirectional communications with data intake and query system 108. For example, in some embodiments, a persistent, always-open, asynchronous socket for bidirectional communications (e.g., a Web Socket connection) through a firewall of on-premises environment 1860 could be established between data intake and query system 108 and cloud-based data intake and query system 306. Cloud-based data intake and query system 306 may then communicate with extended reality application 1814 via middleware code 1852 executing in cloud environment 1850. Additionally, in some embodiments, cloud-based data intake and query system 306 and/or middleware code 1852 may communicate with extended reality application 1814 via a push notification service 1854, such as Apple Push Notification service (APNs) or Google Cloud Messaging (GCM). For example, data intake and query system 108 could output, to one or more client devices 404, various schemas, dashboards, playbooks, runbooks, cards, and/or visualizations that include real-time data associated with a particular machine. The schemas, dashboards, cards, and/or visualizations may then be overlaid with the real-world component by extended reality application 1814 in conjunction with an optional mobile template, as discussed below in further detail. Additionally or alternatively, playbooks and/or runbooks that include set of commands and/or simple logic trees (e.g., if-then-else) associated with an object and possible actions (e.g., "if the operating temperature is above 100 degrees celsius, then show options for activating fans) may be implemented and/or displayed to the user.

In some embodiments, in order to authenticate an instance of extended reality application 1814 associated with a particular user and/or client device 404, extended reality application 1814 may cause a unique identifier associated with the user and/or client device 404 to be displayed on a display device (e.g., on a display of client device 404). The user may then register the unique identifier with cloud-based data intake and query system 306 and/or data intake and query system 108, such as by entering the unique identifier into a user interface (e.g., a web portal) associated with cloud-based data intake and query system 306 or data intake and query system 108. In response, the extended reality application 1814 may receive credentials that can be used to access real-time data outputted by data intake and query system 108. Additional queries transmitted by client device 404 to data intake and query system 108 may then implement the credentials associated with the unique identifier. In this manner, secure, bidirectional communications may be established between client device 404 and data intake and query system 108.

Once the communications connection is established, a technician points a camera 1820 of client device 404 towards one or more machines that include optical data markers, such as quick response (QR) codes and bar codes. Extended reality application 1814 receives a digital image acquired via a camera 1820 associated with client device 404. Extended reality application 1814 then detects optical data markers present in the digital image. For example, extended reality application 1814 could detect a single optical data marker or could concurrently detect multiple optical data markers present in the digital image. Extended reality application 1814 then decodes the detected optical data markers and identifies the machines that are associated with the decoded optical data markers. More specifically, extended reality application 1814 decodes the detected optical data markers and retrieves a unique identifier (UID) from each optical data marker. In some embodiments, the unique identifier may identify a corresponding machine or other object. In some embodiments, the unique identifier may not specifically identify a corresponding machine or other object. In these embodiments, extended reality application 1814 and/or data intake and query system 108 may associate the unique identifier retrieved from the optical data marker with the machine or other object.

Further, extended reality application 1814 may determine the size, three-dimensional position, and/or orientation of the optical data marker. The size of the optical data marker may be a fixed size known to extended reality application 1814. Additionally or alternatively, the size of the optical data marker may be encoded into the data of the optical data marker. Further, extended reality application 1814 may detect the plane in which the optical data marker resides. As further described herein, extended reality application 1814 could then apply the size, position, orientation, and/or plane detection information to correctly scale, position, and orient the AR overlay associated with the optical data marker.

Next, extended reality application 1814 transmits queries to data intake and query system 108 requesting values for metrics associated with the identified machines. In response, data intake and query system 108 may retrieve events associated with the identified machines and use extraction rules to extract values for fields in the events being searched, where the extracted values include the requested metric values. Then, data intake and query system 108 transmits the field values associated with the identified machines to extended reality application 1814. Data intake and query system 108 may transmit the raw data retrieved from the field values included in the event data. Alternatively, data intake and query system 108 may filter, aggregate, or otherwise process the raw data prior to transmitting the field values.

The field values transmitted by data intake and query system 108 may be in any technically feasible format. In one example, the field values could include an augmented reality (AR) overlay. The AR overlay could be a full graphics overlay or a partial overlay. The AR overlay could include text data, numerical data, and/or color information. The AR overlay could further include icon data, such as a skull and crossbones symbol for a machine that has failed. The AR overlay could include a highlighted portion, signifying information of particular interest to the technician. Further, the field values could include only the underlying textual and/or numerical information, where extended reality application 1814 generates the AR overlay locally based on the underlying textual and/or numerical information. The AR overlay can be static or dynamically updated. In some implementations, the AR overlay can include interactive hooks to allow an operator of the system to interact with the AR overlay.

Although various embodiments disclosed herein are described in conjunction with augmented reality (AR) techniques (e.g., generating AR overlays), each augmented reality technique also may be implemented in a virtual reality (VR) environment. Likewise, each virtual reality (VR) technique disclosed herein also may be implemented in an augmented reality (AR) environment. For example, for clarity of explanation, various embodiments disclosed herein are described in conjunction with AR overlays. However, each of these embodiments could also be implemented by generating such overlays (e.g., field values, images, dashboards, cards, etc.) in a virtual reality (VR) environment. Accordingly, the term extended reality (XR) is sometimes used to refer to techniques that can be performed in an augmented reality (AR) reality environment, a virtual reality (VR) environment, and/or any combination thereof.

Extended reality application 1814 then receives the field values from data intake and query system 108, where the field values represent the values of one or more metrics associated with the identified machines. In an implementation, the field values are extracted from fields that are defined post-ingestion, e.g., at search time, as has been previously described, e.g., with a late-binding schema. Extended reality application 1814 generates an AR overlay, where the overlay is a visualization of the field values.

In various embodiments, extended reality application 1814 superimposes the AR overlay onto the image(s) acquired via the camera 1820. For example, the AR overlay could be overlaid at a position relative to the corresponding optical data marker, such as on top of the optical data marker and/or next to the optical data marker. Extended reality application 1814 then causes the images superimposed with the AR overlay to be displayed on the display device 1824. In some embodiments, extended reality application 1814 may cause the AR overlay to be displayed on the display device 1824, without displaying the acquired image. In general, extended reality application 1814 superimposes the AR overlay based on any one or more of one or more determined dimensions and/or positions of the machine or other object, the known size of the optical data marker, the three-dimensional location and/or orientation of the optical data marker, and the detected plane of the optical data marker.

In some embodiments, extended reality application 1814 may receive additional information from data intake and query system 108 and may display the additional information on the display device 1824. This additional information may be in any technically feasible format. For example, data intake and query system 108 could transmit various schemas, dashboards, cards, playbooks, runbooks, and/or visualizations that include data, including real-time data (e.g., near real-time data) associated with a particular machine. The schemas, dashboards, cards, playbooks, runbooks, and/or visualizations may then be overlaid with the real-world component by extended reality application 1814 in conjunction with an optional mobile template, as discussed below in further detail.

After superimposing the AR overlay, along with any appropriate schemas, dashboards, cards, playbooks, runbooks, and/or other visualizations, onto the image(s) acquired via the camera 1820, extended reality application 1814 may store the enhanced image in an enhanced image data store and/or in a memory associated with a processor (e.g., a memory of a central processing unit, graphics processing unit, etc.). In some embodiments, the enhanced image data store may be stored within database 1816. In some embodiments, extended reality application 1814 superimposes the AR overlay, along with any appropriate schemas, dashboards, cards, playbooks, runbooks, and/or other visualizations onto a virtual reality scene rather than onto an image acquired from the camera 1820. In such embodiments, the images stored in the enhanced image data store represent virtual reality (VR) images augmented with AR overlays, rather than acquired images augmented with AR overlays.

In some embodiments, extended reality application 1814 may generate a bounding box associated with the optical data marker and/or the associated machine or other object. Extended reality application 1814 may generate such a bounding box based on any of the data described above, such as size, position, orientation, and plane information of the optical data marker and/or the associated machine or other object. In such embodiments, extended reality application 1814 may employ the bounding box to scale (e.g., based on a scaling factor) the 2D or 3D model of the machine when generating the AR overlay. The boundary box information may be stored in the data of the optical data marker. Additionally or alternatively, extended reality application 1814 may generate the bounding box locally. Further, extended reality application 1814 may paint-fill one or more boundaries of the bounding box. Such a paint-filled bounding box may be employed as a rough 2D or 3D model of the machine in lieu of a more detailed 2D or 3D model.

In general, extended reality application 1814 acquires images, decodes optical data markers, receives field values extracted from events, generates schemas, dashboards, cards, and/or visualizations, generates AR overlays based on the field values, and causes the schemas, dashboards, cards, playbooks, runbooks, visualizations, and/or AR overlays to be displayed in a continuous manner as the camera 1820 is pointed at different machines in the industrial environment. In this manner, a technician may walk through an industrial environment and visually determine the status of the machines in that environment. For example, the technician may be able to quickly identify any machines that need attention, repair, or replacement. In one example, the AR overlay could display the operating temperature, CPU utilization, and/or memory utilization for a particular machine. By pointing the camera 1820 at the machine, the technician would then see the AR overlay, enabling the technician to visually determine whether the machine is operating at an excessive temperature or outside of a normal range of CPU or memory utilization. In another example, the AR overlay could display the revolutions per minute (RPM) of each of three fans included in a particular machine. The technician could then identify and locate a particular fan that has failed. Similarly, the AR overlay could display an operating temperature of each of two CPUs for a particular machine. The technician could then identify and locate a particular CPU that is operating at an excessive temperature.

In some embodiments, extended reality application 1814 further receives a two-dimensional (2D) or three-dimensional (3D) model of the machines identified via the optical data markers. The 2D or 3D model may be a simple outline, such as a border around a front panel or bezel of the machine. Alternatively, the 2D or 3D model may be a complex shape representing the housing of the machine. In some embodiments, extended reality application 1814 may receive the 2D or 3D model from data intake and query system 108. Additionally or alternatively, the 2D or 3D model may be encoded in the optical data marker. In the latter case, extended reality application 1814 decodes the optical data marker and retrieves the 2D or 3D model from the decoded data.

Once a 2D or 3D model is acquired, extended reality application 1814 calculates the size and/or the plane of the optical data marker in the acquired image. This can be done through a variety of plane detection techniques, some of which may leverage an arrangement of the optical data marker, e.g., a positioning or arrangements of certain portions of a QR code. In other implementations, e.g., when the optical data marker is attached to a fixed object, this information may be coded into the optical data marker. Extended reality application 1814 them compares the size and/or the plane of the optical data marker in the acquired image with the actual size of the optical data marker. Extended reality application 1814 may then scale and orient the model based on the comparison. When generating the AR overlay for a particular machine, extended reality application 1814 includes the scaled and oriented model in the AR overlay.

In some embodiments, extended reality application 1814 may be configured to generate a boundary or outline from measurements taken of a machine or other object of interest and store a 3D model of the machine based on the boundary or outline. In operation, a technician or may point the camera 1820 of the client device 404 at a machine or other physical object of interest. Extended reality application 1814 may display an image of the machine along with an AR measuring tape or other measurement tool. In various implementations, extended reality application 1814 may leverage other sensors of the client device 404, in addition to camera 1820, to assist in measurements of the object of interest, e.g., an accelerometer, a gyroscope, and a compass. The technician may manipulate the AR measuring tape along the outside of the machine to measure key dimensions of the machine. Extended reality application 1814 may also aid the technician in locating key coordinates of the machine, such as the location of the corners of an enclosure or housing associated with the machine.

Once the technician completes the scan, extended reality application 1814 may generate a rough outline of the machine based on the key dimensions and key coordinates of the machine. This rough outline may be used as a general or inexact 3D model that approximates a graphical bounding box surrounding the enclosure or housing of the machine. Extended reality application 1814 may further generate plane data that defines the planar surfaces of the enclosure or housing. In various implementations, extended reality application 1814 may offload some of the intermediate processing steps of generating the 3D model to server or cloud-based resources. The 3D model may be in any technically feasible format, including, without limitation, a scalable vector graphics (SVG) model or a polygonal mesh model. Extended reality application 1814 may store the 3D model and the plane data in the database 1816. Further, extended reality application 1814 may transmit the 3D model and plane data to data intake and query system 108 for storage. Additionally or alternatively, extended reality application 1814 may store the 3D model in the optical data marker associated with the machine. In another implementation, extended reality application 1814 may generate a new or additional optical data marker that includes the 3D model or a reference (e.g., a pointer, link, address, etc.) to a location of the 3D model.

Later, when a technician points the camera 1820 at the optical data marker, extended reality application 1814 retrieves the 3D model encoded into the optical data marker. Alternatively, extended reality application 1814 retrieves the unique identifier encoded into the optical data marker. Extended reality application 1814 then retrieves the 3D model associated with the unique identifier from either database 1816 or from data intake and query system 108. Further, the rough outline 3D model and/or the plane data for a given machine can be associated, either through best-fit matching, a machine learning algorithm, human intervention, or some combination thereof, with a higher-resolution, more complex 3D model, such as a 3D model of the machine generated by a computer aided design (CAD) application program. When generating the AR overlay for the machine associated with the optical data marker, extended reality application 1814 includes either the rough outline 3D model or the complex 3D model as part of the AR overlay. In other implementations, various techniques may be applied to the 3D model to increase or decrease the amount of space and/or resources required to store and/or render the 3D model as part of the overlay in the extended reality environment.

In addition, when a technician points the camera 1820 at a new machine that includes an optical data marker, extended reality application 1814 may detect plane data of the new machine. Extended reality application 1814 may then implement the plane data in order to determine how a 2D or 3D model of the machine will be positioned, oriented, scaled, etc.

In some embodiments, extended reality application 1814 may be configured to scan the boundary or outline of a machine or other object of interest and store a 3D model of the machine based on the boundary or outline. In operation, a technician or operator may point the camera 1820 of the client device 404 at a machine or other physical object of interest. Extended reality application 1814 may display an image of the machine. Extended reality application 1814 may detect an optical data marker associated with the machine and may determine that the corresponding machine has no corresponding 2D or 3D model. Extended reality application 1814 may then analyze images acquired via the camera 1820 to scan the machine and to perform an edge detection process. Based on the scan and edge detection, extended reality application 1814 may generate a boundary of a portion of the machine. In an implementation, this boundary may be highlighted or emphasized to the technician or other operator through various techniques, including using a paint-fill process, which will be described in more detail herein. Other techniques for drawing boundaries and allowing users to select them may be implemented instead of the paint-fill process. Thus, extended reality application 1814 may perform a paint-fill on the boundary to fill the boundary or outline with a color. Extended reality application 1814 may repeat the edge detection and paint-fill processes to generate a set of concentric or overlapping paint-filled boundaries. Extended reality application 1814 may further generate plane data that defines a planar surface of the paint-filled boundaries.

Once a set of paint-filled boundaries is generated, extended reality application 1814 may receive a selection of one of the boundaries. Typically, extended reality application 1814 displays the set of paint-filled boundaries, and the technician selects a boundary that most closely matches a contour of the machine, however other techniques could be implemented for narrowing down the set of paint-filled boundaries, including application of training data for similar sets. Extended reality application 1814 may optionally thicken the border of the selected boundary. The technician may repeat the process set forth above at different view angles, and extended reality application 1814 may generate a series of boundaries and corresponding plane data of the machine at different view angles. Extended reality application 1814 may then generate a 3D model, such as a 3D texture bitmask, based on the series of boundaries and corresponding plane data. Additionally or alternatively, extended reality application 1814 may generate an SVG model or polygon mesh model of the machine. Extended reality application 1814 may then store the 3D model in database 1814 and/or transmit the 3D model to data intake and query system 108.

Later, when a technician points the camera 1820 at the optical data marker, extended reality application 1814 retrieves the 3D model and displays the 3D model as part of the AR overlay, in the manner described above. In addition, when a technician points the camera 1820 at a new machine that includes an optical data marker, extended reality application 1814 may detect plane data of the new machine and retrieve an existing 3D model with matching plane data, as described above.

It will be appreciated that the system shown herein is illustrative and that variations and modifications are possible. In one example, the optical data markers described herein are in the form of QR codes. Each QR code may store up to approximately four kilobytes of data. However, any form of marker or code that includes a unique identifier for each machine in an industrial environment is within the scope of the present disclosure.

FIG. 19 illustrates various exemplary objects that may be present in an extended reality environment. Although FIG. 19 and associated figures refer to augmented reality, those of skill in the art will understand that the techniques described here can also be applied to any extended reality application, including virtual reality (e.g., with goggles or other immersive viewing equipment), and mixed reality, or in a virtual environment with augmented virtuality. Specifically, FIG. 19 illustrates a server rack 1900 and an industrial robot 1950 fitted with optical data markers corresponding to one or more augmented reality (AR) overlays, in accordance with example embodiments. As shown, the server rack 1900 includes five servers 1902, 1904, 1906, 1908, and 1910. The five servers correspond to optical data markers 1912, 1914, 1916, 1918, and 1920, respectively. Likewise, the industrial robot 1950 includes and corresponds to optical data marker 1960. Extended reality application 1814 generates (or receives, if the overlays are generated externally to extended reality application 1814, e.g., in a cloud or server resource) AR overlays based on optical data markers 1912, 1914, 1916, 1918, 1920, and 1960, as further described herein.

FIGS. 20A-20G illustrate how augmented reality (AR) overlays may be superimposed on various views of the server rack of FIG. 19, in accordance with example embodiments. In general, extended reality application 1814 generates and displays various display images 2000, 2002, 2004, 2006, 2008, 2010, and 2012 on the display device 1824 of client device 404. The display images 2000, 2002, 2004, 2006, 2008, 2010, and 2012 may include one or more real-world components, such as an image acquired from camera 1820 of client device 404. Extended reality application 1814 overlays the real-world component with AR overlays, as further described herein. In some embodiments, extended reality application 1814 may also overlay the real-world component with schemas, dashboards, cards, playbooks, runbooks, and/or visualizations in conjunction with an optional mobile template. The various overlays may include or be influenced by real-time data (e.g., near real-time data), which may be retrieved as will be described in more detail herein. After superimposing the AR overlays, along with any appropriate schemas, dashboards, cards, playbooks, runbooks, and/or other visualizations, onto the image(s) acquired via the camera 1820, extended reality application 1814 stores the enhanced images, as shown in display images 2004, 2006, 2008, 2010, and 2012, in an enhanced image data store. In some embodiments, the enhanced image data store may be stored within database 1816.

Figure 20A:
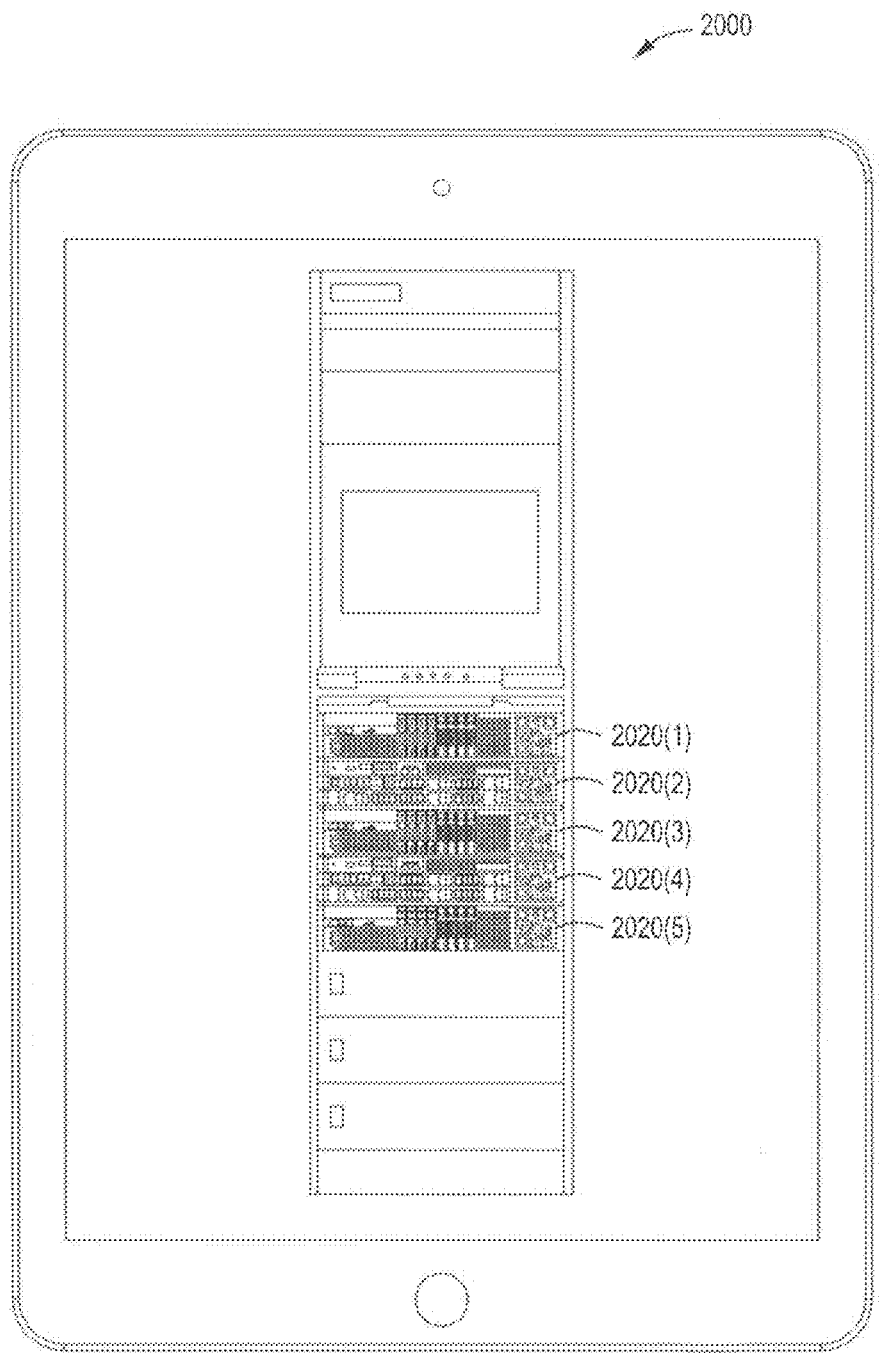

As shown in FIG. 20A, display image 2000 illustrates an image of a server rack, such as server rack 1900 of FIG. 19. In operation, a technician points a camera of the client device 404 toward the server rack until the client device 404 displays the image. The image of the server rack includes five optical data markers 2020(1), 2020(2), 2020(3), 2020(4), and 2020(5) corresponding to five servers installed in the server rack. In this example, the technician moves towards the server rack to acquire a close up image of the five servers and the corresponding optical data markers 2020(1), 2020(2), 2020(3), 2020(4), and 2020(5), although this is not necessary in various implementations as long as the camera of the client device has sufficient resolution to read and/or detect the optical data marker.

Figure 20B:
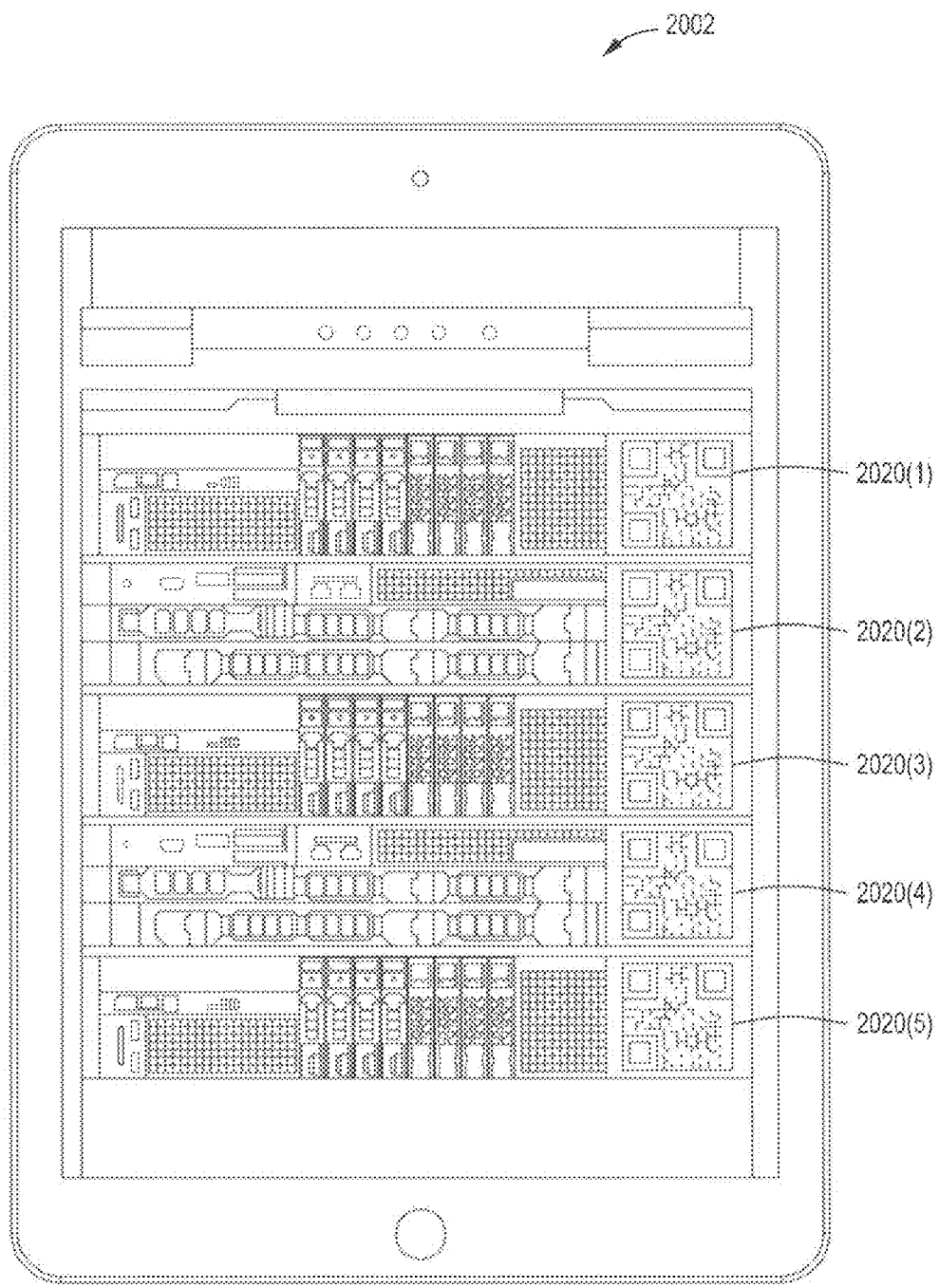

As shown in FIG. 20B, display image 2002 includes a close up image of the five servers. Extended reality application 1814 then retrieves a unique identifier encoded in each of the optical data markers 2020(1), 2020(2), 2020(3), 2020(4), and 2020(5). Next, extended reality application 1814 retrieves data associated with the optical data markers 2020(1), 2020(2), 2020(3), 2020(4), and 2020(5), such as the value of various metrics associated with the servers and a 2D or 3D model of the servers.

Figure 20C:
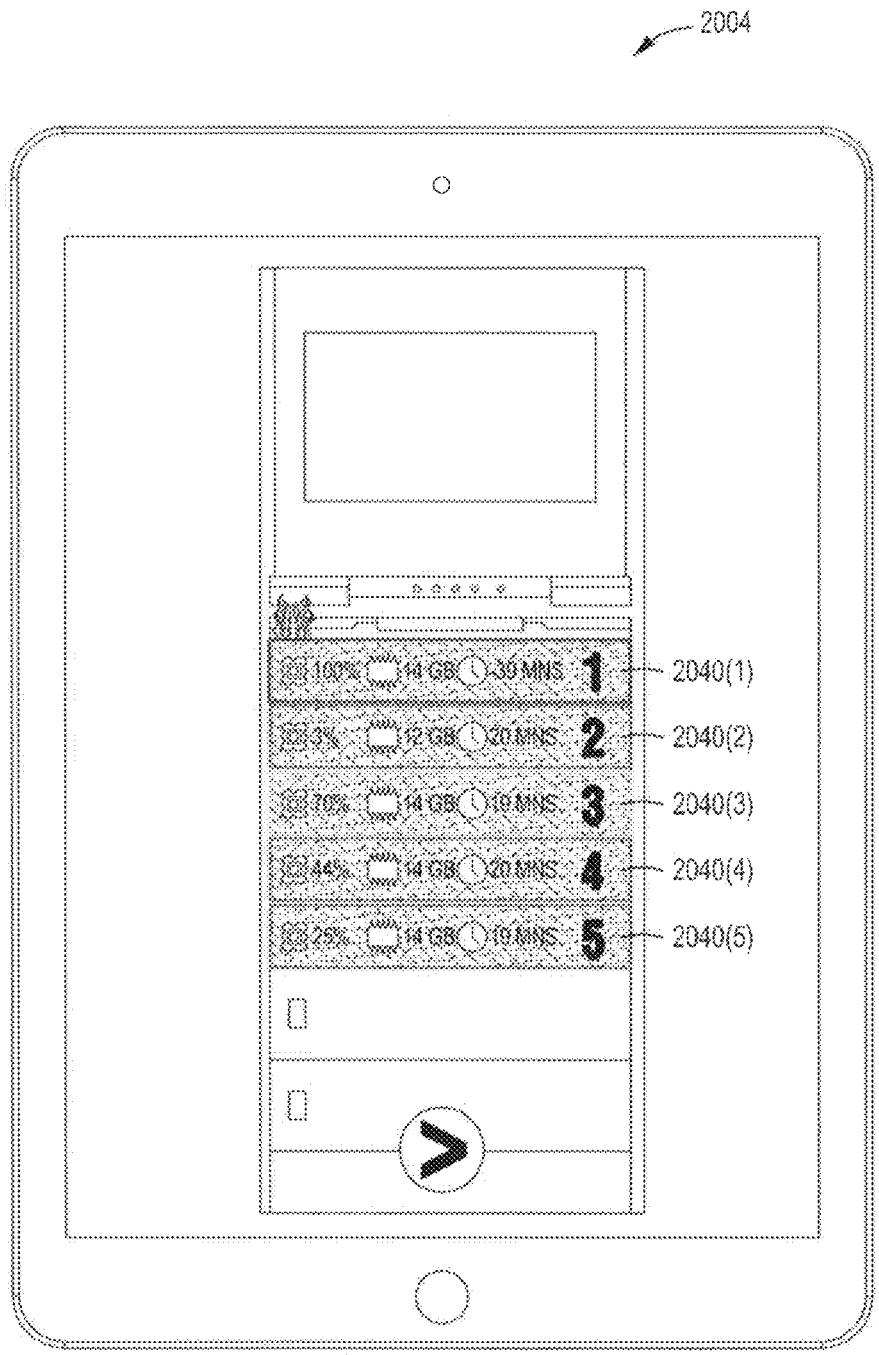

As shown in FIG. 20C, display image 2004 illustrates an augmented image of the five servers. Extended reality application 1814 generates and displays AR overlays 2040(1), 2040(2), 2040(3), 2040(4), and 2040(5) corresponding to optical data markers 2020(1), 2020(2), 2020(3), 2020(4), and 2020(5), respectively.

In various embodiments, in order to generate the AR overlays, extended reality application 1814 may compare the size and/or plane of the image of each of the optical data markers 2020(1), 2020(2), 2020(3), 2020(4), and 2020(5) to the original size of the optical data markers 2020(1), 2020(2), 2020(3), 2020(4), and 2020(5). Extended reality application 1814 may then scale and position the AR overlays 2040(1), 2040(2), 2040(3), 2040(4), and 2040(5) based on this comparison, for example, based on a scaling factor that relates one or more dimensions of an optical data marker to one or more dimensions of an object. AR overlay 2040(1) is shown with a red outline and with a flame icon, indicating that a temperature of the server associated with optical data marker 2020(1) is above a threshold level. AR overlay 2040(1) indicates that CPU utilization is at 100% and memory utilization is at 14 gigabytes. Further, AR overlay 2040(1) indicates a time of −39 minutes. The time may represent an uptime, indicating the time since the last reboot of the server. Alternatively, the time may represent a duration of time for which the machine has been in the current state and/or status. AR overlay 2040(2) is shown with a green outline, indicating that the server associated with optical data marker 2020(2) is at normal status. AR overlay 2040(2) indicates that CPU utilization is at 3% and memory utilization is at 12 gigabytes. AR overlay 2040(2) further indicates a time of 20 minutes. AR overlay 2040(3) is shown with a yellow outline, indicating that the server associated with optical data marker 2020(3) is at warning status. AR overlay 2040(3) indicates that CPU utilization is at 70% and memory utilization is at 14 gigabytes. AR overlay 2040(3) further indicates a time of 19 minutes. AR overlay 2040(4) and AR overlay 2040(5) are shown with a green outline, indicating that the servers associated with optical data markers 2020(4) and 2020(5) are at normal status.

In some embodiments, a portion of the AR overlays 2040(1), 2040(2), 2040(3), 2040(4), and 2040(5) may indicate a physical location of one or more specific components in the corresponding machine. Indicating a physical location of specific components may aid a technician in locating those components. In one example, a server could include multiple CPUs. Extended reality application 1814 could overlay the status of each CPU at the appropriate physical location for each CPU. In this manner, a technician could locate each CPU and assess which CPUs are operating normally and which CPUs are operating outside the normal operating range. Similarly, in another example, a server could include multiple fan assemblies. Extended reality application 1814 could overlay the status of each fan at the appropriate physical location for each fan. In this manner, a technician could locate each fan and assess which fans are operating normally and which fans are operating outside the normal operating range.

Figure 20D:
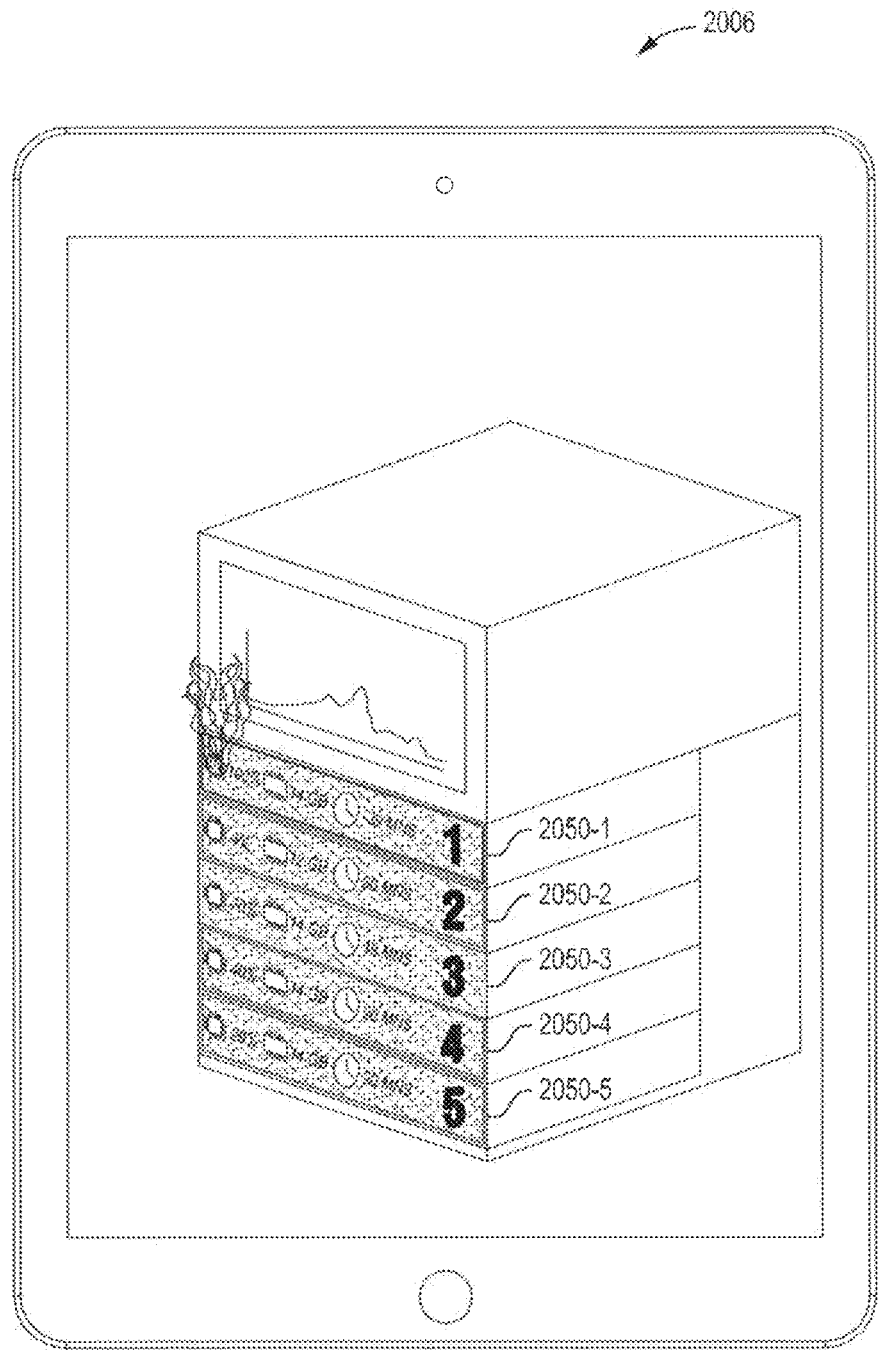

As shown in FIG. 20D, display image 2006 illustrates another augmented image of the five servers. In this case, the technician has moved to the right of the server rack. As a result, the image is now displayed at a different angle and with a different perspective relative to FIG. 20C. Extended reality application 1814 compares the size and plane of the image of each of the optical data markers 2020(1), 2020(2), 2020(3), 2020(4), and 2020(5) relative to the original size of the optical data markers 2020(1), 2020(2), 2020(3), 2020(4), and 2020(5). Extended reality application 1814 thereby determines that the image of the server rack is displayed with a different angle and perspective. Extended reality application 1814 then scales and locates the AR overlays 2050(1), 2050(2), 2050(3), 2050(4), and 2050(5) based on the new angle and perspective.

Figure 20E:
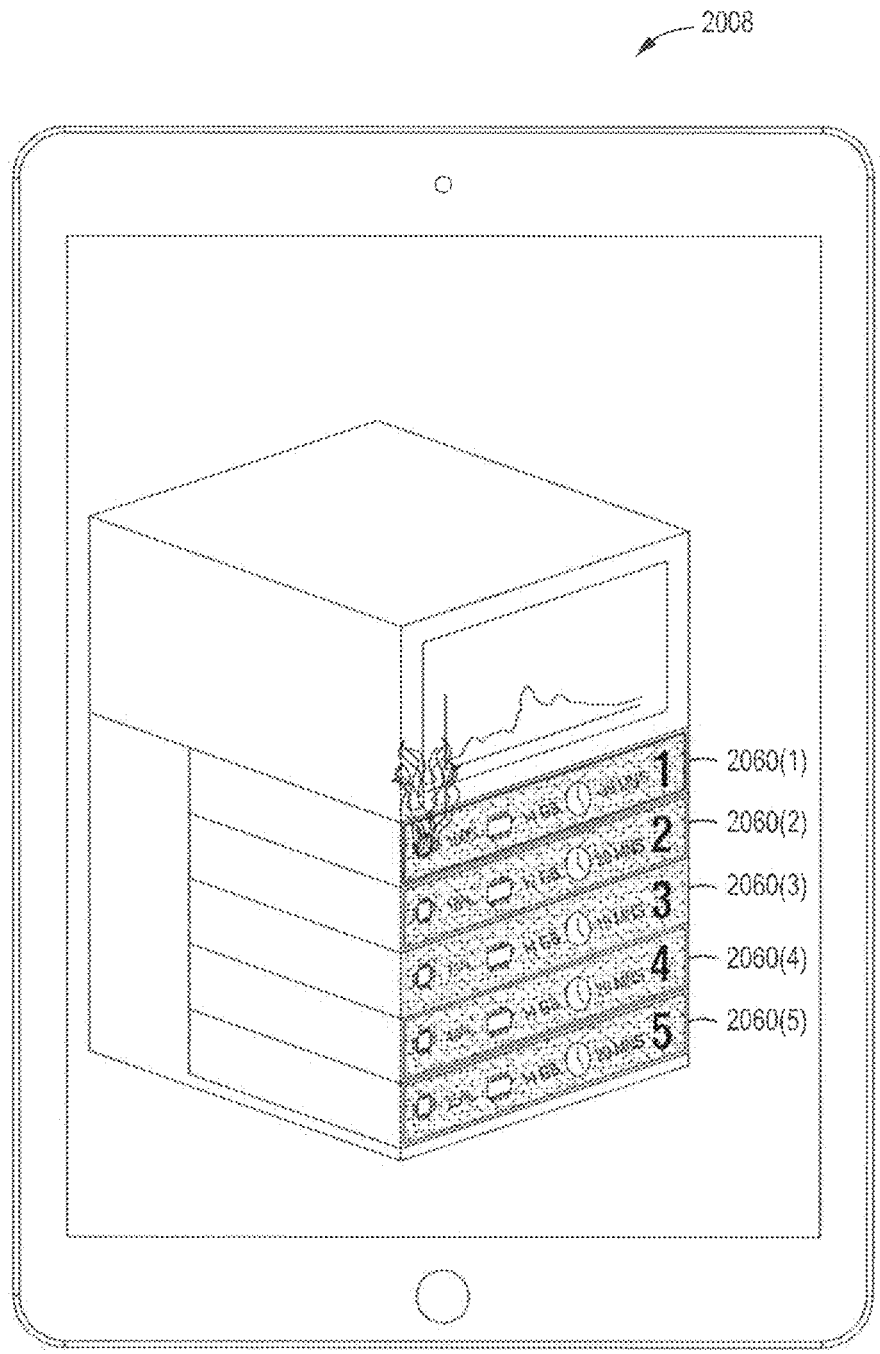

As shown in FIG. 20E, display image 2008 illustrates another augmented image of the five servers. In this case, the technician has moved to the left of the server rack. As a result, the image is now displayed at a different angle and with a different perspective relative to FIGS. 20C and 20D. Extended reality application 1814 again compares the size and plane of the image of each of the optical data markers

2020(1), 2020(2), 2020(3), 2020(4), and 2020(5) relative to the original size of the optical data markers 2020(1), 2020 (2), 2020(3), 2020(4), and 2020(5). Extended reality application 1814 thereby determines that the image of the server rack is displayed with a different angle and perspective. Accordingly, extended reality application 1814 again scales and locates the AR overlays 2060(1), 2060(2), 2060(3), 2060(4), and 2060(5) based on the new angle and perspective.

Figure 20F:
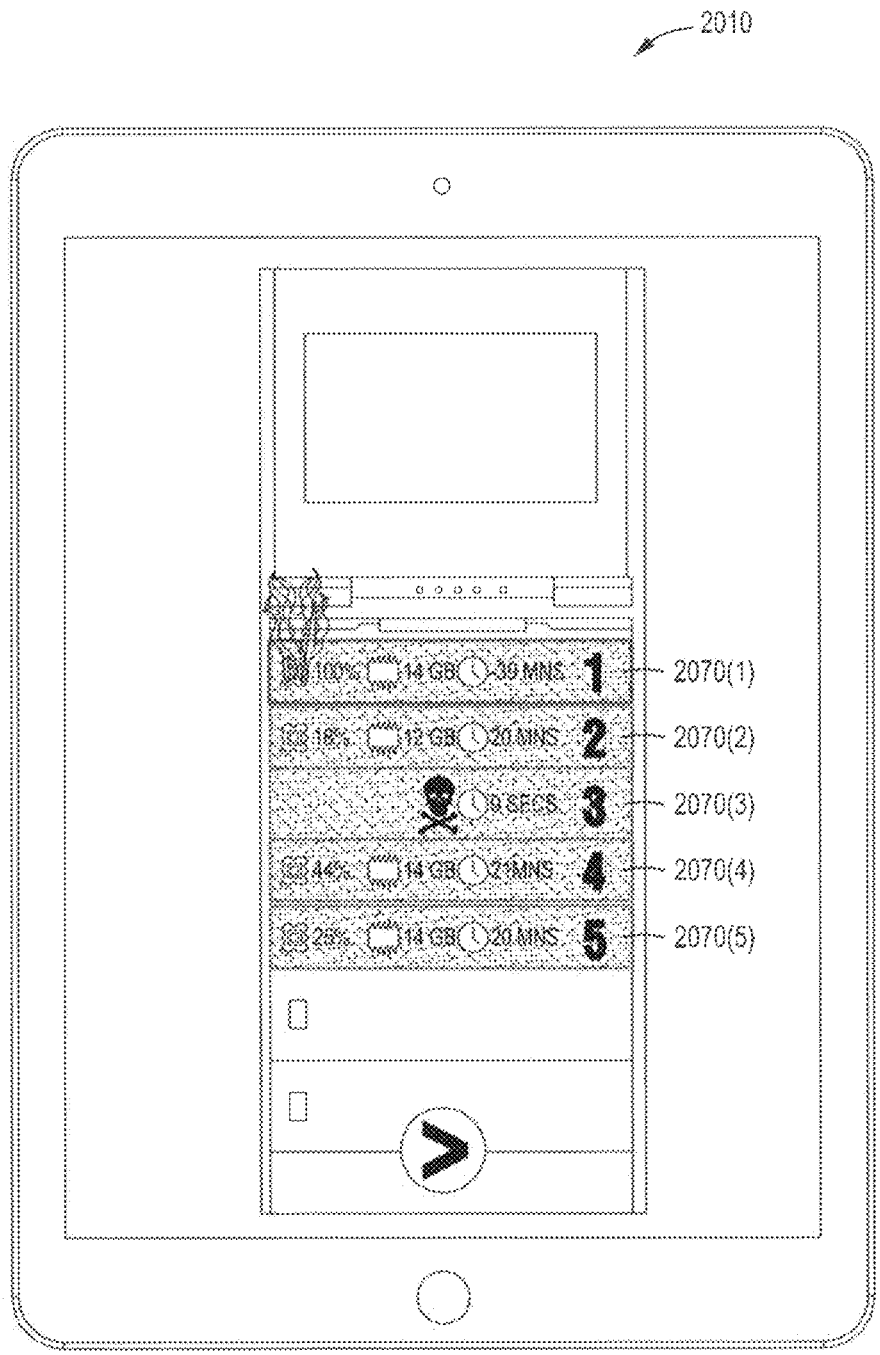

Different AR overlays may be generated based on dynamic changes in the status of various machines. As shown in FIG. 20F, display image 2010 illustrates another augmented image of the five servers. In this case, AR overlay 2070(3) illustrates a skull and crossbones icon, indicating that the server associated with optical data marker 2020(3) has failed, e.g., is no longer connected. AR overlays 2070(1), 2070(2), 2070(4), and 2070(5) indicate the current status of the servers associated with optical data markers 2020(1), 2020(2), 2020(4), and 2020(5), respectively.

Figure 20G:
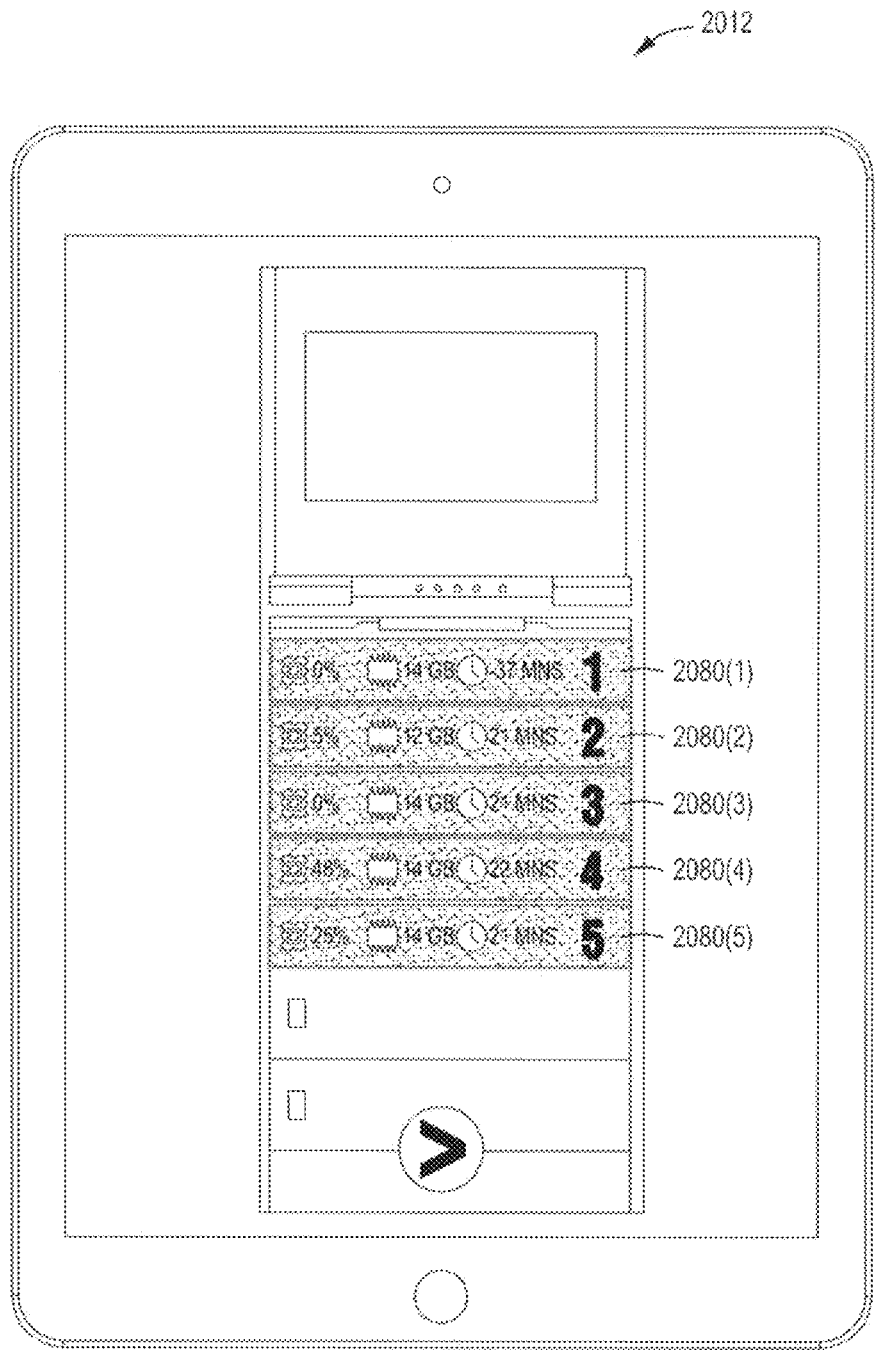

By reviewing the AR overlays illustrated in FIGS. 20C-20F, the technician identifies that the servers associated with optical data markers 2020(1) and 2020(3) are not operating properly. The technician may repair the affected servers, replace components in these servers, and/or take other appropriate actions. In some embodiments, as the technician repairs a particular server, a portion of the corresponding AR overlay 2040(1), 2040(2), 2040(3), 2040(4), and 2040(5) may indicate a physical location of one or more specific components in the corresponding machine. Indicating a physical location of specific components may aid a technician in locating those components. For example, the corresponding AR overlay 2040(1), 2040(2), 2040(3), 2040(4), and 2040(5) could indicate the physical location and status of each CPU in a server that includes multiple CPUs. Similarly, the corresponding AR overlay 2040(1), 2040(2), 2040(3), 2040(4), and 2040(5) could indicate the physical location and status of each fan in a server that includes multiple fans. In the manner, the technician could quickly identify and repair or replace defective components of the server. As shown in FIG. 20G, display image 2012 illustrates another augmented image of the five servers. In this case, the technician has corrected the issues associated with the affected servers. As a result, AR overlays 2080(1), 2080(2), 2080(3), 2080(4), and 2080(5) are shown with a green outline, indicating that the servers associated with optical data markers 2020(1), 2020(2), 2020(3), 2020(4), and 2020 (5) are at normal status.

FIGS. 21A-21E illustrate techniques for superimposing AR overlays on various views of an industrial robot, in accordance with example embodiments. In general, extended reality application 1814 generates and displays various display images 2100, 2110, 2120, 2130, and 2140 on the display device 1824 of client device 404. The display images 2100, 2110, 2120, 2130, and 2140 may include one or more real-world components, such as an image acquired from camera 1820 of client device 404. Extended reality application 1814 overlays the real-world component with AR overlays, as further described herein. In some embodiments, extended reality application 1814 may also overlay the real-world component with schemas, dashboards, cards, playbooks, runbooks, and/or visualizations in conjunction with an optional mobile template. After superimposing the AR overlays, along with any appropriate schemas, dashboards, cards, playbooks, runbooks, and/or other visualizations, onto the image(s) acquired via the camera 1820, extended reality application 1814 stores the enhanced images, as shown in display images 2120, 2130, and 2140, in an enhanced image data store. In some embodiments, the enhanced image data store may be stored within database 1816.

Figure 21A:
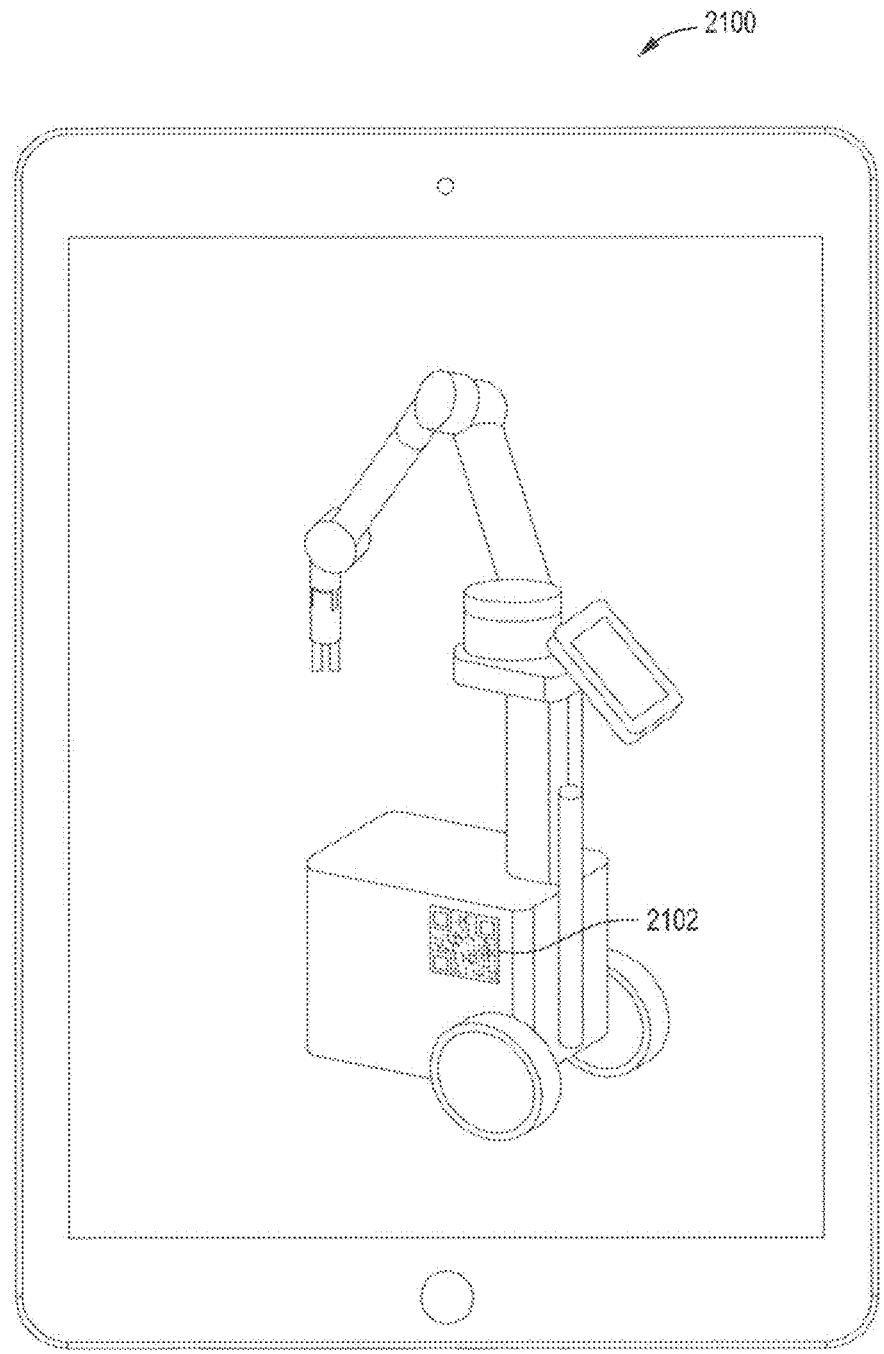

As shown in FIG. 21A, display image 2100 illustrates an image of an industrial robot, such as industrial robot 1950 of FIG. 19. A technician points a camera of the client device 404 toward the industrial robot until the client device 404 displays the image. The image of the industrial robot includes optical data markers 2102 corresponding to the industrial robot. The technician moves towards the industrial robot to acquire a close up image of the industrial robot and the corresponding optical data markers 2102.

Figure 21B:
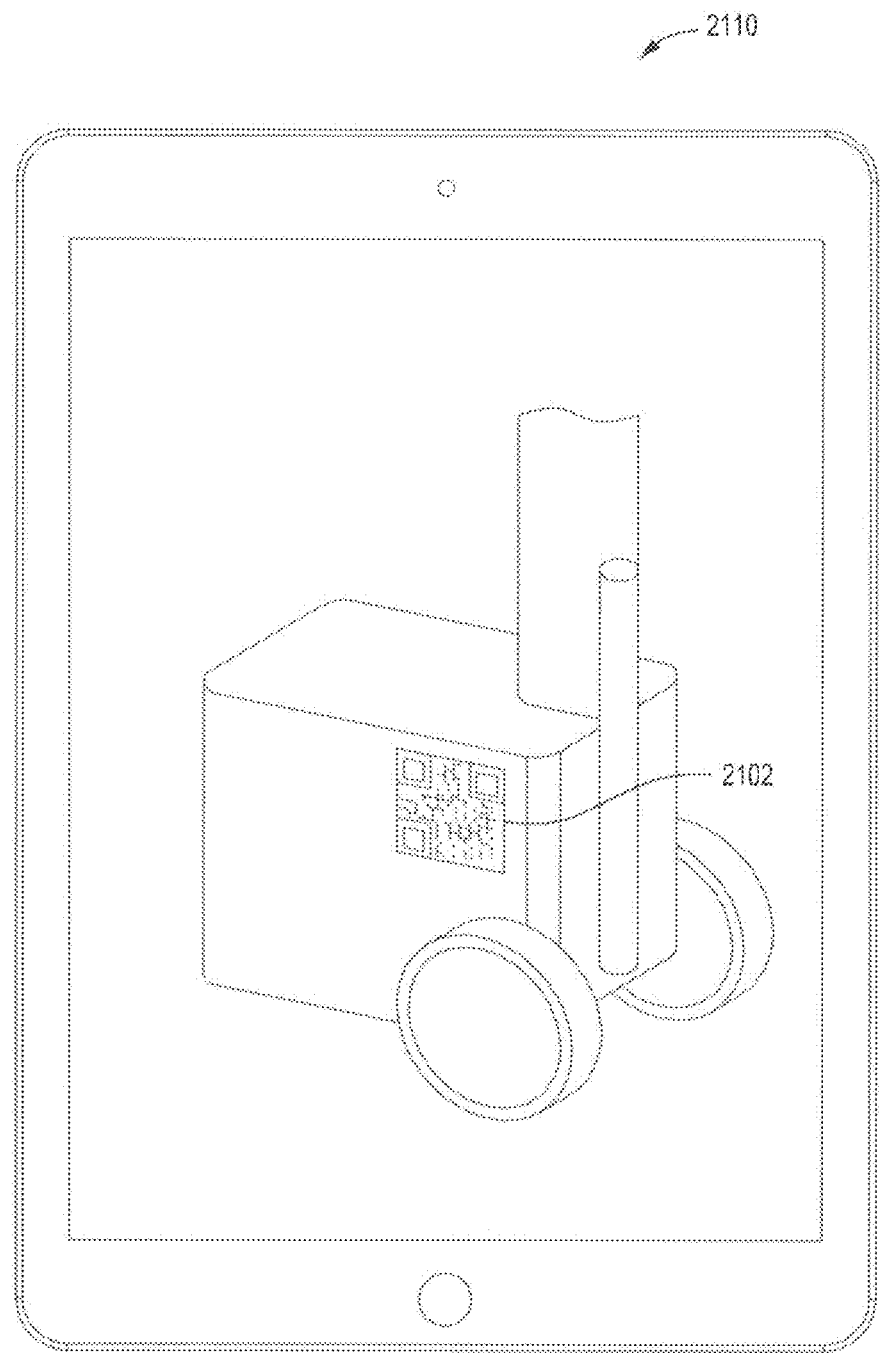

As shown in FIG. 21B, display image 2110 illustrates a close up image of the industrial robot. Extended reality application 1814 retrieves a unique identifier encoded in optical data markers 2102. Extended reality application 1814 then retrieves data associated with the optical data markers 2102, such as the value of various metrics associated with the industrial robot and a 2D or 3D model of the industrial robot.

Figure 21C:
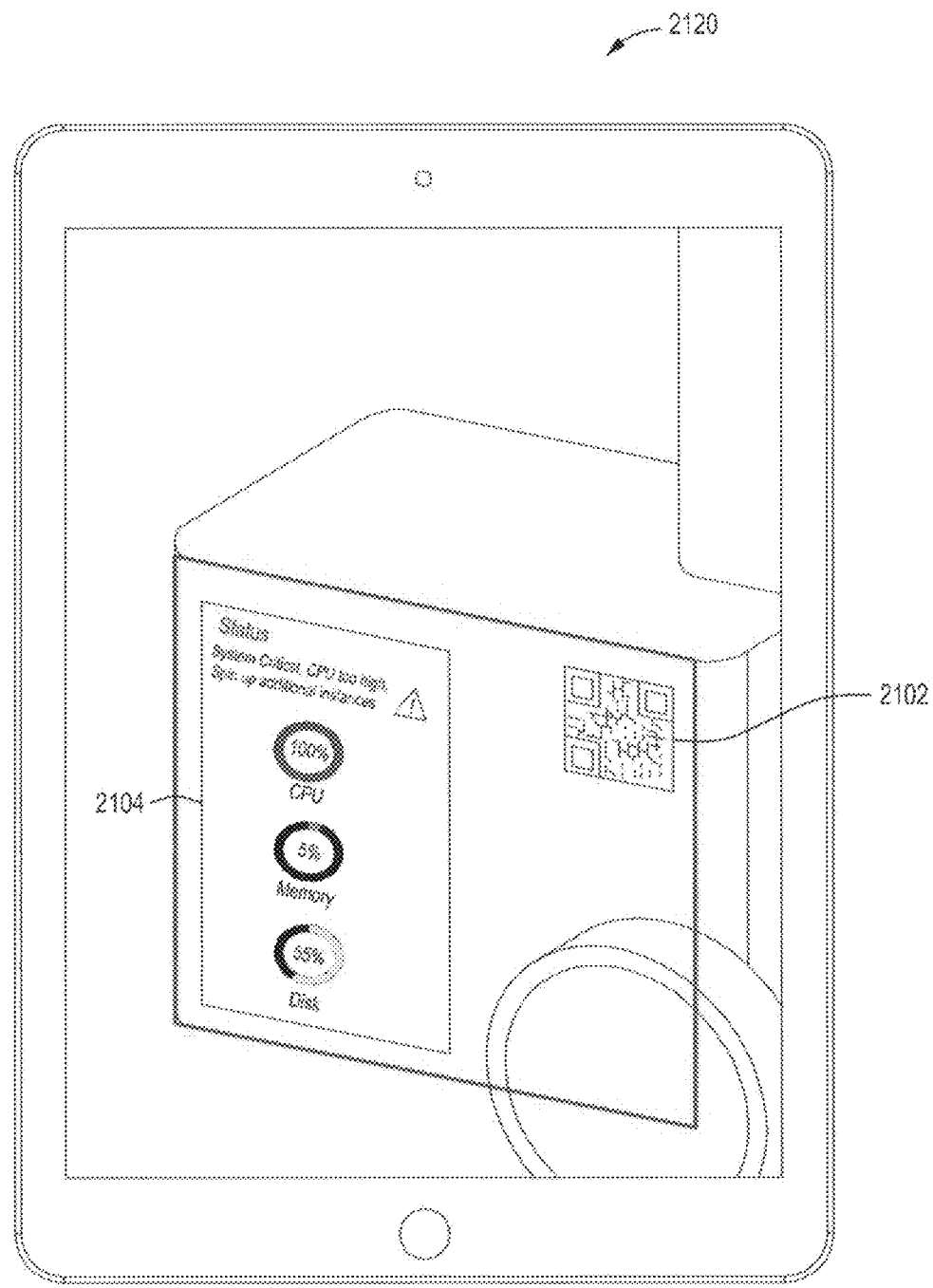

As shown in FIG. 21C, display image 2120 illustrates an augmented image of the industrial robot. Extended reality application 1814 generates and displays AR overlay 2104 corresponding to optical data marker 2102. As described above, in various embodiments, extended reality application 1814 may compare the size and/or plane of the image of the optical data marker 2102 to the original size of the optical data marker 2102. Extended reality application 1814 may then scale and position the AR overlay 2104 based on this comparison. AR overlay 2104 is shown with a red outline, indicating that the industrial robot associated with optical data marker 2102 is at critical status, however in other implementations, other graphics and overlays may be used. AR overlay 2104 indicates that CPU utilization is at 100%, memory utilization is at 5%, and disk utilization is at 55%. AR overlay 2104 further includes additional textual and graphical data with further information regarding the status of the industrial robot. The textual and graphical data displayed in AR overlay 2104 may be based at least partially on various metrics that are above, below, or between certain values (e.g., metrics where utilization of a component is above a threshold value may be surfaced or otherwise brought into the overlay). The textual and graphical data displayed in AR overlay 2104 also may be based at least partially on specifications set by the extended reality application 1814, the device 404 on which extended reality application 1814 is running, and/or the technician or operator who is using the extended reality application 1814. Based on the information displayed in AR overlay 2104, the technician may perform repairs on the industrial robot, replace components of the industrial robot, and/or perform other appropriate actions.

Figure 21D:
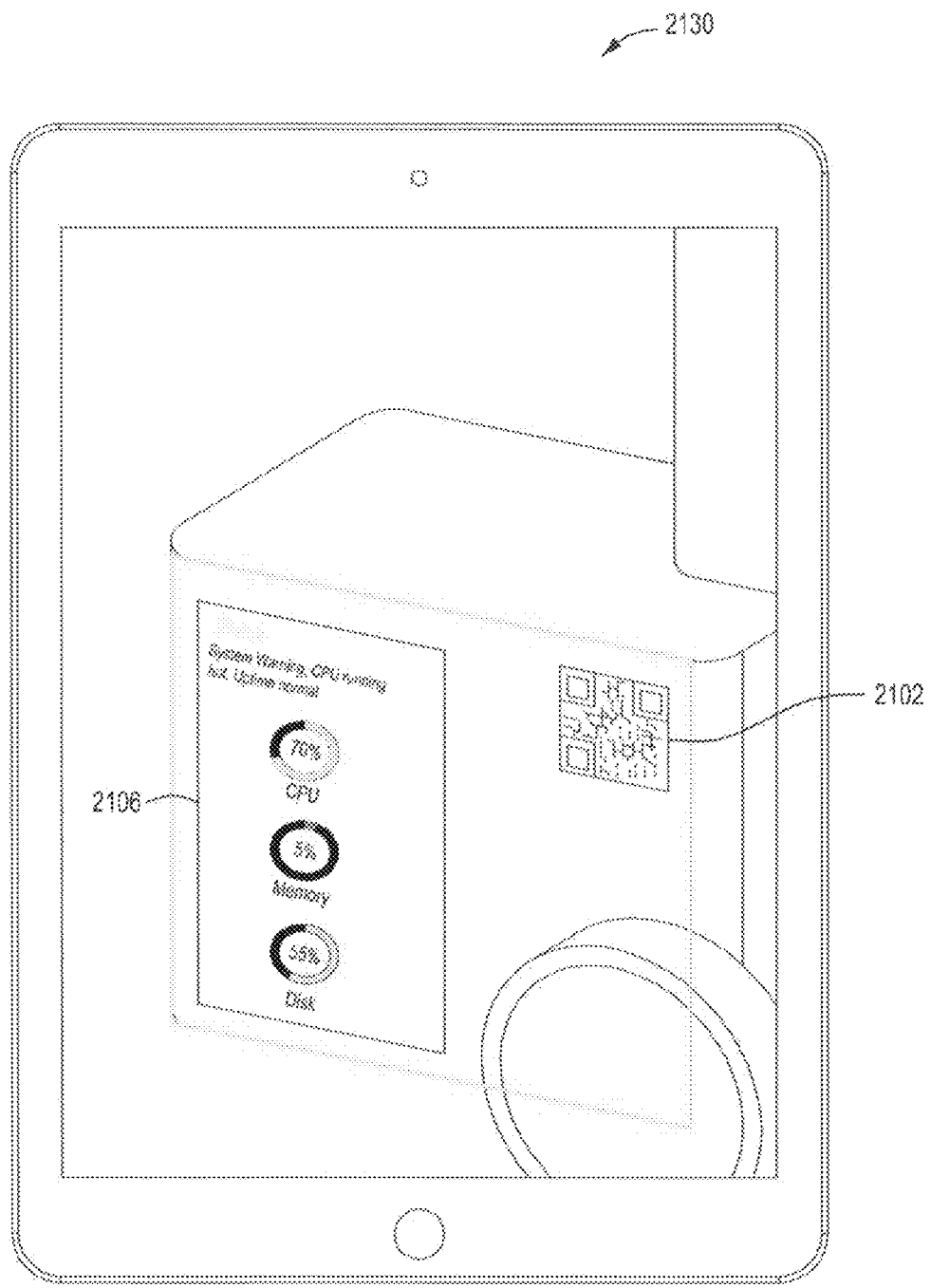

As shown in FIG. 21D, display image 2130 illustrates another augmented image of the industrial robot. Extended reality application 1814 generates and displays AR overlay 2106 corresponding to optical data marker 2102. AR overlay 2106 is shown with a yellow outline, indicating that the industrial robot associated with optical data marker 2102 is now at warning status. AR overlay 2104 indicates that CPU utilization is at 70%, memory utilization is at 5%, and disk utilization is at 55%. AR overlay 2104 further includes additional textual and graphical data with further information regarding the status of the industrial robot. Based on the information displayed in AR overlay 2104, the technician may perform further repairs, replacements, and/or other appropriate actions.

Figure 21E:
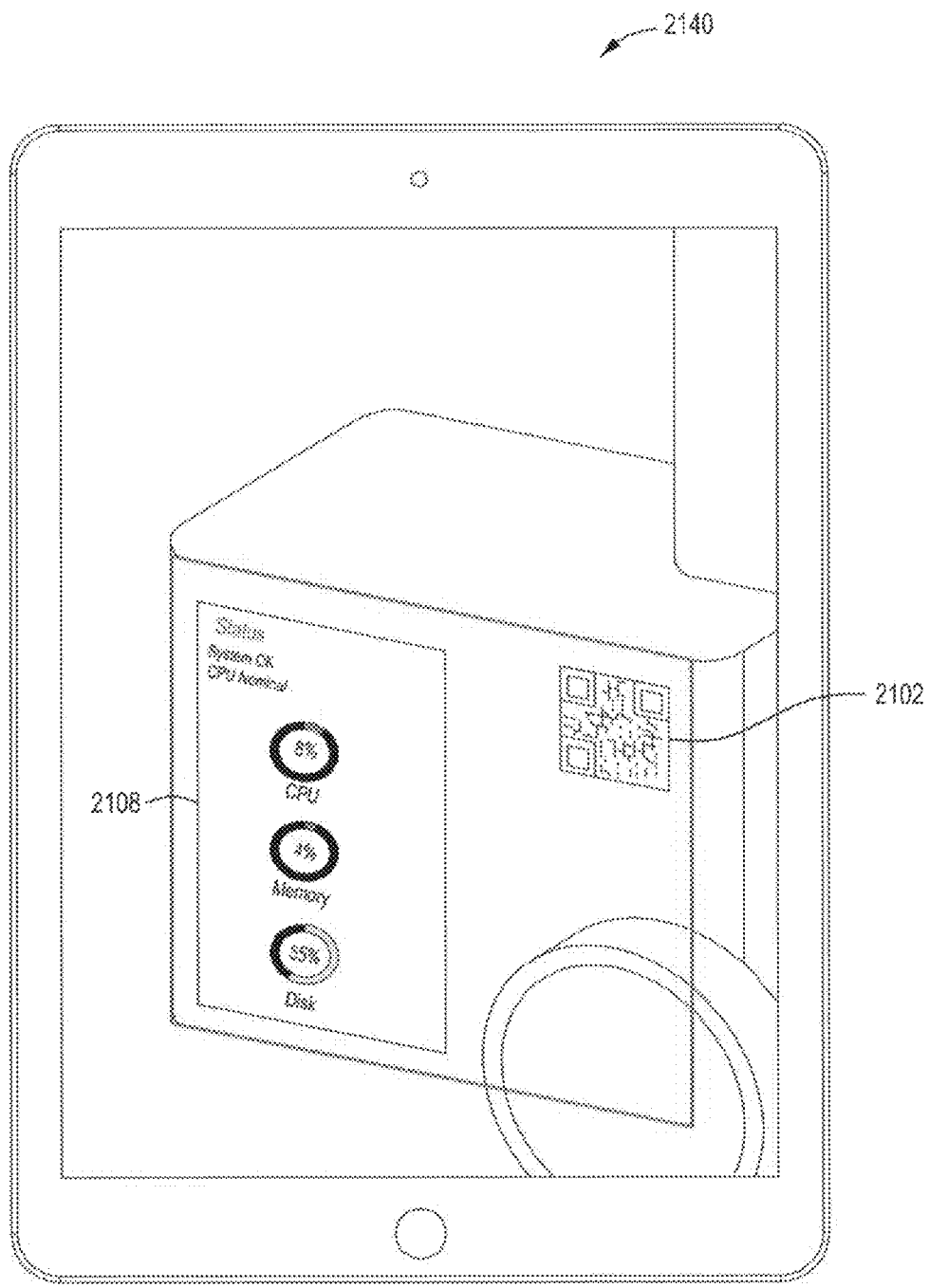

As shown in FIG. 21E, display image 2140 illustrates another augmented image of the industrial robot. Extended reality application 1814 generates and displays AR overlay 2108 corresponding to optical data marker 2102. AR overlay 2104 is shown with a green outline, indicating that the industrial robot associated with optical data marker 2102 is now at normal status. AR overlay 2104 indicates that CPU utilization is at 8%, memory utilization is at 4%, and disk utilization is at 55%. AR overlay 2104 further includes additional textual and graphical data with further information regarding the status of the industrial robot.

In general, extended reality application 1814 generates AR overlays based on a 2D or 3D model associated with corresponding machines. In some cases, a model may not be available for a particular machine. In such cases, extended reality application 1814 generates an outline or other form of 2D or 3D model for the machine according to certain techniques. Once the outline or model is generated, extended reality application 1814 may generate an AR display based on the outline or model. These techniques for generating outlines and/or models are described below in further detail.

FIGS. 22A-22C illustrate a technique for generating and selecting models of the server rack 1900 of FIG. 19, in accordance with example embodiments. In general, extended reality application 1814 generates and displays various display images 2200, 2210, and 2220 on the display device 1824 of client device 404. The display images 2200, 2210, and 2220 may include one or more real-world components, such as an image acquired from camera 1820 of client device 404. Extended reality application 1814 overlays the real-world component with AR overlays, as further described herein. In some embodiments, extended reality application 1814 may also overlay the real-world component with schemas, dashboards, cards, playbooks, runbooks, and/or visualizations in conjunction with an optional mobile template.

As shown in FIG. 22A, display image 2200 illustrates an image of a server rack 2202, such as server rack 1900 of FIG. 19. In operation, a technician points a camera of the client device 404 toward the server rack until the client device 404 displays the image. The image of the server rack includes five optical data markers 2020(1), 2020(2), 2020(3), 2020(4), and 2020(5) corresponding to five servers installed in the server rack.

As shown in FIG. 22B, display image 2210 illustrates the five servers along with a set of candidate boundaries 2204, 2206, 2208, and 2010. Extended reality application 1814 generates the candidate boundaries 2204, 2206, 2208, and 2010 based on measurement data received from a technician via an AR measuring tape or other measurement tool. Additionally or alternatively, extended reality application 1814 performs edge detection on the image in the display image 2200 to generate the candidate boundaries 2204, 2206, 2208, and 2010. In some embodiments, extended reality application 1814 performs a paint-fill operation on the candidate boundaries 2204, 2206, 2208, and 2010 such that the candidate boundaries 2204, 2206, 2208, and 2010 appear as solid objects. However, only the outline of candidate boundaries 2204, 2206, 2208, and 2010 are shown for clarity.

Candidate boundary 2204 surrounds all five servers in the server rack, candidate boundary 2206 surrounds two of the five servers, candidate boundary 2208 surrounds a single server, and candidate boundary 2210 surrounds a set of solid state storage drive bays within the single server. The technician then selects the desired boundary from the set of candidate boundaries 2204, 2206, 2208, and 2010. For example, if the technician wants to generate a model for a single server, the technician rejects candidate boundaries 2204 and 2206 because candidate boundaries 2204 and 2206 surround multiple servers. The technician also rejects candidate boundary 2210 because candidate boundary 2210 surrounds only a set of components in the single server, but does not surround the entire server. Therefore, the technician selects candidate boundary 2208 as the actual boundary.

Next, extended reality application 1814 discards candidate boundaries 2204, 2206, and 2010, and retains boundary 2008. As shown in FIG. 22C, display image 2220 illustrates the five servers along with the selected boundary 2208. Extended reality application 1814 generates a model of the server based on boundary 2208. Extended reality application 1814 stores the model in the optical data marker for the selected server, in database 1814, and/or transmits the model to data intake and query system 108, as further described herein.

Figure 23A:
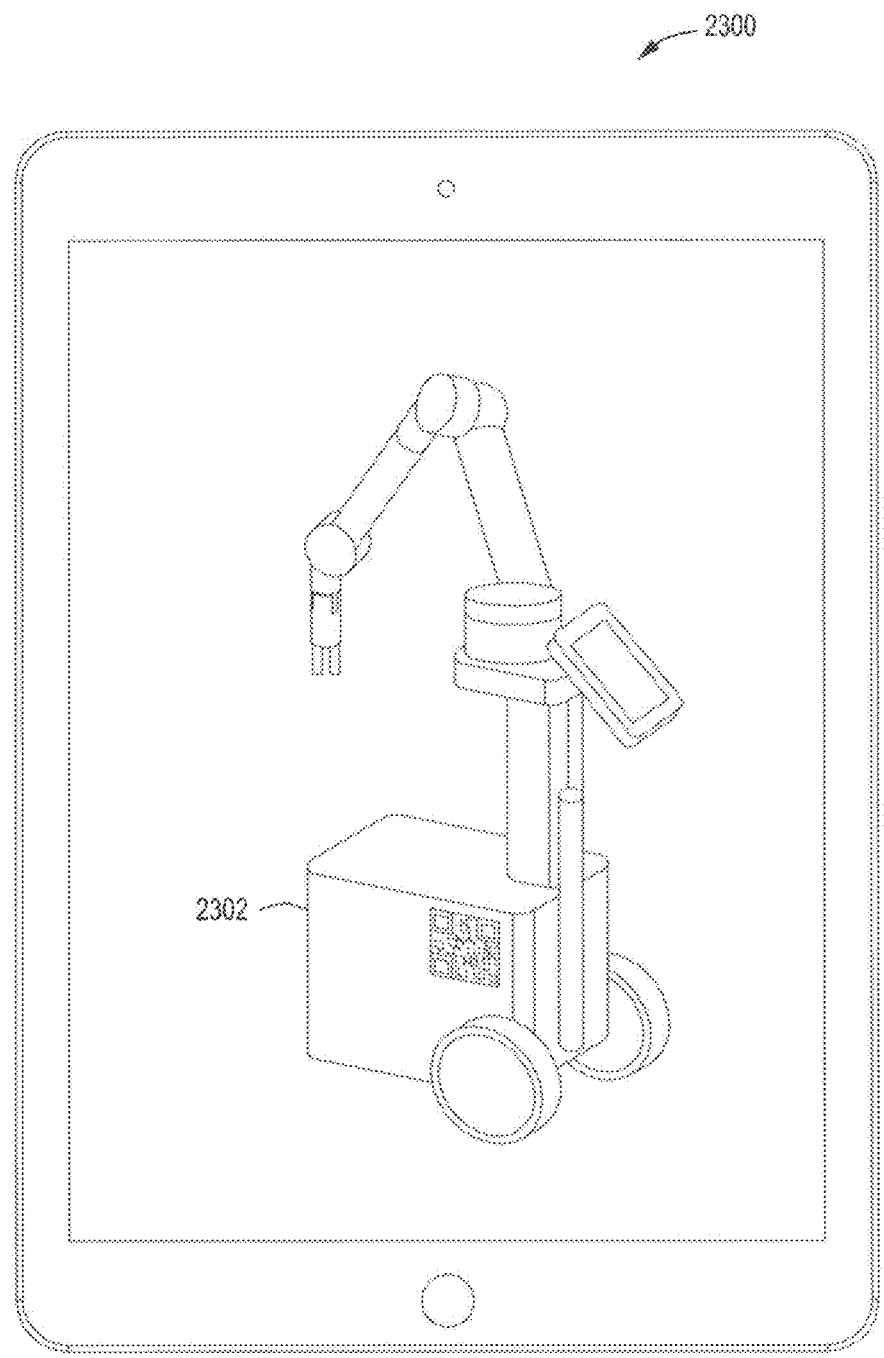
Figure 23B:
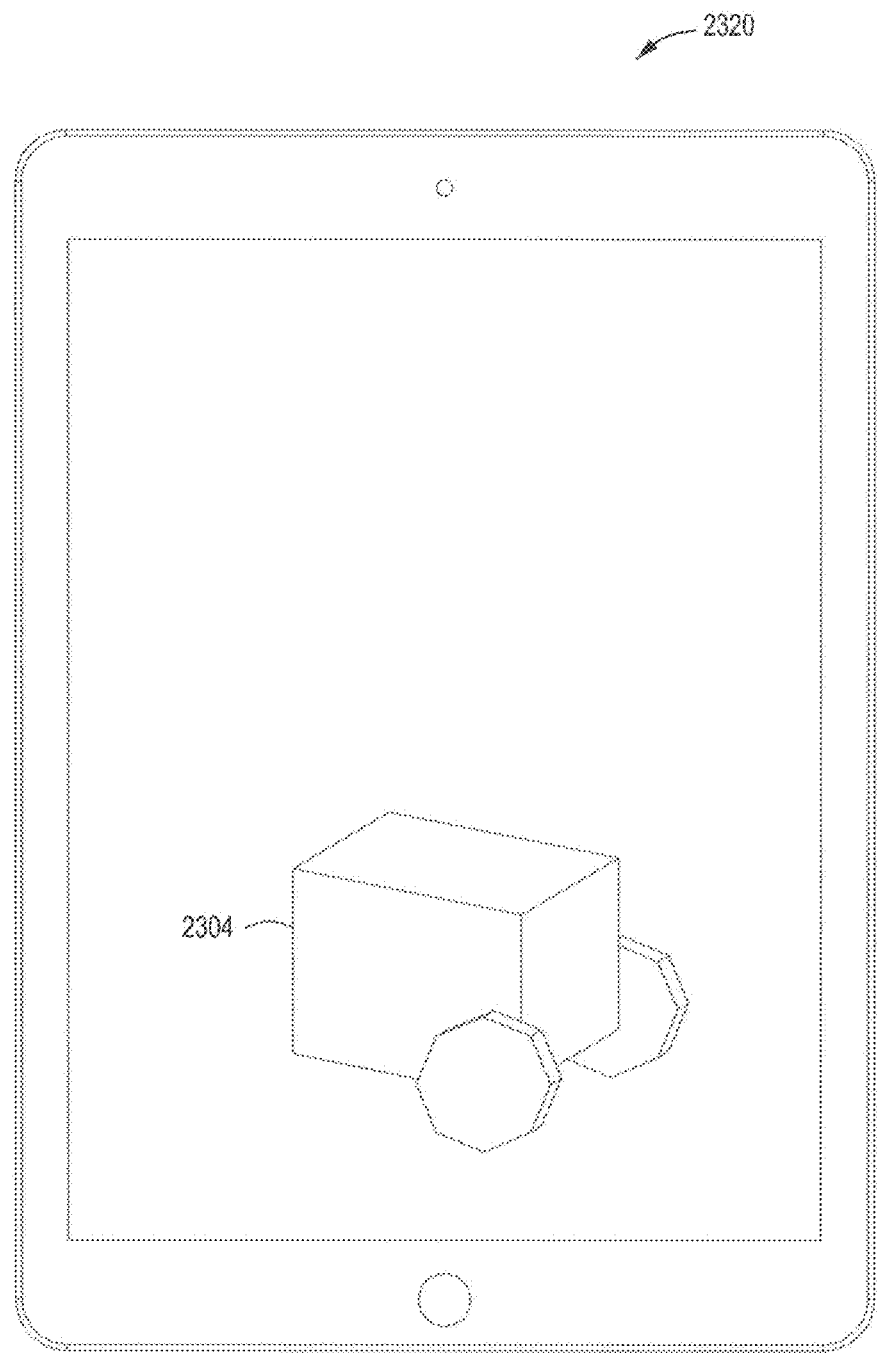
Figure 23C:
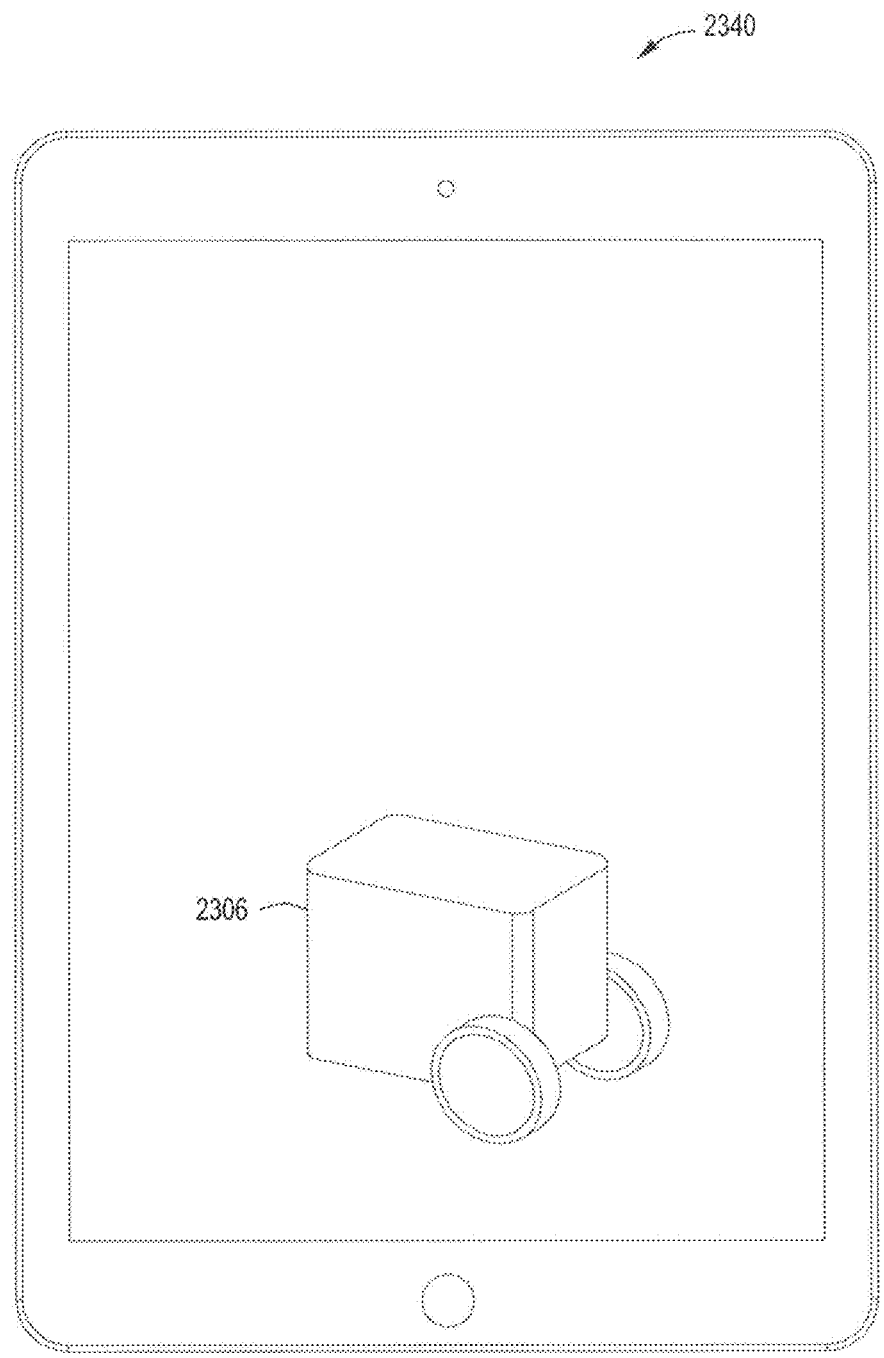

FIGS. 23A-23C illustrate various views related to generating and selecting models of the industrial robot 1950 of FIG. 19, in accordance with example embodiments. In general, extended reality application 1814 generates and displays various display images 2300, 2320, 2340, 2360, and 2380 on the display device 1824 of client device 404. The display images 2300, 2320, 2340, 2360, and 2380 may include one or more real-world components, such as an image acquired from camera 1820 of client device 404. Extended reality application 1814 overlays the real-world component with AR overlays, as further described herein. In some embodiments, extended reality application 1814 may also overlay the real-world component with schemas, dashboards, cards, playbooks, runbooks, and/or visualizations in conjunction with an optional mobile template.

Figure 23D:
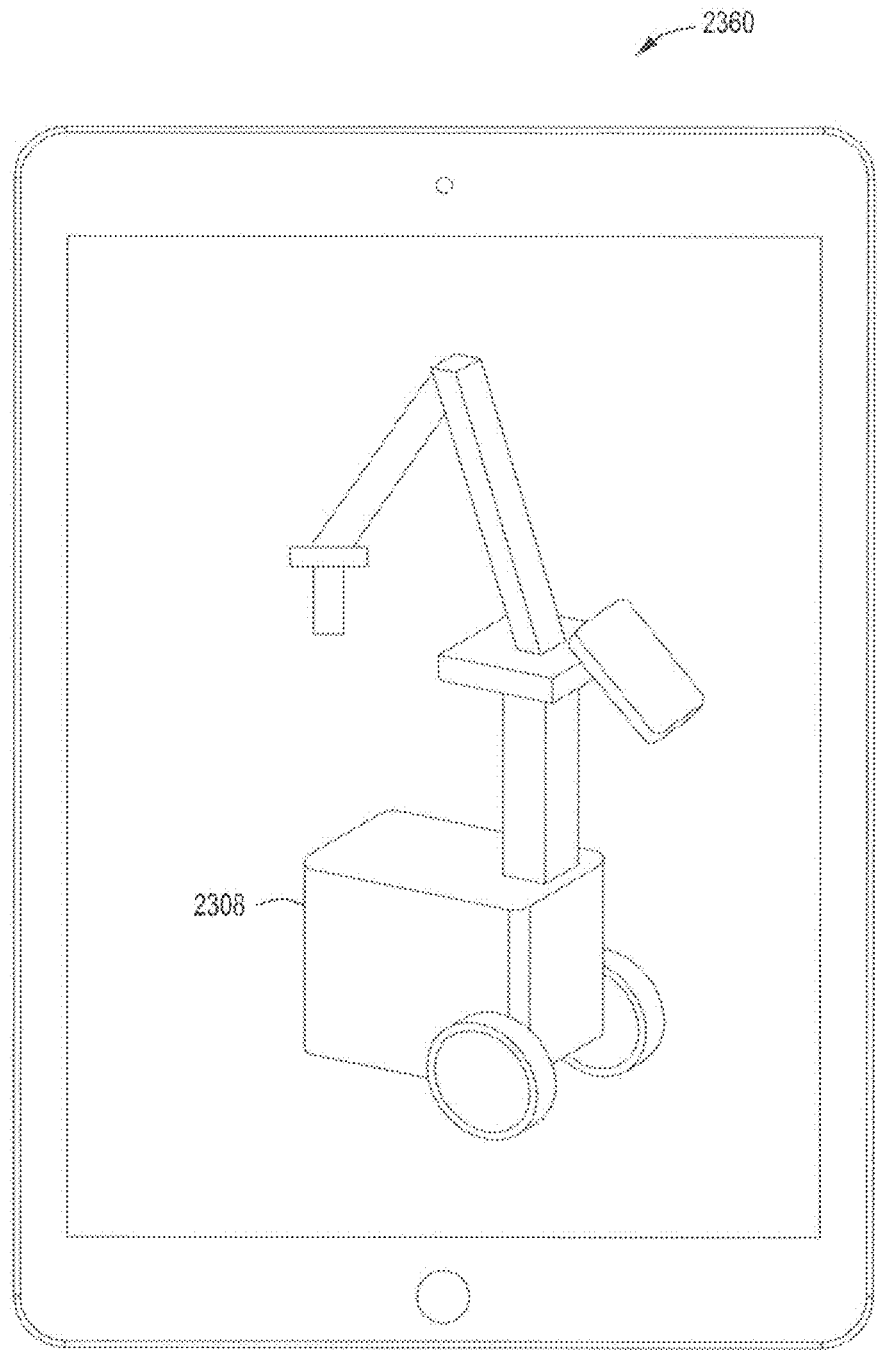
Figure 23E:
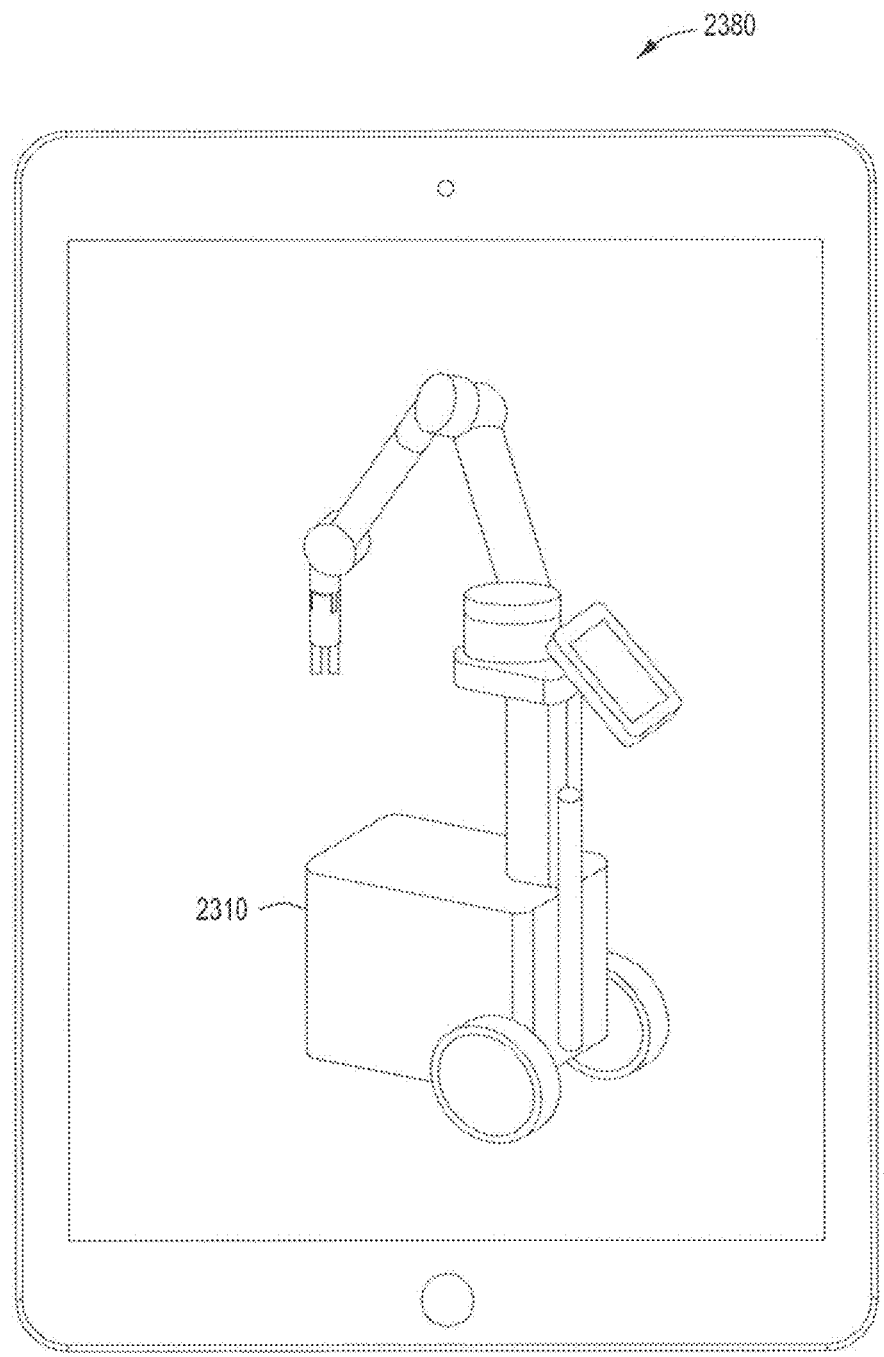

As shown in FIG. 23A, display image 2300 illustrates an image of an industrial robot 2302, such as industrial robot 1950 of FIG. 19. In operation, a technician points a camera of the client device 404 toward the industrial robot 2302 until the client device 404 displays the image. The image of the industrial robot 2302 includes an optical data marker corresponding to the industrial robot 2302. Next, extended reality application 1814 performs an iterative plane detection and/or edge detection process to generate boundaries of the industrial robot 2302 at various levels of detail and resolution. As extended reality application 1814 completes each pass of the plane detection and/or edge detection process, the boundary generated by extended reality application 1814 may include more details of the industrial robot 2302 and have a higher resolution relative to prior passes. For example, display image 2320, shown in FIG. 23B, illustrates a boundary 2304 that includes a rough outline of the base of the industrial robot 2302, while display image 2340, shown in FIG. 23C, illustrates a boundary 2306 with a more detailed outline of the base of the industrial robot 2302. Display image 2360, shown in FIG. 23D, illustrates a boundary 2308 with the more detailed outline of the base and a rough outline of the arm of the industrial robot 2302. Finally, display image 2380, shown in FIG. 23E, illustrates a boundary 2310 with a more detailed outline of the base and arm of the industrial robot 2302.

Extended reality application 1814 may continue the edge detection process to generate additional boundaries with more detail and resolution. The technician may choose to store the boundary as the model of the industrial robot after a desired number of passes have been performed to refine the model and the boundary is at the desired level of detail and resolution. Extended reality application 1814 may implement any one or more known techniques to generate and refine the boundary and/or model of a machine based on plane and/or edge detection.

Extended reality application 1814 generates a model of the industrial robot based on the selected boundary. Extended reality application 1814 may then store the model in database 1814, and/or extended reality application 1814 may transmit the model to data intake and query system 108, as further described herein. Further, a new optical data marker may be generated for the machine, where the model is stored in the new optical data marker for the selected industrial robot.

FIGS. 24A-24B set forth a flow diagram of method steps for generating and displaying extended reality overlays based on optical data markers, in accordance with example embodiments. Although the processing described for the method are described in conjunction with the systems of FIGS. 1-23E, persons of ordinary skill in the art will understand that any system configured to perform this method and/or other methods described herein, in any order, and in any combination not logically contradicted, is within the scope of the present invention.

As shown, a method 2400 begins at block 2402, where an extended reality application 1814 executing on a client device 404 receives an image acquired from a camera 1820 associated with the client device 404. In general, the image may be acquired when a technician points the camera 1820 at one or more machines in an industrial environment, which may occur, for example, through pointing a device lens at the object in an extended reality environment, for example, or turning their head to point their eyes (and any goggle device) toward the one or more machines in a virtual reality environment or an augmented reality environment with a headset. The images may include the one or more machines along with one or more optical data markers associated with the machine(s).

At block 2404, extended reality application 1814 detects the optical data markers included in the acquired image. At block 2406, extended reality application 1814 decodes the optical data markers detected in the image in order to retrieve the data included therein. The data included in the optical data markers may include, without limitation, the unique identifier, the model number or serial number, the graphical 2D or 3D model, and/or other characteristics. For example, if the optical data marker is a QR code, details about the position, plane, orientation, and size of the QR code may be read from the code or derived from different portions of the QR code, as previously described. Extended reality application 1814 determines an object identifier based on the data included in the optical data marker.

At block 2408, extended reality application 1814 retrieves data associated with the machine or other object based on the object identifier. Extended reality application 1814 may retrieve the data from an optical data marker associated with the machine. Additionally or alternatively, extended reality application 1814 may retrieve the data from database 1816. Additionally or alternatively, extended reality application 1814 may transmit a query to data intake and query system 108 that includes the object identifier. In response, data intake and query system 108 may extract field values from event data associated with one or more machines identified by the object identifier. Next, data intake and query system 108 may transmit the extracted field values to extended reality application 1814. Extended reality application 1814 then receives the field values associated with the machine or other object from data intake and query system 108. In some embodiments, extended reality application 1814 may receive schemas, dashboards, cards, playbooks, runbooks, and/or visualizations in conjunction with an optional mobile template from data intake and query system 108.

Referring now to FIG. 24B, at block 2410, extended reality application 1814 generates an AR overlay or other representation based on the received field values. The overlay may include the values, or graphical representations of the values, including colors, shapes, objects, and/or positions that are based on the received field values or combinations of the received field values. The AR overlay or other representation may include a graphical representation of the retrieved data. In some embodiments, the AR overlay or other representation may also include the schemas, dashboards, cards, playbooks, runbooks, and/or visualizations in conjunction with the optional mobile template received from data intake and query system 108. The AR overlay or other representation may further include a 2D or 3D model of the associated machine or other object. In various embodiments, overlaying a 2D or 3D model on the machine may enable a user to more easily visually identify the machine to which the retrieved data corresponds. In some embodiments, the AR overlay may further include outlines or other graphics that may indicate a physical location of one or more specific components in the corresponding machine. Indicating a physical location of specific components may aid a technician in locating those components. For example, the AR overlay could indicate the physical location and status of each CPU in a server that includes multiple CPUs and/or the physical location and status of each fan in a server that includes multiple fans. Next, at block 2412, extended reality application 1814 scales and orients the AR overlay or other representation based on a plane and/or size of the optical data marker present in the image relative to the actual size and orientation of the optical data marker. The plane and/or size of the optical data marker may be coded into the optical data marker or obtained using other known data and image processing techniques, e.g., for plane detection, or a combination of both.

At block 2414, extended reality application 1814 then superimposes the AR overlay or other representation onto the acquired image. At block 2416, extended reality application 1814 causes the acquired image with the superimposed AR overlay or other representation to be displayed on a display device. The method 2400 then terminates or optionally returns to block 2402, where one or more additional images may be received by extended reality application 1814.

In extended reality systems, there is often a need to quickly generate computational representations of real objects, e.g., 3D models of real things, for example, server banks, robots, or parts in a factory. The following procedure represents a technical improvement in the ability to quickly and efficiently generate AR and other models, in industrial and other environments.

While the invention is not limited to these areas, the described areas exemplify the improvements over existing systems. Specifically, FIG. 25 is a flow diagram of method steps for generating and selecting an AR model for an object in an industrial environment, in accordance with example embodiments. Although the processing described for the method are described in conjunction with the systems of FIGS. 1-23E, persons of ordinary skill in the art will understand that any system configured to perform the method, in any order, is within the scope of the present invention.

As shown, a method 2500 begins at block 2502, where an extended reality application 1814 executing on a client device 404 scans a machine or other three-dimensional object of interest. In some embodiments, a technician may point a camera 1820 of the client device 404 towards the three-dimensional object. Extended reality application 1814 displays an image of the object along with an AR measuring tape or other measurement tool. The technician manipulates the AR measuring tape to measure key dimensions and key locations on the object, thereby scanning the object.

Once the technician completes the scan, then, at block 2504, extended reality application 1814 generates a boundary of the object and plane data for the object. The boundary of the object may include a rough outline of the object based on the key dimensions and key coordinates of the machine. This rough outline approximates a graphical bounding box surrounding the enclosure or housing of the object. The plane data defines the planar surfaces of the enclosure or housing. At block 2506, extended reality application 1814 stores the coordinates associated with the boundary of the object.

At block 2508, extended reality application 1814 generates a 3D model based on the 3D coordinates associated with the boundary. The 3D model may be in any technically feasible format, including, without limitation, a scalable vector graphics (SVG) model or a polygonal mesh model. At block 2510, extended reality application 1814 stores the 3D model and the plane data in the database 1816. Further, extended reality application 1814 may transmit the 3D model and plane data to data intake and query system 108 for storage. Additionally or alternatively, extended reality application 1814 may store the 3D model in the optical data marker associated with the machine. In various other implementations, the 3D model may be displayed to the technician (not shown in FIG. 25), either in extended reality application 1814, or in another application designed to view or edit 3D models. The method 2500 then terminates.

In extended reality systems, there is often a need to quickly generate computational representations of real objects, e.g., 3D models of real things, for example, server banks, robots, or parts in a factory. The following procedure represents a technical improvement in the ability to quickly and efficiently generate AR and other models, in industrial and other environments. While the invention is not limited to these areas, the described areas exemplify the improvements over existing systems. Specifically, FIG. 26 is a flow diagram of method steps for generating and selecting an AR model for an object in an industrial environment, in accordance with other example embodiments. Although the processing described for the method are described in conjunction with the systems of FIGS. 1-23E, persons of ordinary skill in the art will understand that any system configured to perform the method, in any order, is within the scope of the present invention.

As shown, a method 2600 begins at block 2602, where an extended reality application 1814 executing on a client device 404 scans a machine or other three-dimensional object of interest, where the machine or object includes an optical data marker, such as a QR code. At block 2604, extended reality application 1814 displays a two-dimensional image of the object on a display device 1824. At block 2606, extended reality application 1814 generates a set of boundaries (e.g., concentric and/or overlapping boundaries) of the object. More specifically, extended reality application 1814 performs an edge detection process based on the scan of the object. Extended reality application 1814 then generates a boundary or outline at one or more edges detected from the scan data. Extended reality application 1814 repeats the edge detection process to generate a set of concentric boundaries of the object. Extended reality application 1814 may further paint-fill each of the boundaries and display the paint-filled boundaries on the display device 1824.

At block 2608, extended reality application 1814 detects plane data for the object based on the set of boundaries. At block 2610, extended reality application 1814 receives a selection of one of the paint-filled boundaries. Typically, a technician selects one of the paint-filled boundaries that best represents the shape of the object. At block 2612, extended reality application 1814 generates a three-dimensional bitmask texture based on the selected boundary and corresponding plane data. In some embodiments, block 2602 through block 2612 may be repeated multiple times from various angles. At each angle, extended reality application 1814 generates a set of concentric paint-filled boundaries and corresponding plane detection data. Extended reality application 1814 receives a selection of a paint-filled boundary at each angle. Each paint-filled boundary represents a two-dimensional paint-fill representation of a three-dimensional edge detection model that has been flattened to two dimensions after performing edge detection on the three-dimensional object. The paint-filled boundary is stored as a paint-fill representation. In some embodiments, extended reality application 1814 then generates a bitmask texture for the selected boundary.

At block 2614, extended reality application 1814 generates a 3D model of the object based the bitmask texture(s). The 3D model may be generated from plane detection data or from the location, size, and perspective of the optical data marker associated with the object. More specifically, extended reality application 1814 generates the 3D model based on the stored paint-fill representations at various angles to the object. Extended reality application 1814 generates the 3D model by overlaying the paint-fill representations with three-dimensional plane information. The 3D model may be in any technically feasible format, including, without limitation, a 3D bitmask, an SVG model, or a polygonal mesh model. At block 2616, extended reality application 1814 stores the 3D model and the plane data in the database 1816. Further, extended reality application 1814 may transmit the 3D model and plane data to data intake and query system 108 for storage. Additionally or alternatively, extended reality application 1814 may store the 3D model in the optical data marker associated with the machine. The method 2600 then terminates.

3.2. Geofence-Based Extended Reality Techniques

As discussed above, implementing optical data markers, such as QR codes, allows machines to be quickly and reliably identified, enabling real-time information to be overlaid in conjunction with the machine(s) via an AR display. However, such techniques generally cannot be used when a particular machine does not include an optical data marker or when extended reality application 1814 cannot recognize a particular optical data marker associated with a machine. For example, when a machine is initially added to a particular environment, that machine may not yet include an optical data marker and/or the optical data marker on the machine may not yet be associated with corresponding machine data (e.g., raw machine data generated by the machine) that is stored by data intake and query system 108. Additionally, if an optical data marker is damaged, obstructed, and/or unreadable, then extended reality application 1814 may be unable to determine the identity of the machine based on the optical data marker.

Accordingly, in various embodiments, one or more geofences may be defined within a particular environment.

The machines that are located within each geofence may then be tracked. As a result, upon entering a particular geofence, extended reality application 1814 may quickly and reliably determine which machines are nearby. Then, upon encountering a particular machine for which information (e.g., an AR overlay of real-time information) will be displayed, extended reality application 1814 may acquire sensor data (e.g., image data, sound data, etc.) associated with the machine. For example, an image of text located on the machine and/or an audio recording of sound produced by the machine could be acquired via one or more sensors.

Next, the sensor data is compared to object identifier data associated with machines that are known to be located in the geofence. Based on the comparison, a matching object identifier that corresponds to the machine is determined. Information associated with the identified machine, such as an AR overlay of real-time information, is then displayed to the user proximate to the machine. Thus, extended reality application 1814 is able to overlay information corresponding to machines that lack an optical data marker or which otherwise cannot be identified via an optical data marker. Such techniques are described in further detail below in conjunction with FIGS. 27A-32.

In conventional extended reality systems, it can be difficult to identify specific objects, which may have similar visual characteristics, particularly in an industrial setting (e.g., server racks with similar servers, robots with similar shapes, etc.). Thus there has arisen a need to identify specific objects in an extended reality environment, in order to perform additional processing, e.g., overlays, representations, etc. The following procedure describes technical improvements for uniquely or specifically identifying objects in an extended reality environment, e.g., for augmented reality purposes, through use of a combination of geofencing and other sensor data detection. FIG. 27A illustrates a top view of geofences that have been defined to track one or more machines included in different buildings 2702, in accordance with example embodiments. As shown, a geofence 2704 is defined for each building 2702. Specifically, geofence 2704-1 corresponds to building 2702-1, geofence 2704-2 corresponds to building 2702-2, and geofence 2704-3 corresponds to building 2702-3.

In operation, a user 2706 of client device 404 moves in direction 2708 towards geofence 2704-1, and client device 404 detects (e.g., via location sensor 1822) that geofence 2704-1 has been entered. In some embodiments, in response to crossing into geofence 2704-1, client device 404 obtains object identifier data associated with machines within geofence 2704-1. For example, client device 404 could request the object identifier data from a remote computing device (e.g., data intake and query system 108) in response to entering geofence 2704-1. The object identifier data may include identifiers for different machines within geofence 2704-1 and other data associated with those machines, such as 2D or 3D models, sub-component text, and audio data (e.g., audio samples, fingerprints of sounds, etc.) associated with the machines. In some embodiments, the object identifier data may include identifiers for different subcomponents of those machines.

While inside geofence 2704-1, user 2706 may direct one or more sensors of client device 404 toward a machine within geofence 2704-1. For example, user 2706 could point camera 1820 of client device 404 towards a machine inside building 2702-1. While camera 1820 is pointed toward the machine, extended reality application 1814 in client device 404 acquires sensor data associated with the machine via one or more sensors, for example, by capturing an image of the machine via camera 1820. After the sensor data is acquired, the sensor data may be processed in order to identify the machine, further details of which are described below.

FIG. 27B illustrates a top view of geofences that have been defined to track one or more sets of machines 2724 located within sub-regions of a building, according to various embodiments of the present invention. As shown, a geofence 2722 may be defined for sub-regions that correspond to different sets of one or more machines 2724 (e.g., server racks) within a building. For example, as shown in FIG. 27B, geofence 2722-1 corresponds to server racks 2724-1 and 2724-2, geofence 2724-2 corresponds to server racks 2724-3 and 2724-4, geofence 2722-3 corresponds to server racks 2724-5 and 2724-6, and geofence 2722-4 corresponds to server racks 2724-7 and 2724-8.

In operation, a user 2726 of client device 404 moves in direction 2728 towards geofence 2722-2, and client device 404 detects that geofence 2722-2 has been entered. In some embodiments, in response to crossing into geofence 2722-2, client device 404 obtains object identifier data associated with machines within geofence 2722-2. For example, client device 404 could request the object identifier data from a remote computing device (e.g., data intake and query system 108) in response to entering geofence 2722-2. As noted above, the object identifier data may include object identifiers for different machines within geofence 2722-2 and other data associated with those machines (e.g., 2D or 3D models, subcomponent text, and audio samples or fingerprints of sounds). Also, as noted above, the object identifier data may include identifiers for subcomponents of machines. For example, server racks 2724-3 and 2724-4 could include subcomponents (e.g., individual servers mounted thereon), and the object identifier data for geofence 2722-2 could include identifiers for these individual servers.

While inside geofence 2722-2, user 2726 may direct one or more sensors of client device 404 toward a machine within geofence 2722-2. For example, user 2706 could point camera 1820 of client device 404 towards server rack 2724-3 as user 2706 moves in direction 2728 toward server rack 2724-3. While camera 1820 is pointed toward server rack 2724-3, extended reality application 1814 may acquire one or more images, and optionally other sensor data, associated with server rack 2724-3 using the sensors. After the image(s) are acquired, the image(s) may be processed in order to identify server rack 2724-3 and/or one or more servers mounted thereon.

FIG. 27B further illustrates a number of location beacons 2730 that may be positioned throughout the sub-regions of the building. These location beacons 2730 may be mounted on walls, ceilings, etc. and may be referenced by client device 404 (e.g., via location sensor 1822) to determine its location. In some embodiments, the location beacons 2730 may include optical beacons, acoustic beacons, radio frequency beacons, or any other type of beacon that enables the location of client device 404 to be determined.

Geofences may be defined in any suitable manner. In some embodiments, a geofence may be defined based on latitude and longitude coordinates specifying points on the boundary of the geofence, latitude and longitude coordinates specifying a center of the geofence and a radius from the center, a particular cellular tower or set of cellular towers, a particular Wi-Fi network, a particular location beacon or set of location beacons, etc. Although FIGS. 27A-27B illustrate specific examples of geofences that are defined at different levels of granularity, these examples are not intended to be limiting. Instead, geofences may be defined at any level of granularity (e.g., groups of buildings, floors of a building, room(s), outdoor areas, landmarks, etc.). Additionally, the geofences described herein may be implemented separately or may be combined such that one or more geofences are defined within a larger geofence. Furthermore, geofences may be non-overlapping (e.g., the geofences as shown in FIGS. 27A-27B) or overlapping.

Client device 404 determines its location by any suitable manner (e.g., satellite-based positioning, Wi-Fi location, cellular tower location, location beacon, radio frequency signals, etc.). For example, in FIG. 27A client device 404 could determine its location using satellite-based positioning (e.g., GPS) or with reference to cellular tower locations. As another example, in FIG. 27B client device 404 could determine its location using location beacons 2730.

In various embodiments, geofences 2704 are predefined, and definitions of the geofences may be stored in a remote computing device (e.g., data intake and query system 108) and/or in client device 404 (e.g., in data store 1840 and/or storage 1804). Accordingly, client device 404 or data intake and query system 108 may determine whether the location of client device 404 is inside a geofence. For example, the geofence definitions could be retrieved by client device 404 from data intake and query system 108 and stored in client device 404. Then, client device 404 could compare its location to the geofence definitions to determine whether the client device 404 is inside of a geofence. Alternatively, client device 404 may send its location to the data intake and query system 108. Data intake and query system 108 could then compare the location of client device 404 to one or more geofence definitions to determine whether the location of client device 404 is inside a geofence. Further, geofence definitions may be updated in real-time.

FIG. 28A illustrates a perspective view of servers 2804 mounted onto a server rack 2800 included in an information technology (IT) environment, in accordance with example embodiments. As discussed above, while inside a geofence, a user may direct one or more sensors of client device 404 towards a machine within the geofence. As shown, the view may be captured by camera 1820 and/or presented in a user interface of extended reality application 1814 (e.g., as a live view) on client device 404. Server rack 2800 may optionally include a display 2802 (e.g., a rack-mounted, pull-out display) and one or more servers 2804 mounted on server rack 2800. Server rack 2800 may include other components that are not shown in FIG. 28A, such as one or more input devices.

A server 2804 may include machine identifiers 2806 (e.g., text and/or logos). The identifiers 2806 may include, without limitation, a serial number, a brand name, a brand logo, a model name, a model number, and/or any other text and/or graphics that are present on the exterior of server 2804. As shown, server 2804-1 includes identifier 2806-1, server 2804-2 includes identifier 2806-2, server 2804-3 includes identifier 2806-3, and server 2804-4 includes identifier 2806-4. Identifier 2806-1 includes the serial number "B001-S001," identifier 2806-2 includes the serial number "B001-S002," identifier 2806-3 includes the serial number "B001-S003," and identifier 2806-4 includes the serial number "B001-S004."

In operation, camera 1820 is pointed towards server rack 2800 by a user in order to capture an image of the server rack 2800. The image captured by camera 1820 may be a still image or a moving image (e.g., a video). In some embodiments, multiple images may be captured. The image may then be processed to recognize text (e.g., identifiers 2806) on servers 2804. In some embodiments, extended reality application 1814 executing on client device 404 facilitates determination that a particular object identifier (e.g., identifier 2806-1, identifier 2806-2, identifier 2806-3, or identifier 2806-4) corresponds to a machine by processing sensor data directly or by transmitting sensor data to another computing device for processing. For example, extended reality application 1814 could process sensor data directly by performing optical character recognition on the image to recognize identifiers 2806. Additionally or alternatively, one or more image(s) could be transmitted by client device 404 to a remote computing device (e.g., data intake and query system 108), which may then perform optical character recognition on the image(s) to recognize identifiers 2806. In various implementations, the object may be moving or the identifiers may be moving on the object, in which case, various known image processing techniques may be used to reduce blur, if present in the image. In other implementations, portions of the identifiers 2806 may be obscured, and partial textual data may be captured and used, or extrapolated using any known techniques.

FIG. 28B illustrates machine identifiers that have been recognized via optical character recognition (OCR) performed by client device 404 and/or by a remote computing device, in accordance with example embodiments. As discussed above, client device 404 or a remote computing device (e.g., data intake and query system 108) may perform optical character recognition on an image of server rack 2800 to recognize identifiers 2806 included in the image. As shown, the identifiers 2806 are bounded by bounding boxes 2808, indicating that the identifiers 2806 have been recognized via optical character recognition. In some embodiments, the optical character recognition performed by client device 404 or the remote computing device may include one or more of OCR using fuzzy logic (fuzzy OCR) and/or OCR using Bayesian networks (Bayesian OCR).

After identifiers 2806 are recognized, the identifiers 2806 may be compared to object identifiers that correspond to machines (e.g., server 2804) that reside inside the geofence. For example, client device 404 could compare the identifiers 2806 to object identifier data associated with the geofence in which client device 404 is located. The object identifier data may be obtained from a database of geofence object identifiers, which may be stored in system memory 1812 and/or storage 1804 of client device 404. The comparison may include filtering the object identifier data by geofence to exclude machines not located within the geofence. When a match between identifier 2806 and an identifier in the object identifier database is found, the matching identifier may be transmitted to data intake and query system 108. For example, extended reality application 1814 could transmit the matching identifier in a query for data associated with the server 2804. The data intake and query system 108 may then retrieve data (e.g., real-time data) associated with the server 2804 that corresponds to the matching identifier and transmit the data to client device 404. Extended reality application 1814 of client device 404 then generates an AR overlay with the data and causes the overlay to be displayed via display device 1824.

Alternatively, in some embodiments, client device 404 may transmit the recognized identifier 2806, along with the location of client device 404, to a remote computing device (e.g., data intake and query system 108). Data intake and query system 108 may then compare the identifier 2806 to object identifier data associated with the geofence in which client device 404 is located. Based on the comparison, data intake and query system 108 determines the identifier in the object identifier data that matches identifier 2806 and retrieves data associated with the server 2804 that corresponds to the matching identifier. Then, data intake and query system 108 transmits the data to client device 404, where extended reality application 1814 may generate an AR overlay with the data and cause the AR overlay to be displayed via display device 1824.

Further, in some embodiments, client device 404 may transmit the image captured by camera 1820 and the location of client device 404 to the remote computing device. The remote computing device performs optical character recognition on the image to recognize identifier(s) 2806. The remote computing device then compares the identifier 2806 to object identifier data associated with the geofence in which client device 404 is located. The remote computing device may then determine an identifier that matches identifier 2806 and retrieve and transmit data associated with the server 2804 that corresponds to the matching identifier to client device 404, as described above. Extended reality application 1814 may then generate an AR overlay with the data and cause the overlay to be displayed, as described above.

FIG. 28C illustrates an extended reality overlay that includes real-time information associated with the servers of FIG. 28A, according to various embodiments of the present invention. As discussed above, data intake and query system 108 may retrieve data associated with the server 2804 corresponding to the identifier that matches identifier 2806 and transmit the data to client device 404. Extended reality application 1814 of client device 404 then generates an AR overlay with the data and presents the overlay to the user via display device 1824. As shown, an AR overlay 2810 may be overlaid on a server 2804 and/or next to a server 2804.

As described above, extended reality application 1814 may generate an AR overlay based on data associated with a machine and cause the AR overlay to be displayed in a continuous manner, while camera 1820 is pointed towards the machine. Accordingly, AR overlays 2810 may be displayed in a continuous manner over a view of servers 2804 in a user interface of extended reality application 1814. Overlay 2810-1 includes data (e.g., CPU usage, memory usage, uptime, etc.) for server 2804-1. Likewise, overlay 2810-2 includes data for server 2804-2, overlay 2810-3 includes data for server 2804-3, and overlay 2810-4 includes data for server 2804-4. The data included in each overlay 2810 may be received from data intake and query system 108.

In some embodiments, extended reality application 1814 may receive a 2D or 3D model of server 2804 from data intake and query system 108. Extended reality application 1814 may then determine placement of the AR overlay 2810 over server 2804 based on the 2D model or 3D model via any of the techniques described above. For example, augmented realty component 1814 may position AR overlay 2810 relative to one or more planes of a particular machine, as defined by a 2D or 3D model. In some embodiments, AR overlay 2810 may be positioned relative to an identifier, such as a model name or model number, identified on a particular machine. The positioning of the identifier on the machine and/or the position at which the AR overlay 2810 should be displayed relative to the identifier and/or one or more components of the machine may be stored with the 2D or 3D model.

In some embodiments, extended reality application 1814 may perform object recognition on one or more images captured by camera 1820 in order to determine an outline and/or viewing angle of server 2804. Extended reality application 1814 may then determine placement of the AR overlay 2810 based on the outline and/or viewing angle. Additionally, any of the techniques described herein for detecting concentric boundaries and/or generating AR models for machines may be implemented in conjunction with the geofence techniques described herein.

FIG. 29 illustrates a technique for recognizing sounds to identify a machine within a geofence, in accordance with example embodiments. During operation, a machine may emit sounds that are characteristic of the type of machine. In many cases, a machine in operation may emit sounds that are unique or nearly unique to that particular machine. That is, such sounds may represent a signature for the machine. Accordingly, in some embodiments, sounds generated by a machine may be acquired by a microphone 1826 of client device 404 and then analyzed to identify the machine.

As shown in FIG. 29, a geofence 2902 includes server racks 2904-1 and 2904-2. A user 2908 of client device 404 moves in direction 2910 into geofence 2902, and client device 404 detects that geofence 2902 has been entered. While in geofence 2902, user 2908 points camera 1820 of client device 404 towards server rack 2904-1, and camera 1820 captures an image of server rack 2904-1. Additionally, microphone 1826 may capture sound 2906-1 emitted from server rack 2904-1. Extended reality application 1814 may then analyze sound 2906-1 in conjunction with one or more images of server rack 2904-1 to identify the server rack 2904-1 and/or any servers mounted thereon. Alternatively, extended reality application 1814 could rely on an analysis of sound 2906-1, without requiring images of server rack 2904-1 to be captured and analyzed.

For example, in some embodiments, the object identifier data for geofence 2902 could include sound fingerprints (e.g., frequency characteristics, sound patterns, relative amplitudes, etc.) or sound samples associated with machines in geofence 2902. Extended reality application 1814 could then compare sound 2906-1 to the sound fingerprints and/or sound samples. In some embodiments, the comparison of a sound to the sound fingerprints and/or samples includes sound comparison using fuzzy logic. Optionally, extended reality application 1814 may also compare an identifier recognized in the image to the object identifier data, as described above, to determine identifier(s) for server(s) on server rack 2904-1. That is, an analysis of sound 2906-1 could be performed in conjunction with optical character recognition and/or image analysis of an identifier on the machine in order to increase the accuracy of machine identification.

As shown, microphone 1814 may also capture sound 2906-2 from server rack 2904-2. An audio sample of sound 2906-2 may be compared against the sound fingerprints or audio samples in the object identifier data for geofence 2902. Based on this comparison, one or more identifiers in the object identifier data may be determined to be matches for servers on server rack 2904-2. Client device 404 may then retrieve data associated with the servers on server rack 2904-2 based on the match(es).

Additionally, if one or more possible matches are detected based on sound that is acquired from one or more machines, then one or more images of the machine(s) may be analyzed to determine or confirm the identities of the machine(s). For example, in FIG. 29, because camera 1820 is facing server rack 2904-1, identifiers included in the image (e.g., serial number, model name, etc.) would match the servers included in server rack 2904-1, but not the servers included in server rack 2904-2. Accordingly, although sound associated with both server rack 2904-1 and server rack 2904-2 may be acquired, a match would be detected only with the servers included in server rack 2904-1, not the servers included in server rack 2904-2. In this manner, machine identification is improved by analyzing both audio data and image data.

In some embodiments, the status of a machine may be determined based on the sound. For example, based on sound 2906-1, extended reality application 1814 could determine the power status (e.g., powered on or off) or the operational status of a server on server rack 2904-1. Based on the status, extended reality application 1814 may generate an AR overlay that reflects the status or omit generating an AR overlay based on the status (e.g., omit generating an AR overlay for a server that is powered off).

FIG. 30 illustrates an example data structure 3000 which may be implemented to store geofence object identifiers in a database, in accordance with example embodiments. Data structure 3000 may store object identifier data associated with one or more geofences. In some embodiments, data structure 3000 may be stored at client device 404 and may include object identifier data for geofences into which client device 404 has entered. A more comprehensive version of data structure 3000 that includes object identifier data for multiple geofences may be stored at a remote computing device (e.g., data intake and query system 108).

As shown, data structure 3000 may be organized as a table that includes a geofence ID column 3002, an object ID column 3004, a subcomponent text column 3006, and a sub-component sounds column 3008. Each row in the table (e.g., rows 3016 and 3018) may correspond to an individual machine.

Geofence ID 3002 stores the identifier of the geofence in which a machine is located. For example, rows 3016 correspond to machines that are located in geofence 1, and rows 3018 correspond to machines that are located in geofence 2. Object ID 3004 stores a unique identifier (e.g., a serial number) of a machine. For example, row 3016-1 may correspond to an object with the identifier "B001-S001," and row 3016-2 may correspond to an object with the identifier "B001-S002."

Subcomponent text 3006 may store text that corresponds to one or more identifiers (e.g., identifiers 2806) that are on a particular machine. The subcomponent text may include the text of the serial number, brand name, model name, etc. that may be on a machine. Subcomponent sounds 3008 may store sound fingerprints and/or audio data (e.g., audio samples) associated with a machine or memory references (e.g., pointers) to sound fingerprints and/or audio data.

FIG. 31 is a flowchart of a method for identifying an object within a geofence at client device 404, in accordance with example embodiments. Although the method is described in conjunction with the systems of FIGS. 1-18 and 27A-30, persons skilled in the art will understand that any system configured to perform the method steps, in any order, falls within the scope of the present invention.

As shown, a method 3100 begins at block 3102, where extended reality application 1814 detects that client device 404 has entered a geofence. Extended reality application 1814 may determine the location of client device 404 via location sensor 1822 and then determine, based on one or more geofence definitions, that the location of client device 404 is inside of a geofence.

At block 3104, extended reality application 1814 acquires sensor data associated with a first object (e.g., a machine) that resides within the geofence. Camera 1820 captures an image of the machine (e.g., server rack 2800), and, optionally, microphone 1826 captures sound emitted from the machine.

At block 3106, extended reality application 1814 receives from a remote computing device (e.g., data intake and query system 108) object identifier data associated with object identifiers corresponding to objects residing within the geofence. Extended reality application 1814 may request from data intake and query system 108 object identifier data (e.g., data in database 3000) associated with the geofence in which client device 404 is located. In some embodiments, block 3106 is optional. For example, block 3106 may be omitted if client device 404 already has the object identifier data for the geofence stored (e.g., in storage 1804 and/or data store 1840) and the stored data is still relatively fresh. Additionally, in some embodiments, updated object identifier data may be requested and received based on the age of the object identifier data already stored or a determination (e.g., by extended reality application 1814) that the geofence includes one or more new machines.

At block 3108, extended reality application 1814 compares the sensor data to the object identifier data associated with the geofence in which client device 404 is located. Extended reality application 1814 may perform OCR (e.g., fuzzy OCR, Bayesian OCR) on the image in the sensor data to compare text captured in the image (e.g., identifiers 2806) to text (e.g., sub-component text 3006) in the object identifier data. Optionally, extended reality application 1814 may compare the sound in the sensor data to sound fingerprints and/or samples (e.g., subcomponent sounds 3008) in the object identifier data (e.g., via fuzzy logic sound comparison).

At block 3110, extended reality application 1814 identifies the first object based on the comparison in block 3108 above. Extended reality application 1814, based on the comparison described above, determines an object identifier (e.g., object ID 3004) in the object identifier data that matches text (e.g., identifier 2806) in the image and/or that is associated with a sound that matches the sound in the sensor data. The object identifier determined by extended reality application 1814 corresponds to a machine (e.g., a server 2904) captured in the sensor data.

At block 3112, extended reality application 1814 receives, from the remote computing device (e.g., data intake and query system 108), data associated with the first object. For example, extended reality application 1814 may query data intake and query system 108 for data associated with the machine (e.g., server 2904) identified in block 3110 above. The query to data intake and query system 108 may include the identifier determined in block 3110. In response to the query, data intake and query system 108 retrieves data associated with the machine corresponding to the identifier and transmits the data to client device 404. The data associated with the machine may include, without limitation, CPU usage, memory usage, uptime, operating temperature, fan speed, etc. For example, extended reality application 1814 could receive a dashboard or card that includes one or more metrics associated with the machine.

At block 3114, extended reality application 1814 causes display of the data associated with the first object. Extended reality application 1814 generates an AR overlay (e.g., AR overlay 1910) that shows the data associated with the machine, and causes display of the overlay over a view of the machine in a user interface of extended reality application 1814.

FIG. 32 is a flowchart of a method for identifying an object in a geofence at a server system, in accordance with example embodiments. Although the method is described in conjunction with the systems of FIGS. 1-18 and 27A-30, persons skilled in the art will understand that any system configured to perform the method steps, in any order, falls within the scope of the present invention.

As shown, a method 3200 begins at block 3202, where extended reality application 1814 of client device 404 acquires sensor data associated with an object (e.g., a machine). Camera 1820 captures an image of the object, and, optionally, microphone 1826 captures sounds emitted from a machine (e.g., server rack 2800).

At block 3204, extended reality application 1814 transmits the sensor data and a location of the client device 404 to a remote computing device (e.g., data intake and query system 108). Extended reality application 1814 may determine the location of client device 404 via location sensor 1822. The sensor data that is transmitted to the remote computing device may include image(s) and/or sound captured in block 3202.

In various embodiments, upon receiving sensor data from client device 404, the remote computing device determines, based on the location of client device 404 and one or more geofence definitions, that client device 404 is inside of a geofence. The remote computing device may then compare the sensor data to object identifier data associated with machines located in the geofence. For example, the remote computing device could perform OCR (e.g., fuzzy OCR, Bayesian OCR) on the image in the sensor data to compare text captured in the image (e.g., identifiers 2806) to text (e.g., subcomponent text 3006) in the object identifier data. Optionally, the remote computing device could compare the sound included in the sensor data to sound fingerprints and/or audio data (e.g., subcomponent sounds 3008) in the object identifier data. The remote computing device could then identify the object based on the comparison of the sensor data to the object identifier data and transmit data associated with the object to client device 404.

At block 3206, extended reality application 1814 receives data associated with the object from the remote computing device (e.g., data intake and query system 108). As noted above, the data associated with the object may include, without limitation, CPU usage, memory usage, uptime, operating temperature, fan speed, and so on. For example, extended reality application 1814 could receive a dashboard or card associated with the object.

At block 3208, extended reality application 1814 causes display of the data associated with the object. Extended reality application 1814 generates an AR overlay (e.g., AR overlay 1910) that shows the data associated with the object, and causes display of the overlay over a view of the object in a user interface of extended reality application 1814. The method 3200 may then terminate or return to block 3202.

3.3. Spatially-Referenced Audio Information

FIGS. 33A-33D illustrate a visual audio path 3310 for providing spatially-referenced audio information in an extended reality environment, in accordance with example embodiments. In various embodiments, a user may benefit from hearing audio information associated with one or more machines, for example, to enable the user to service the machine(s) and/or to provide relevant information associated with the machine(s). Accordingly, in some embodiments, extended reality application 1814 may record time series audio information associated with one or more machines in conjunction with the location(s) at which the audio information was recorded. The extended reality application 1814 may then output the recorded audio information and a visual audio path 3310 that corresponds to the locations at which the audio information was recorded to a user at a later time. Accordingly, other users are able to listen to relevant audio information and also view a visual representation (e.g., visual audio path 3310 generated by the extended reality application 1814) of the location(s) at which the audio information was originally recorded.

For example, extended reality application 1814 may track the location of a user as the user is walking around a server rack, shown in FIG. 33A, and narrating a spoken description of the server rack 3312. Because the extended reality application 1814 records both the user's voice and the locations at which the user's voice was recorded at different times during the spoken description, the spoken description may be played back in conjunction with a visual audio path 3310 that visually represents the locations at which the spoken descriptions were originally recorded.

In some embodiments, the availability and/or playback of audio information and a visual audio path 3310 that corresponds to the audio information may be triggered when a client device 404 enters a geofence associated with one or more machines. For example, as shown in FIG. 33A, server racks 3312 may be associated with geofence 3320 in which the server racks 3312 are located. Then, upon client device 404 entering geofence 3320, extended reality application 1814 may indicate the availability of audio information and visual audio path 3310 associated with the server racks 3312. A user of client device 404 may then trigger playback of the audio information and visual audio path 3310. Additionally or alternatively, playback of the audio information and visual audio path 3310 may begin automatically when client device 404 enters a particular geofence or moves within a threshold distance of a particular location, relative to one or more machines (e.g., a starting position 3314 of visual audio path 3310).

Once playback of the audio information and visual audio path 3310 is initiated, extended reality application 1814 overlays the visual audio path 3310 in the field of view of the user, as shown in FIG. 33B. For example, extended reality application 1814 could overlay the visual audio path 3310 in a field of view of the user (e.g., via a transparent AR display or a VR display) or overlay the visual audio path 3310 on one or more images acquired via the client device 404. The visual audio path 3310 may be recorded relative to a particular geospatial position (e.g., GPS coordinates) and/or may be recorded relative to a location that is on or proximate to one or more machines. Extended reality application 1814 may then overlay the visual audio path 3310 relative to the geospatial position and/or relative to the location associated with the one or more machines.

In various embodiments, the visual audio path 3310 includes a graphical representation of an audio waveform that corresponds to the audio information. In some embodiments, the graphical representation may be a 2D or 3D representation that is opaque or translucent. For example, extended reality application 1814 could display the visual audio path 3310 as a 3D translucent audio waveform that appears as a tunnel in front of a user.

Extended reality application 1814 may indicate a playback position within the audio information as well as the current geospatial location of the audio information by modifying one or more visual characteristics of the visual audio path 3310. For example, as shown in FIG. 33C, extended reality application 1814 could fill visual audio path 3310 with a color to visually indicate that playback position 3315 within the audio information has been reached and that the current audio information corresponds to geospatial location 3316 within the industrial environment. Then, as shown in FIG. 33D, as playback progresses, extended reality application 1814 could continue to fill visual audio path 3310 with the color to visually indicate that playback position 3317 within the audio information has been reached and that the current audio information corresponds to geospatial location 3318 within the industrial environment. In the same or other embodiments, extended reality application 1814 could modify the opacity, size, thickness, etc. of the visual audio path 3310 to indicate the playback position and/or the geospatial location that corresponds to the current audio information. Additionally or alternatively, extended reality application 1814 could display portions of visual audio path 3310 as playback progresses, such that the visual audio path 3310 appears to travel through the industrial environment in synchronization with the corresponding audio information. Optionally, as playback progresses, extended reality application 1814 could stop displaying portions of visual audio path 3310 which correspond to audio information that has already been presented, so that the user views only the most recent portions of visual audio path 3310. In general, any combination of the techniques described above is within the scope of the various embodiments.

In some embodiments, audio information and a corresponding visual audio path 3310 may be played back and/or made available in response to a user entering a geofence associated with one or more machines after a particular event has occurred. For example, audio information and a corresponding visual audio path 3310 may be played back and/or made available to a user after a particular software update is installed on one or more corresponding machines and/or after an error condition is detected on one or more machines. Then, upon determining that a client device 404 has entered a geofence associated with the one or more machines, extended reality application 1814 could determine that the event (e.g., a software update and/or error condition) occurred. In response, extended reality application 1814 would cause the audio information and corresponding visual audio path 3310 associated with the detected event to be outputted to the user of client device 404. Accordingly, the user may be automatically presented with spatially-referenced audio information that is relevant to a recent event when a user is proximate to one or more machines.

In some embodiments, the manner in which extended reality application 1814 outputs audio information via one or more speakers may be based on a distance of the client device 404 from a current geospatial position of the visual audio path 3310. For example, the volume with which the audio information is output via a speaker (e.g., headphones, a smartphone or tablet speaker, etc.) may be proportional to a distance of the client device 404 from a current geospatial position of the visual audio path 3310. In such embodiments, extended reality application 1814 could increase the volume of the audio information when the client device 404 moves closer to the current geospatial position of the visual audio path 3310 and decrease the volume of the audio information when the client device 404 moves away from the current geospatial position of the visual audio path 3310. Accordingly, a user of client device 404 is able to auditorily perceive the geospatial position of the audio information relative to the current location of the user.

FIG. 34 is a flowchart of a method for outputting a visual audio path that corresponds to audio information associated with one or more machines in an industrial environment, in accordance with other example embodiments. Although the processing described for the method is described in conjunction with the systems of FIGS. 1-33D, persons of ordinary skill in the art will understand that any system configured to perform the method, in any order, is within the scope of the present invention.

As shown, a method 3400 begins at block 3402, where an extended reality application 1814 executing on a client device 404 determines that client device 404 has entered a geofence. In general, extended reality application 1814 may implement any technique described herein (e.g., GPS-based techniques, beacon(s), etc.) for determining that client device 404 has entered a particular geofence.

At block 3404, extended reality application 1814 receives audio information and a visual audio path associated with the geofence. In some embodiments, in response to determining that client device 404 has entered the geofence, extended reality application 1814 may display an indication on client device 404 that audio information and a visual audio path associated with the geofence are available. Additionally or alternatively, in response to determining that client device 404 has entered the geofence, extended reality application 1814 may automatically acquire the audio information and/or the visual audio path, such as by downloading these data items.

At block 3406, extended reality application 1814 initiates playback of the audio information and the visual audio path. For example, extended reality application 1814 could initiate playback in response to an explicit user request received via client device 404 and/or extended reality application 1814 could automatically initiate playback in response to one or more criteria, such as determining that the client device 404 entered the geofence and/or determining that a particular event (e.g., a software update, error condition, etc.) has occurred.

The method 3400 then proceeds to blocks 3408 and 3410. At block 3408, extended reality application 1814 optionally modifies the volume of the audio information based on a location of the client device 404. For example, as described above, extended reality application 1814 may adjust the volume of the audio information in proportion to a distance from client device 404 to a current geospatial position of the visual audio path. At block 3410, extended reality application 1814 updates the visual audio path based on the current playback position, for example, by modifying an opacity, color, size, thickness, etc. of the visual audio path. The method 3400 then terminates.

In sum, a mobile client device, such as a smartphone, tablet computer, or AR headset, is fitted with a camera and an AR software application program. A technician operates the mobile client device by pointing a camera of the mobile client device towards various machines within an industrial environment. Each of the machines is fitted with an optical data marker, such as a QR code. When a camera of the client device is pointed towards one or more machines that include an optical data marker, the mobile client device decodes the optical data markers and identifies the corresponding machines. The mobile client device transmits one or more queries to a data intake and query system, requesting the real-time metric data associated with the identified machines. In response, the data intake and query system transmits the requested real-time metric data to the mobile client device. The mobile client device generates graphical AR overlays that include the real-time data for the identified machines in textual and/or graphical form. The mobile client device then displays the AR overlays on a display associated with the mobile client device. As a result, the technician may view real-time metrics for various machines by walking through the industrial environment and pointing a camera of the mobile client device towards the optical data markers associated with the various machines.

Additionally, in various embodiments, one or more objects within a geofence may be identified. A device crosses within the geofence and acquires sensor data associated with an object within the geofence. The sensor data may include image data and/or audio data. The device or a server system determines an object identifier associated with the object based on a comparison of the sensor data with data associated with object identifiers corresponding to objects within the geofence. Based on the object identifier, data associated with the object are obtained. The data associated with the object may be presented via the device (e.g., as an extended reality overlay over a view of the object in the device).

At least one advantage of the disclosed techniques is that a user is able to efficiently identify one or more machines that are operating outside of a normal range or that otherwise require attention. Such machines may be identified in less time relative to prior approaches. As a result, machines can be monitored and/or serviced more efficiently. Additionally, a user of a mobile device is able to authenticate with and receive real-time analytics from a remote data intake and query system, such as an on-premises data intake and query system and/or a cloud-based data intake and query system, in a secure manner.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent one or more modules, segments, or portions of code, which each comprise one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method, comprising:
   determining at least one location coordinate using a network-based sensor;
   acquiring, via at least one sensor of a client computing device that provides an extended reality (XR) environment, sensor data associated with a first object that is positioned within a geofence associated with the at least one location coordinate;
   identifying a marker based on the sensor data;
   determining, based on the marker, that a first object identifier included in a plurality of object identifiers corresponds to the first object, wherein each object identifier included in the plurality of object identifiers corresponds to a different object positioned within the geofence; and
   acquiring data associated with the first object based on the first object identifier, wherein the data associated with the first object is acquired by executing a search of stored data and includes one or more dimensions of the first object, and wherein a visualization in the XR environment associated with the first object is based at least in part on a scaling factor that relates one or more dimensions of the marker in the sensor data to the one or more dimensions of the first object, wherein the executing the search of the stored data comprises:
  executing queries requesting metrics associated with the first object;
  responsive to the executing, retrieving events associated with the first object;
  extracting values for fields in the events; and
  determining the metrics associated with the first object using the extracted values, and wherein the visualization in the XR environment associated with the first object is generated using the metrics.

2. The method of claim 1, wherein the marker comprises an optical data marker, and the optical data marker is identified from at least one image included in the sensor data.

3. The method of claim 1, wherein the visualization in the XR environment is further based on at least one of a size, a three-dimensional position, an orientation, or a detected plane of the marker.

4. The method of claim 1, wherein determining that the first object identifier corresponds to the first object comprises decoding the marker to retrieve the first object identifier.

5. The method of claim 1, wherein the data associated with the first object is acquired by executing a search of data stored in a data intake and query system.

6. The method of claim 1, wherein the data associated with the first object is acquired by executing a search of data stored in a database.

7. The method of claim 1, wherein the data associated with the first object further comprises at least one of, an image, a dashboard, a playbook, a runbook, or a card, and the visualization in the XR environment comprises an image that includes the first object and an overlay of a visual representation of the data associated with the first object, wherein the overlay is disposed relative to the first object based on at least one of a graphical model of the first object or a dimension of the first object.

8. The method of claim 1, wherein the geofence corresponds to at least a portion of a building, and each object identifier included in the plurality of object identifiers corresponds to a different object located within the at least a portion of the building.

9. The method of claim 1, wherein the first object identifier comprises at least one of a serial number, a model name, a model number, a brand name, or a brand logo.

10. The method of claim 1, further comprising acquiring additional data associated with the first object by decoding the marker.

11. The method of claim 1, further comprising acquiring a two-dimensional or three-dimensional model associated with the first object by decoding the marker.

12. The method of claim 1, further comprising determining that the device is within a particular area of the geofence.

13. The method of claim 1, wherein the data associated with the first object comprises real-time data for at least one metric.

14. The method of claim 1, wherein the marker comprises a quick response (QR) code.

15. The method of claim 1, wherein the marker comprises a bar code.

16. The method of claim 1, wherein the client computing device comprises one of a smartphone, a tablet computer, a handheld computer, a wearable device, a portable media player, or a gaming device.

17. The method of claim 1, wherein the at least one sensor of the client computing device includes a camera.

18. A non-transitory computer-readable storage medium including instructions that, when executed by a processor, cause the processor to perform the steps of:
  determining at least one location coordinate using a network-based sensor;
  acquiring, via at least one sensor of a client computing device that provides an extended reality (XR) environment, sensor data associated with a first object that is positioned within a geofence associated with the at least one location coordinate;
  identifying a marker based on the sensor data;
  determining, based on the marker, that a first object identifier included in a plurality of object identifiers corresponds to the first object, wherein each object identifier included in the plurality of object identifiers corresponds to a different object positioned within the geofence; and
  acquiring data associated with the first object based on the first object identifier, wherein the data associated with the first object is acquired by executing a search of stored data and includes one or more dimensions of the first object, and wherein a visualization in the XR environment associated with the first object is based at least in part on a scaling factor that relates one or more dimensions of the marker in the sensor data to the one or more dimensions of the first object, wherein the executing the search of the stored data comprises:
    executing queries requesting metrics associated with the first object;
    responsive to the executing, retrieving events associated with the first object;
    extracting values for fields in the events; and
    determining the metrics associated with the first object using the extracted values, and wherein the visualization in the XR environment associated with the first object is generated using the metrics.

19. The computer-readable storage medium of claim 18, wherein the marker comprises an optical data marker, and the optical data marker is identified from at least one image included in the sensor data.

20. A computing device, comprising:
  a memory that includes instructions; and
  a processor that is coupled to the memory and, when executing the instructions:
    determines at least one location coordinate using a network-based sensor,
    acquires, via at least one sensor of a client computing device that provides an extended reality (XR) environment, sensor data associated with a first object that is positioned within a geofence associated with the at least one location coordinate,
    identifies a marker based on the sensor data,
    determines, based on the marker, that a first object identifier included in a plurality of object identifiers corresponds to the first object, wherein each object identifier included in the plurality of object identifiers corresponds to a different object positioned within the geofence, and
    acquires data associated with the first object based on the first object identifier, wherein the data associated with the first object is acquired by executing a search of stored data and includes one or more dimensions of the first object, and wherein a visualization in the XR environment associated with the first object is based at least in part on a scaling factor that relates one or more dimensions of the marker in the sensor data to the one or more dimensions of the first object, wherein the executing the search of the stored data comprises:

executing queries requesting metrics associated with the first object;

responsive to the executing, retrieving events associated with the first object;

extracting values for fields in the events; and determining the metrics associated with the first object using the extracted values, and wherein the visualization in the XR environment associated with the first object is generated using the metrics.

* * * * *